United States Patent
Gottlieb et al.

(10) Patent No.: US 7,310,784 B1
(45) Date of Patent: Dec. 18, 2007

(54) METHODS FOR IDENTIFYING CELLS IN A PATH IN A FLOWCHART AND FOR SYNCHRONIZING GRAPHICAL AND TEXTUAL VIEWS OF A FLOWCHART

(75) Inventors: Harry N. Gottlieb, Chicago, IL (US); Mari H. Franklin, Barrington Hills, IL (US); Lukass R. Franklin, Barrington Hills, IL (US); Jeffrey A. Barhorst, Grayslake, IL (US)

(73) Assignee: The Jellyvision Lab, Inc., Chicago, IL (US)

( * ) Notice: Subject to any disclaimer, the term of this patent is extended or adjusted under 35 U.S.C. 154(b) by 390 days.

(21) Appl. No.: 10/038,527

(22) Filed: Jan. 2, 2002

(51) Int. Cl.
*G06F 3/00* (2006.01)

(52) U.S. Cl. .................. 715/853; 715/854; 715/763; 715/771; 717/102

(58) Field of Classification Search ............... 717/102; 715/763, 771, 853, 854
See application file for complete search history.

(56) References Cited

U.S. PATENT DOCUMENTS

| | | |
|---|---|---|
| 4,538,188 A | 8/1985 | Barker et al. |
| 4,831,525 A | 5/1989 | Saito et al. |
| 4,831,580 A | 5/1989 | Yamada |
| 4,852,047 A | 7/1989 | Lavallee et al. |
| 4,875,187 A | 10/1989 | Smith |
| 4,893,256 A | 1/1990 | Rutherfoord et al. |

(Continued)

FOREIGN PATENT DOCUMENTS

EP 0 438 299 A2 7/1991

(Continued)

OTHER PUBLICATIONS

Quality America Inc., Flowchart/Cause & Effect Features, Jun. 21, 2000, pp. 1-4.*

(Continued)

*Primary Examiner*—Sy Luu
*Assistant Examiner*—Ryan Pitaro
(74) *Attorney, Agent, or Firm*—Brinks Hofer Gilson & Lione

(57) ABSTRACT

The preferred embodiments described herein provide methods for identifying cells in a path in a flowchart and for synchronizing graphical and textual views of a flowchart. In one preferred embodiment, a method for identifying cells in a path in a flowchart is provided comprising the acts of displaying a flowchart comprising a plurality of cells, selecting a cell in the flowchart, determining a path comprising the selected cell, and identifying at least some of the cells in the path. In another preferred embodiment, a method for synchronizing graphical and textual views of a flowchart is provided. This method comprises the acts of displaying a graphical view of a flowchart comprising a plurality of cells in a first display region, displaying a textual view of at least some cells in the flowchart in a second display region, and in response to input received in either the first or second display regions, applying the input to both the first and second display regions. Other preferred embodiments are provided, and each of the preferred embodiments can be used alone or in combination with one another.

63 Claims, 12 Drawing Sheets

U.S. PATENT DOCUMENTS

| | | |
|---|---|---|
| 4,931,950 A | 6/1990 | Isle et al. |
| 4,933,880 A | 6/1990 | Borgendale et al. |
| 4,956,773 A | 9/1990 | Saito et al. |
| 5,111,409 A | 5/1992 | Gasper et al. |
| 5,119,474 A | 6/1992 | Beitel et al. |
| 5,261,041 A | 11/1993 | Susman |
| 5,307,456 A | 4/1994 | MacKay |
| 5,386,508 A | 1/1995 | Itonori et al. |
| 5,418,622 A | 5/1995 | Takeuchi |
| 5,430,872 A | 7/1995 | Dahod et al. |
| 5,446,911 A | 8/1995 | Juso et al. |
| 5,515,490 A | 5/1996 | Buchanan et al. |
| 5,519,828 A | 5/1996 | Rayner |
| 5,530,856 A | 6/1996 | Dahod et al. |
| 5,546,529 A * | 8/1996 | Bowers et al. ............... 715/848 |
| 5,581,759 A | 12/1996 | Ohhashi et al. |
| 5,590,253 A | 12/1996 | Onishi et al. |
| 5,592,602 A | 1/1997 | Edmunds et al. |
| 5,619,636 A | 4/1997 | Sweat et al. |
| 5,630,017 A | 5/1997 | Gasper et al. |
| 5,640,590 A | 6/1997 | Luther |
| 5,692,212 A | 11/1997 | Roach |
| 5,697,788 A * | 12/1997 | Ohta .......................... 434/118 |
| 5,708,845 A | 1/1998 | Wistendahl et al. |
| 5,717,879 A | 2/1998 | Moran et al. |
| 5,721,959 A | 2/1998 | Nakamura et al. |
| 5,752,029 A | 5/1998 | Wissner |
| 5,754,851 A | 5/1998 | Wissner |
| 5,806,079 A | 9/1998 | Rivette et al. |
| 5,818,435 A | 10/1998 | Kozuka et al. |
| 5,870,768 A | 2/1999 | Hekmatpour |
| 5,892,507 A | 4/1999 | Moorby et al. |
| 5,893,105 A | 4/1999 | MacLennan |
| 5,905,981 A | 5/1999 | Lawler |
| 6,034,692 A | 3/2000 | Gallery et al. |
| 6,058,333 A | 5/2000 | Klein et al. |
| 6,097,887 A | 8/2000 | Hardikar et al. |
| 6,100,881 A | 8/2000 | Gibbons et al. |
| 6,144,938 A | 11/2000 | Surace et al. |
| 6,154,600 A | 11/2000 | Newman et al. |
| 6,179,490 B1 | 1/2001 | Pruitt |
| 6,184,879 B1 | 2/2001 | Minemura et al. |
| 6,239,800 B1 * | 5/2001 | Mayhew et al. ............. 715/764 |
| 6,243,857 B1 * | 6/2001 | Logan et al. ................ 717/111 |
| 6,334,103 B1 | 12/2001 | Surace et al. |
| 6,370,683 B1 | 4/2002 | Sobers |
| 6,654,803 B1 * | 11/2003 | Rochford et al. ............ 709/224 |
| 6,816,174 B2 * | 11/2004 | Tiongson et al. ............ 715/787 |
| 2002/0038206 A1 * | 3/2002 | Dori ............................ 703/22 |
| 2004/0196310 A1 * | 10/2004 | Aamodt et al. .............. 345/738 |

FOREIGN PATENT DOCUMENTS

| | | |
|---|---|---|
| EP | 0 661 631 A2 | 7/1995 |
| JP | 63 127333 | 5/1988 |
| JP | 5 257666 A2 | 10/1993 |
| JP | 8 96001 | 4/1996 |
| JP | 8 263536 | 10/1996 |
| WO | WO 96/19779 | 6/1996 |
| WO | WO 96/26600 | 8/1996 |

OTHER PUBLICATIONS

Goofy Animation System, Technical Report 266, Lindsey Ford Department of Computer Science University of Exeter, Exeter EX4 4PT, U.K. Nov. 5, 1993, pp. 1-15.

A Multimedia Presentation Mechanism Permitting Partial Loss of Objects, Han II Kim et al., Dept. of Computer Eng., pp. 847-851 (1992).

STORM Structural and Temporal Object-oRiented Multimedia database system, Michel Adiba, IMAG-LGI, Grenoble University, BP 53, 38041 Grenoble Cedex 9 France, pp. 12-19 (1995).

Shelldrake Developer, http://www.shelldrake.com/Developer/fags.htm, 3 pages (2000).

Shelldrake Developer, http://www.shelldrake.com/Developer/StoryFirst.htm, 3 pages (2000).

"allCLEAR User's Guide," Version 4.5, SPSS Inc., 1999 (218 pages).

* cited by examiner

METHODS FOR IDENTIFYING CELLS IN A PATH IN A FLOWCHART AND FOR SYNCHRONIZING GRAPHICAL AND TEXTUAL VIEWS OF A FLOWCHART

REFERENCE TO COMPUTER PROGRAM LISTING APPENDIX

This application contains one compact disc submitted in duplicate. The material on that compact disc is hereby incorporated by reference. The following is a listing of the names of the files on the compact disc, their dates of creation, and their sizes in bytes.

Volume in drive F is 011228_1335

Volume Serial Number is 7635-063B

```
Directory of F:\Send\docs
12/28/2001   01:37p         1,420 ReadMe.txt
12/28/2001   12:51p         2,663 TWiki__Lab__AudioMoment.mht
12/28/2001   12:51p         3,118 TWiki__Lab__AudioVersion.mht
12/28/2001   12:51p        25,715 TWiki__Lab__ConditionCell.mht
12/28/2001   12:51p         3,386 TWiki__Lab__CueCard.mht
12/28/2001   12:51p        15,237 TWiki__Lab__DialogueCell.mht
12/28/2001   12:51p        17,114 TWiki__Lab__Flow-
                                  chartScriptWindow.mht
12/28/2001   12:51p         4,093 TWiki__Lab__GotoCell.mht
12/28/2001   12:51p        31,354 TWiki__Lab__MediaWindow.mht
12/28/2001   12:51p         4,713 TWiki__Lab__PlaybackWindow.mht
12/28/2001   01:31p         4,239 TWiki__Lab__UberToolManual.mht
            11 File(s)    113,052 bytes
```

```
Directory of F:\Send\ExtLibraries\graphviz-1.7.7
12/28/2001   12:51p        19,004 aclocal.m4
12/28/2001   12:51p           860 AUTHORS
12/28/2001   12:51p         1,747 autogen.sh
12/28/2001   12:51p         5,424 ChangeLog
12/28/2001   12:51p         3,780 config.cache
12/28/2001   12:51p        32,349 config.guess
12/28/2001   12:51p        16,295 config.log
12/28/2001   12:51p         1,295 Config.mk.linux.i386
12/28/2001   12:51p         1,269 Config.mk.sgi.mips3
12/28/2001   12:51p        19,637 config.status
12/28/2001   12:51p        25,767 config.sub
12/28/2001   12:51p       162,205 CONFIGURE
12/28/2001   12:51p        16,756 configure.in
12/28/2001   12:51p        20,205 COPYING
12/28/2001   12:51p         2,548 FAQ.txt
12/28/2001   12:51p        10,967 graphviz.spec
12/28/2001   12:51p        10,929 graphviz.spec.in
12/28/2001   12:51p         3,127 gvconfig.h
12/28/2001   12:51p         2,866 gvconfig.h.IN
12/28/2001   12:51p         8,064 INSTALL
12/28/2001   12:51p         5,849 install-sh
12/28/2001   12:51p       124,781 libtool
12/28/2001   12:51p        99,548 ltconfig
12/28/2001   12:51p       114,545 ltmain.sh
12/28/2001   12:51p           280 Makeargs
12/28/2001   12:51p        16,270 Makefile
12/28/2001   12:51p           772 Makefile.am
12/28/2001   12:51p        16,527 Makefile.IN
12/28/2001   12:51p         6,960 MINTERMS.txt
12/28/2001   12:51p         6,473 missing
12/28/2001   12:51p           762 mkinstalldirs
12/28/2001   12:51p         4,074 NEWS
12/28/2001   12:51p           417 nmakefile
12/28/2001   12:51p           141 README
12/28/2001   12:51p            11 stamp-h
12/28/2001   12:51p            11 stamp-h.in
            36 File(s)    762,515 bytes
```

```
Directory of F:\Send\ExtLibraries\graphviz-1.7.7\agraph
12/28/2001   12:51p         1,280 agerror.c
12/28/2001   12:51p         5,114 aghdr.h
12/28/2001   12:51p        18,912 agraph.3
12/28/2001   12:51p        14,773 agraph.h
12/28/2001   12:51p         2,292 apply.c
12/28/2001   12:51p        10,278 attr.c
12/28/2001   12:51p         9,616 cmpnd.c
12/28/2001   12:51p         1,260 dotdge.c
12/28/2001   12:51p         9,639 edge.c
12/28/2001   12:51p           227 fixheader
12/28/2001   12:51p         1,221 flatten.c
12/28/2001   12:51p        39,722 grammar.c
12/28/2001   12:51p         8,064 grammar.grammar
12/28/2001   12:51p           324 grammar.h
12/28/2001   12:51p        11,069 grammar.y
12/28/2001   12:51p         5,019 graph.c
12/28/2001   12:51p         3,192 id.c
12/28/2001   12:51p         4,587 imap.c
12/28/2001   12:51p           929 io.c
12/28/2001   12:51p         1,963 main.c
12/28/2001   12:51p        13,107 Makefile
12/28/2001   12:51p           685 Makefile.am
12/28/2001   12:51p        13,656 Makefile.IN
12/28/2001   12:51p            69 malloc.h
12/28/2001   12:51p         2,882 mem.c
12/28/2001   12:51p           842 nmakefile
12/28/2001   12:51p         5,824 node.c
12/28/2001   12:51p         5,650 obj.c
12/28/2001   12:51p         5,418 pend.c
12/28/2001   12:51p            44 README
12/28/2001   12:51p         5,938 rec.c
12/28/2001   12:51p         2,808 refstr.c
12/28/2001   12:51p        44,702 scan.c
12/28/2001   12:51p         3,250 scan.1
12/28/2001   12:51p         2,274 subg.c
12/28/2001   12:51p         1,260 tester.c
12/28/2001   12:51p         2,021 utils.c
12/28/2001   12:51p           881 vmstub.h
12/28/2001   12:51p        10,616 write.c
            39 File(s)    271,408 bytes
```

```
Directory of F:\Send\ExtLibraries\graphviz-1.7.7\agutil
12/28/2001   12:51p           455 agutil.h
12/28/2001   12:51p           740 dynattr.c
12/28/2001   12:51p        10,707 Makefile
12/28/2001   12:51p           276 Makefile.am
12/28/2001   12:51p        11,241 Makefile.in
12/28/2001   12:51p           713 nodeq.c
             6 File(s)     24,132 bytes
```

```
Directory of F:\Send\ExtLibraries\graphviz-1.7.7\cdt
12/28/2001   12:51p         3,394 ast__common.h
12/28/2001   12:51p        19,591 cdt.3
12/28/2001   12:51p         8,301 cdt.h
12/28/2001   12:51p         1,293 dtclose.c
12/28/2001   12:51p         2,886 dtdisc.c
12/28/2001   12:51p         1,250 dtextract.c
12/28/2001   12:51p         1,698 dtflatten.c
12/28/2001   12:51p         7,251 dthash.c
12/28/2001   12:51p         2,569 dthdr.h
12/28/2001   12:51p         4,361 dtlist.c
12/28/2001   12:51p         2,548 dtmethod.c
12/28/2001   12:51p         2,289 dtopen.c
12/28/2001   12:51p         1,841 dtrenew.c
12/28/2001   12:51p         2,076 dtrestore.c
12/28/2001   12:51p         1,310 dtsize.c
12/28/2001   12:51p         2,725 dtstat.c
12/28/2001   12:51p         1,028 dtstrhash.c
12/28/2001   12:51p         7,187 dttree.c
```

-continued

| | | | |
|---|---|---|---|
| 12/28/2001 | 12:51p | 3,279 | dtview.c |
| 12/28/2001 | 12:51p | 1,130 | dtwalk.c |
| 12/28/2001 | 12:51p | 609 | libcdt.la |
| 12/28/2001 | 12:51p | 12,646 | Makefile |
| 12/28/2001 | 12:51p | 678 | Makefile.am |
| 12/28/2001 | 12:51p | 13,183 | Makefile.IN |
| 12/28/2001 | 12:51p | 509 | nmakefile |
| 12/28/2001 | 12:51p | 939 | README |
| | 26 File(s) | 106,571 bytes | |

Directory of F:\Send\ExtLibraries\graphviz-1.7.7\cdt\features

| | | | |
|---|---|---|---|
| 12/28/2001 | 12:51p | 8,960 | common |
| | 1 File(s) | 8,960 bytes | |

Directory of F:\Send\ExtLibraries\graphviz-1.7.7\contrib

| | | | |
|---|---|---|---|
| 12/28/2001 | 12:51p | 2,148 | gprof2dot.awk |
| 12/28/2001 | 12:51p | 127 | INDEX |
| 12/28/2001 | 12:51p | 7,632 | Makefile |
| 12/28/2001 | 12:51p | 259 | Makefile.am |
| 12/28/2001 | 12:51p | 8,110 | Makefile.in |
| | 5 File(s) | 18,276 bytes | |

Directory of F:\Send\ExtLibraries\graphviz-1.7.7\contrib\CVS

| | | | |
|---|---|---|---|
| 12/28/2001 | 12:51p | 154 | Entries |
| 12/28/2001 | 12:51p | 18 | Repository |
| 12/28/2001 | 12:51p | 40 | Root |
| | 3 File(s) | 212 bytes | |

Directory of F:\Send\ExtLibraries\graphviz-1.7.7\contrib\lefty-grace

| | | | |
|---|---|---|---|
| 12/28/2001 | 12:51p | 23,701 | dotty.lefty |
| 12/28/2001 | 12:51p | 30,116 | dotty_draw.lefty |
| 12/28/2001 | 12:51p | 21,460 | dotty_edit.lefty |
| 12/28/2001 | 12:51p | 19,317 | dotty_ui.lefty |
| 12/28/2001 | 12:51p | 2,018 | README |
| | 5 File(s) | 96,612 bytes | |

Directory of F:\Send\ExtLibraries\graphviz-1.7.7\contrib\lefty-grace\CVS

| | | | |
|---|---|---|---|
| 12/28/2001 | 12:51p | 256 | Entries |
| 12/28/2001 | 12:51p | 30 | Repository |
| 12/28/2001 | 12:51p | 40 | Root |
| | 3 File(s) | 326 bytes | |

Directory of F:\Send\ExtLibraries\graphviz-1.7.7\contrib\lefty-grace\lefty-grace

| | | | |
|---|---|---|---|
| 12/28/2001 | 12:51p | 23,701 | dotty.lefty |
| 12/28/2001 | 12:51p | 30,116 | dotty_draw.lefty |
| 12/28/2001 | 12:51p | 21,460 | dotty_edit.lefty |
| 12/28/2001 | 12:51p | 19,317 | dotty_ui.lefty |
| 12/28/2001 | 12:51p | 2,018 | README |
| | 5 File(s) | 96,612 bytes | |

Directory of F:\Send\ExtLibraries\graphviz-1.7.7\contrib\lefty-grace\lefty-grace\CVS

| | | | |
|---|---|---|---|
| 12/28/2001 | 12:51p | 256 | Entries |
| 12/28/2001 | 12:51p | 30 | Repository |
| 12/28/2001 | 12:51p | 40 | Root |
| | 3 File(s) | 326 bytes | |

Directory of F:\Send\ExtLibraries\graphviz-1.7.7\dag

| | | | |
|---|---|---|---|
| 12/28/2001 | 12:51p | 6,931 | base.c |
| 12/28/2001 | 12:51p | 5,400 | check.c |
| 12/28/2001 | 12:51p | 6,444 | config.c |
| 12/28/2001 | 12:51p | 2,385 | dag.c |
| 12/28/2001 | 12:51p | 10,029 | dag.h |
| 12/28/2001 | 12:51p | 16,358 | ddspline.c |
| 12/28/2001 | 12:51p | 4,020 | geom.c |
| 12/28/2001 | 12:51p | 10,962 | Makefile |
| 12/28/2001 | 12:51p | 472 | Makefile.am |
| 12/28/2001 | 12:51p | 11,496 | Makefile.in |
| 12/28/2001 | 12:51p | 2,606 | medians.c |
| 12/28/2001 | 12:51p | 4,137 | opt.c |
| 12/28/2001 | 12:51p | 13,880 | order.c |
| 12/28/2001 | 12:51p | 11,400 | rank.c |
| 12/28/2001 | 12:51p | 1,443 | uvcross.c |
| 12/28/2001 | 12:51p | 5,440 | work.c |
| 12/28/2001 | 12:51p | 5,834 | xcoord.c |
| 12/28/2001 | 12:51p | 3,181 | ycoord.c |
| | 18 File(s) | 122,418 bytes | |

Directory of F:\Send\ExtLibraries\graphviz-1.7.7\doc

| | | | |
|---|---|---|---|
| 12/28/2001 | 12:51p | 8,327 | build.html |
| 12/28/2001 | 12:51p | 5,366 | Dot.ref |
| 12/28/2001 | 12:51p | 9,584 | FAQ.html |
| 12/28/2001 | 12:51p | 137,760 | gd.html |
| 12/28/2001 | 12:51p | 7,600 | Makefile |
| 12/28/2001 | 12:51p | 262 | Makefile.am |
| 12/28/2001 | 12:51p | 8,078 | Makefile.in |
| 12/28/2001 | 12:51p | 6,754 | tcldot.html |
| | 8 File(s) | 183,731 bytes | |

Directory of F:\Send\ExtLibraries\graphviz-1.7.7\dotneato

| | | | |
|---|---|---|---|
| 12/28/2001 | 12:51p | 11,833 | dot.1 |
| 12/28/2001 | 12:51p | 1,258 | dot.c |
| 12/28/2001 | 12:51p | 2,118 | dotmemtest.c |
| 12/28/2001 | 12:51p | 18,960 | Makefile |
| 12/28/2001 | 12:51p | 1,590 | Makefile.am |
| 12/28/2001 | 12:51p | 19,506 | Makefile.IN |
| 12/28/2001 | 12:51p | 3,577 | neato.1 |
| 12/28/2001 | 12:51p | 1,264 | neato.c |
| 12/28/2001 | 12:51p | 2,028 | neatomemtest.c |
| 12/28/2001 | 12:51p | 33 | nmakefile |
| 12/28/2001 | 12:51p | 17,843 | XFIG_FORMAT3.2.txt |
| | 11 File(s) | 80,010 bytes | |

Directory of F:\Send\ExtLibraries\graphviz-1.7.7\dotneato\awk

| | | | |
|---|---|---|---|
| 12/28/2001 | 12:51p | 1,010 | colortbl.awk |
| 12/28/2001 | 12:51p | 395 | stringize.awk |
| 12/28/2001 | 12:51p | 1,310 | typegraph.awk |
| | 3 File(s) | 2,715 bytes | |

```
Directory of
F:\Send\ExtLibraries\graphviz-1.7.7\dotneato\common
12/28/2001  12:51p           16,478 colortbl.h
12/28/2001  12:51p           13,886 color_lib
12/28/2001  12:51p           13,886 color_names
12/28/2001  12:51p            3,267 colxlate.c
12/28/2001  12:51p            5,262 const.h
12/28/2001  12:51p           20,822 emit.c
12/28/2001  12:51p           13,200 figgen.c
12/28/2001  12:51p           20,819 gdgen.c
12/28/2001  12:51p              589 globals.c
12/28/2001  12:51p            3,154 globals.h
12/28/2001  12:51p           21,616 hpglgen.c
12/28/2001  12:51p           12,961 imapgen.c
12/28/2001  12:51p            9,182 input.c
12/28/2001  12:51p            9,951 ismapgen.c
12/28/2001  12:51p              624 libdotneato.la
12/28/2001  12:51p            2,021 macros.h
12/28/2001  12:51p           11,877 Makefile
12/28/2001  12:51p            1,141 Makefile.am
12/28/2001  12:51p           12,408 Makefile.IN
12/28/2001  12:51p           17,333 mifgen.c
12/28/2001  12:51p            7,661 mpgen.c
12/28/2001  12:51p            1,392 nmakefile
12/28/2001  12:51p            7,363 output.c
12/28/2001  12:51p           18,928 picgen.c
12/28/2001  12:51p            7,091 postproc.c
12/28/2001  12:51p            3,557 ps.h
12/28/2001  12:51p            3,090 ps.txt
12/28/2001  12:51p           12,760 psgen.c
12/28/2001  12:51p            1,970 README.imap
12/28/2001  12:51p            1,078 render.h
12/28/2001  12:51p            5,732 renderprocs.h
12/28/2001  12:51p           37,647 shapes.c
12/28/2001  12:51p              372 strcasecmp.c
12/28/2001  12:51p              469 strncasecmp.c
12/28/2001  12:51p           17,791 svggen.c
12/28/2001  12:51p            9,667 types.h
12/28/2001  12:51p           11,891 utils.c
12/28/2001  12:51p              531 utils.h
12/28/2001  12:51p           18,531 vrmlgen.c
12/28/2001  12:51p           14,808 vtxgen.c
              40 File(s)        392,806 bytes Directory of
F:\Send\ExtLibraries\graphviz-1.7.7\dotneato\dotgen
12/28/2001  12:51p            1,388 acyclic.c
12/28/2001  12:51p            2,716 class1.c
12/28/2001  12:51p            6,729 class2.c
12/28/2001  12:51p            9,473 cluster.c
12/28/2001  12:51p           13,932 compound.c
12/28/2001  12:51p            5,795 conc.c
12/28/2001  12:51p            2,316 decomp.c
12/28/2001  12:51p              631 dot.h
12/28/2001  12:51p            9,914 dotprocs.h
12/28/2001  12:51p            7,323 fastgr.c
12/28/2001  12:51p            5,243 flat.c
12/28/2001  12:51p            6,399 init.c
12/28/2001  12:51p              609 libdot.la
12/28/2001  12:51p           11,127 Makefile
12/28/2001  12:51p              545 Makefile.am
12/28/2001  12:51p           11,658 Makefile.IN
12/28/2001  12:51p           32,107 mincross.c
12/28/2001  12:51p              225 nmakefile
12/28/2001  12:51p           16,647 ns.c
12/28/2001  12:51p           20,272 position.c
12/28/2001  12:51p           10,930 rank.c
12/28/2001  12:51p           18,537 routespl.c
12/28/2001  12:51p            7,002 sameport.c
12/28/2001  12:51p           60,818 splines.c
12/28/2001  12:51p            1,189 timing.c
              25 File(s)        263,525 bytes Directory of
F:\Send\ExtLibraries\graphviz-1.7.7\dotneato\neatogen
12/28/2001  12:51p           13,284 adjust.c
12/28/2001  12:51p              592 adjust.h
12/28/2001  12:51p            4,677 edges.c
12/28/2001  12:51p            1,067 edges.h
12/28/2001  12:51p            3,282 find_ints.c
12/28/2001  12:51p            2,573 geometry.c
12/28/2001  12:51p            1,245 geometry.h
12/28/2001  12:51p            3,050 heap.c
12/28/2001  12:51p              766 heap.h
12/28/2001  12:51p            6,609 hedges.c
12/28/2001  12:51p            1,347 hedges.h
12/28/2001  12:51p            6,913 info.c
12/28/2001  12:51p            1,394 info.h
12/28/2001  12:51p            4,941 init.c
12/28/2001  12:51p            3,999 intersect.c
12/28/2001  12:51p            2,931 legal.c
12/28/2001  12:51p              615 libneato.la
12/28/2001  12:51p           11,372 Makefile
12/28/2001  12:51p              771 Makefile.am
12/28/2001  12:51p           11,903 Makefile.IN
12/28/2001  12:51p            1,646 mem.h
12/28/2001  12:51p            2,746 memory.c
12/28/2001  12:51p              752 neato.h
12/28/2001  12:51p            2,713 neatoprocs.h
12/28/2001  12:51p              244 nmakefile
12/28/2001  12:51p            9,622 poly.c
12/28/2001  12:51p              890 poly.h
12/28/2001  12:51p            1,158 printvis.c
12/28/2001  12:51p            1,442 simple.h
12/28/2001  12:51p            1,451 site.c
12/28/2001  12:51p            1,130 site.h
12/28/2001  12:51p            2,392 solve.c
12/28/2001  12:51p           20,643 splines.c
12/28/2001  12:51p           13,655 stuff.c
12/28/2001  12:51p            3,719 voronoi.c
12/28/2001  12:51p              619 voronoi.h
              36 File(s)        148,153 bytes Directory of F:\Send\ExtLibraries\graphviz-1.7.7\dotty
12/28/2001  12:51p            1,052 dotty.1
12/28/2001  12:51p            2,150 dotty.bsh
12/28/2001  12:51p            2,408 dotty.ksh
12/28/2001  12:51p           24,415 dotty.lefty
12/28/2001  12:51p            2,155 dotty.sh
12/28/2001  12:51p           29,613 dotty_draw.lefty
12/28/2001  12:51p           18,436 dotty_edit.lefty
12/28/2001  12:51p            8,345 dotty_layout.lefty
12/28/2001  12:51p           13,553 dotty_ui.lefty
12/28/2001  12:51p           11,129 Makefile
12/28/2001  12:51p              478 Makefile.am
12/28/2001  12:51p           11,608 Makefile.IN
12/28/2001  12:51p              296 nmakefile
12/28/2001  12:51p               46 notes
              14 File(s)        125,684 bytes Directory of
F:\Send\ExtLibraries\graphviz-1.7.7\dotty\mswin32
12/28/2001  12:51p              178 doinst
12/28/2001  12:51p            2,403 dotty.c
12/28/2001  12:51p            6,425 dotty.mak
               3 File(s)          9,006 bytes Directory of
F:\Send\ExtLibraries\graphviz-1.7.7\dotty\mswin32\CVS
12/28/2001  12:51p              139 Entries
```

-continued

| | | | |
|---|---|---:|---|
| 12/28/2001 | 12:51p | 24 | Repository |
| 12/28/2001 | 12:51p | 40 | Root |
| | 3 File(s) | 203 bytes | |

Directory of F:\Send\ExtLibraries\graphviz-1.7.7\fdp

| | | | |
|---|---|---:|---|
| 12/28/2001 | 12:51p | 5,603 | adjust.c |
| 12/28/2001 | 12:51p | 112 | adjust.h |
| 12/28/2001 | 12:51p | 824 | component.c |
| 12/28/2001 | 12:51p | 170 | component.h |
| 12/28/2001 | 12:51p | 1,860 | exprval.c |
| 12/28/2001 | 12:51p | 568 | exprval.h |
| 12/28/2001 | 12:51p | 3,748 | grid.c |
| 12/28/2001 | 12:51p | 625 | grid.h |
| 12/28/2001 | 12:51p | 12,445 | il.c |
| 12/28/2001 | 12:51p | 692 | macros.h |
| 12/28/2001 | 12:51p | 10,927 | Makefile |
| 12/28/2001 | 12:51p | 520 | Makefile.am |
| 12/28/2001 | 12:51p | 11,461 | Makefile.in |
| 12/28/2001 | 12:51p | 3,894 | options.c |
| 12/28/2001 | 12:51p | 381 | options.h |
| 12/28/2001 | 12:51p | 1,229 | structs.h |
| | 16 File(s) | 55,059 bytes | |

Directory of F:\Send\ExtLibraries\graphviz-1.7.7\gd

| | | | |
|---|---|---:|---|
| 12/28/2001 | 12:51p | 4,211 | bdftogd |
| 12/28/2001 | 12:51p | 39,981 | gd.c |
| 12/28/2001 | 12:51p | 10,683 | gd.h |
| 12/28/2001 | 12:51p | 1,360 | gd2copypal.c |
| 12/28/2001 | 12:51p | 1,298 | gd2time.c |
| 12/28/2001 | 12:51p | 910 | gd2topng.c |
| 12/28/2001 | 12:51p | 5,116 | gdcache.c |
| 12/28/2001 | 12:51p | 2,756 | gdcache.h |
| 12/28/2001 | 12:51p | 3,051 | gddemo.c |
| 12/28/2001 | 12:51p | 81,853 | gdfontg.c |
| 12/28/2001 | 12:51p | 519 | gdfontg.h |
| 12/28/2001 | 12:51p | 78,780 | gdfontl.c |
| 12/28/2001 | 12:51p | 518 | gdfontl.h |
| 12/28/2001 | 12:51p | 58,280 | gdfontmb.c |
| 12/28/2001 | 12:51p | 479 | gdfontmb.h |
| 12/28/2001 | 12:51p | 51,606 | gdfonts.c |
| 12/28/2001 | 12:51p | 480 | gdfonts.h |
| 12/28/2001 | 12:51p | 29,618 | gdfontt.c |
| 12/28/2001 | 12:51p | 513 | gdfontt.h |
| 12/28/2001 | 12:51p | 21,671 | gdft.c |
| 12/28/2001 | 12:51p | 1,470 | gdhelpers.c |
| 12/28/2001 | 12:51p | 519 | gdhelpers.h |
| 12/28/2001 | 12:51p | 12,399 | gdkanji.c |
| 12/28/2001 | 12:51p | 1,170 | gdparttopng.c |
| 12/28/2001 | 12:51p | 6,214 | gdtables.c |
| 12/28/2001 | 12:51p | 9,578 | gdtest.c |
| 12/28/2001 | 12:51p | 2,732 | gdtestttf.c |
| 12/28/2001 | 12:51p | 907 | gdtopng.c |
| 12/28/2001 | 12:51p | 26,750 | gdttf.c |
| 12/28/2001 | 12:51p | 3,544 | gdxpm.c |
| 12/28/2001 | 12:51p | 4,112 | gd_gd.c |
| 12/28/2001 | 12:51p | 21,085 | gd_gd2.c |
| 12/28/2001 | 12:51p | 36,160 | gd_gif.c |
| 12/28/2001 | 12:51p | 3,093 | gd_io.c |
| 12/28/2001 | 12:51p | 956 | gd_io.h |
| 12/28/2001 | 12:51p | 7,702 | gd_io_dp.c |
| 12/28/2001 | 12:51p | 2,557 | gd_io_file.c |
| 12/28/2001 | 12:51p | 2,898 | gd_io_ss.c |
| 12/28/2001 | 12:51p | 24,192 | gd_jpeg.c |
| 12/28/2001 | 12:51p | 22,928 | gd_png.c |
| 12/28/2001 | 12:51p | 897 | gd_ss.c |
| 12/28/2001 | 12:51p | 5,370 | gd_wbmp.c |
| 12/28/2001 | 12:51p | 893 | giftogd.c |
| 12/28/2001 | 12:51p | 137,760 | index.html |
| 12/28/2001 | 12:51p | 38 | install-item |
| 12/28/2001 | 12:51p | 72,555 | jisx0208.h |

-continued

| | | | |
|---|---|---:|---|
| 12/28/2001 | 12:51p | 606 | libgd.1a |
| 12/28/2001 | 12:51p | 11,867 | Makefile |
| 12/28/2001 | 12:51p | 1,261 | Makefile.am |
| 12/28/2001 | 12:51p | 12,417 | Makefile.IN |
| 12/28/2001 | 12:51p | 3,686 | Makefile.nt |
| 12/28/2001 | 12:51p | 5,850 | Makefile.orig |
| 12/28/2001 | 12:51p | 926 | mathmake.c |
| 12/28/2001 | 12:51p | 754 | nmakefile |
| 12/28/2001 | 12:51p | 907 | pngtogd.c |
| 12/28/2001 | 12:51p | 1,149 | pngtogd2.c |
| 12/28/2001 | 12:51p | 132,756 | readme.txt |
| 12/28/2001 | 12:51p | 6,928 | wbmp.c |
| 12/28/2001 | 12:51p | 1,271 | wbmp.h |
| 12/28/2001 | 12:51p | 5,149 | webpng.c |
| | 60 File(s) | 987,689 bytes | |

Directory of F:\Send\ExtLibraries\graphviz-1.7.7\gd\test

| | | | |
|---|---|---:|---|
| 12/28/2001 | 12:51p | 28,877 | gdtest.gd2 |
| | 1 File(s) | 28,877 bytes | |

Directory of F:\Send\ExtLibraries\graphviz-1.7.7\gdtclft

| | | | |
|---|---|---:|---|
| 12/28/2001 | 12:51p | 40,491 | gdtclft.c |
| 12/28/2001 | 12:51p | 12,039 | gdtclft.n |
| 12/28/2001 | 12:51p | 16,611 | Makefile |
| 12/28/2001 | 12:51p | 848 | Makefile.am |
| 12/28/2001 | 12:51p | 17,188 | Makefile.IN |
| 12/28/2001 | 12:51p | 127 | nmakefile |
| | 6 File(s) | 87,304 bytes | |

Directory of F:\Send\ExtLibraries\graphviz-1.7.7\gdtclft\demo

| | | | |
|---|---|---:|---|
| 12/28/2001 | 12:51p | 1,684 | entities |
| 12/28/2001 | 12:51p | 44,391 | entities.html |
| 12/28/2001 | 12:51p | 291 | entities.README |
| 12/28/2001 | 12:51p | 9,291 | Makefile |
| 12/28/2001 | 12:51p | 234 | Makefile.am |
| 12/28/2001 | 12:51p | 9,767 | Makefile.in |
| | 6 File(s) | 65,658 bytes | |

Directory of F:\Send\ExtLibraries\graphviz-1.7.7\geo

| | | | |
|---|---|---:|---|
| 12/28/2001 | 12:51p | 3,680 | geo.c |
| 12/28/2001 | 12:51p | 10,618 | Makefile |
| 12/28/2001 | 12:51p | 307 | Makefile.am |
| 12/28/2001 | 12:51p | 11,152 | Makefile.in |
| | 4 File(s) | 25,757 bytes | |

Directory of F:\Send\ExtLibraries\graphviz-1.7.7\graph

| | | | |
|---|---|---:|---|
| 12/28/2001 | 12:51p | 6,770 | attribs.c |
| 12/28/2001 | 12:51p | 6,214 | edge.c |
| 12/28/2001 | 12:51p | 10,088 | graph.3 |
| 12/28/2001 | 12:51p | 8,842 | graph.c |
| 12/28/2001 | 12:51p | 4,769 | graph.h |
| 12/28/2001 | 12:51p | 10,389 | graphio.c |
| 12/28/2001 | 12:51p | 6,382 | lexer.c |
| 12/28/2001 | 12:51p | 4,080 | libgraph.h |
| 12/28/2001 | 12:51p | 615 | libgraph.1a |
| 12/28/2001 | 12:51p | 12,989 | Makefile |
| 12/28/2001 | 12:51p | 799 | Makefile.am |

-continued

| | | | |
|---|---|---|---|
| 12/28/2001 | 12:51p | 13,523 | Makefile.IN |
| 12/28/2001 | 12:51p | 303 | nmakefile |
| 12/28/2001 | 12:51p | 2,984 | node.c |
| 12/28/2001 | 12:51p | 38,655 | parser.c |
| 12/28/2001 | 12:51p | 11,243 | parser.grammar |
| 12/28/2001 | 12:51p | 315 | parser.h |
| 12/28/2001 | 12:51p | 8,877 | parser.y |
| 12/28/2001 | 12:51p | 1,915 | refstr.c |
| 12/28/2001 | 12:51p | 2,570 | trie.c |
| 12/28/2001 | 12:51p | 2,836 | triefa.cP |
| 12/28/2001 | 12:51p | 1,210 | triefa.h |
| | 22 File(s) | 156,368 bytes | |

Directory of F:\Send\ExtLibraries\graphviz-1.7.7\graphs
| | | | |
|---|---|---|---|
| 12/28/2001 | 12:51p | 11,517 | Makefile |
| 12/28/2001 | 12:51p | 118 | Makefile.am |
| 12/28/2001 | 12:51p | 12,005 | Makefile.in |
| | 3 File(s) | 23,640 bytes | |

Directory of F:\Send\ExtLibraries\graphviz-1.7.7\graphs\directed
| | | | |
|---|---|---|---|
| 12/28/2001 | 12:51p | 851 | abstract.dot |
| 12/28/2001 | 12:51p | 990 | alf.dot |
| 12/28/2001 | 12:51p | 7,493 | awilliams.dot |
| 12/28/2001 | 12:51p | 278 | clust.dot |
| 12/28/2001 | 12:51p | 154 | clust1.dot |
| 12/28/2001 | 12:51p | 154 | clust2.dot |
| 12/28/2001 | 12:51p | 154 | clust3.dot |
| 12/28/2001 | 12:51p | 428 | clust4.dot |
| 12/28/2001 | 12:51p | 263 | clust5.dot |
| 12/28/2001 | 12:51p | 5,676 | crazy.dot |
| 12/28/2001 | 12:51p | 444 | ctext.dot |
| 12/28/2001 | 12:51p | 993 | dfa.dot |
| 12/28/2001 | 12:51p | 909 | fig6.dot |
| 12/28/2001 | 12:51p | 625 | fsm.dot |
| 12/28/2001 | 12:51p | 1,373 | grammar.dot |
| 12/28/2001 | 12:51p | 652 | hashtable.dot |
| 12/28/2001 | 12:51p | 822 | jcctree.dot |
| 12/28/2001 | 12:51p | 6,339 | jsort.dot |
| 12/28/2001 | 12:51p | 436 | KW91.dot |
| 12/28/2001 | 12:51p | 5,571 | ldbxtried.dot |
| 12/28/2001 | 12:51p | 9,162 | Makefile |
| 12/28/2001 | 12:51p | 926 | Makefile.am |
| 12/28/2001 | 12:51p | 9,638 | Makefile.in |
| 12/28/2001 | 12:51p | 423 | mike.dot |
| 12/28/2001 | 12:51p | 2,798 | NaN.dot |
| 12/28/2001 | 12:51p | 392 | newarrows.dot |
| 12/28/2001 | 12:51p | 352 | nhg.dot |
| 12/28/2001 | 12:51p | 2,705 | pgram.dot |
| 12/28/2001 | 12:51p | 2,146 | pm2way.dot |
| 12/28/2001 | 12:51p | 3,718 | pmpipe.dot |
| 12/28/2001 | 12:51p | 5,317 | polypoly.dot |
| 12/28/2001 | 12:51p | 6,564 | proc3d.dot |
| 12/28/2001 | 12:51p | 432 | records.dot |
| 12/28/2001 | 12:51p | 837 | rowe.dot |
| 12/28/2001 | 12:51p | 1,157 | shells.dot |
| 12/28/2001 | 12:51p | 514 | states.dot |
| 12/28/2001 | 12:51p | 315 | structs.dot |
| 12/28/2001 | 12:51p | 807 | train11.dot |
| 12/28/2001 | 12:51p | 1,563 | trapeziumlr.dot |
| 12/28/2001 | 12:51p | 608 | tree.dot |
| 12/28/2001 | 12:51p | 1,724 | triedds.dot |
| 12/28/2001 | 12:51p | 178 | try.dot |
| 12/28/2001 | 12:51p | 1,486 | unix.dot |
| 12/28/2001 | 12:51p | 1,782 | unix2.dot |
| 12/28/2001 | 12:51p | 1,831 | viewfile.dot |
| 12/28/2001 | 12:51p | 1,047 | world.dot |
| | 46 File(s) | 93,027 bytes | |

Directory of F:\Send\ExtLibraries\graphviz-1.7.7\graphs\undirected
| | | | |
|---|---|---|---|
| 12/28/2001 | 12:51p | 672 | ER.dot |
| 12/28/2001 | 12:51p | 8,766 | Makefile |
| 12/28/2001 | 12:51p | 476 | Makefile.am |
| 12/28/2001 | 12:51p | 9,242 | Makefile.in |
| 12/28/2001 | 12:51p | 1,857 | ngk10_4.dot |
| 12/28/2001 | 12:51p | 249 | process.dot |
| | 6 File(s) | 21,262 bytes | |

Directory of F:\Send\ExtLibraries\graphviz-1.7.7\grid
| | | | |
|---|---|---|---|
| 12/28/2001 | 12:51p | 4,331 | cutbox.c |
| 12/28/2001 | 12:51p | 10,569 | erbase.c |
| 12/28/2001 | 12:51p | 7,891 | grid.c |
| 12/28/2001 | 12:51p | 5,310 | grid.h |
| 12/28/2001 | 12:51p | 10,767 | Makefile |
| 12/28/2001 | 12:51p | 342 | Makefile.am |
| 12/28/2001 | 12:51p | 11,301 | Makefile.in |
| 12/28/2001 | 12:51p | 1,103 | print.c |
| 12/28/2001 | 12:51p | 12,368 | route.c |
| | 9 File(s) | 63,982 bytes | |

Directory of F:\Send\ExtLibraries\graphviz-1.7.7\incr
| | | | |
|---|---|---|---|
| 12/28/2001 | 12:51p | 1,360 | basic.c |
| 12/28/2001 | 12:51p | 4,627 | batch.c |
| 12/28/2001 | 12:51p | 2,735 | callback.c |
| 12/28/2001 | 12:51p | 458 | dispatch.c |
| 12/28/2001 | 12:51p | 5,060 | edgeclip.c |
| 12/28/2001 | 12:51p | 2,258 | engine.c |
| 12/28/2001 | 12:51p | 3,706 | engine.h |
| 12/28/2001 | 12:51p | 7,034 | incr.h |
| 12/28/2001 | 12:51p | 10,867 | Makefile |
| 12/28/2001 | 12:51p | 403 | Makefile.am |
| 12/28/2001 | 12:51p | 11,401 | Makefile.in |
| 12/28/2001 | 12:51p | 6,135 | model.c |
| 12/28/2001 | 12:51p | 4,749 | routem.c |
| | 13 File(s) | 60,793 bytes | |

Directory of F:\Send\ExtLibraries\graphviz-1.7.7\lefty
| | | | |
|---|---|---|---|
| 12/28/2001 | 12:51p | 2,459 | code.c |
| 12/28/2001 | 12:51p | 1,833 | code.h |
| 12/28/2001 | 12:51p | 17,155 | colors.txt |
| 12/28/2001 | 12:51p | 11,857 | common.c |
| 12/28/2001 | 12:51p | 1,943 | common.h |
| 12/28/2001 | 12:51p | 4,605 | display.c |
| 12/28/2001 | 12:51p | 689 | display.h |
| 12/28/2001 | 12:51p | 28,973 | exec.c |
| 12/28/2001 | 12:51p | 872 | exec.h |
| 12/28/2001 | 12:51p | 25,207 | g.c |
| 12/28/2001 | 12:51p | 11,686 | g.h |
| 12/28/2001 | 12:51p | 50,387 | gfxview.c |
| 12/28/2001 | 12:51p | 1,738 | gfxview.h |
| 12/28/2001 | 12:51p | 21,692 | internal.c |
| 12/28/2001 | 12:51p | 848 | internal.h |
| 12/28/2001 | 12:51p | 1,724 | io.h |
| 12/28/2001 | 12:51p | 3,496 | lefty.1 |
| 12/28/2001 | 12:51p | 11,418 | lefty.c |
| 12/28/2001 | 12:51p | 2,441 | lefty.psp |
| 12/28/2001 | 12:51p | 7,137 | lex.c |
| 12/28/2001 | 12:51p | 1,250 | lex.h |
| 12/28/2001 | 12:51p | 17,819 | Makefile |
| 12/28/2001 | 12:51p | 1,155 | Makefile.am |
| 12/28/2001 | 12:51p | 18,461 | Makefile.IN |
| 12/28/2001 | 12:51p | 10,962 | mem.c |
| 12/28/2001 | 12:51p | 1,660 | mem.h |
| 12/28/2001 | 12:51p | 1,096 | nmakefile |

-continued

```
12/28/2001    12:51p         15,170 parse.c
12/28/2001    12:51p            850 parse.h
12/28/2001    12:51p         13,267 str.c
12/28/2001    12:51p            822 str.h
12/28/2001    12:51p         18,654 tbl.c
12/28/2001    12:51p          3,774 tbl.h
12/28/2001    12:51p         19,834 txtview.c
12/28/2001    12:51p            834 txtview.h
              35 File(s)    333,768 bytes
```

```
Directory of
F:\Send\ExtLibraries\graphviz-1.7.7\lefty\aix_mods
12/28/2001    12:51p          1,414 common.h
12/28/2001    12:51p         28,496 exec.c
12/28/2001    12:51p         18,172 tbl.c
               3 File(s)     48,082 bytes
```

```
Directory of
F:\Send\ExtLibraries\graphviz-1.7.7\lefty\aix_mods\CVS
12/28/2001    12:51p            136 Entries
12/28/2001    12:51p             25 Repository
12/28/2001    12:51p             40 Root
               3 File(s)        201 bytes
```

```
Directory of F:\Send\ExtLibraries\graphviz-1.7.7\lefty\cs2l
12/28/2001    12:51p          1,113 cs2l.c
12/28/2001    12:51p            124 cs2l.h
12/28/2001    12:51p          8,543 Makefile
12/28/2001    12:51p            246 Makefile.am
12/28/2001    12:51p          9,018 Makefile.in
               5 File(s)     19,044 bytes
```

```
Directory of F:\Send\ExtLibraries\graphviz-1.7.7\lefty\dot2l
12/28/2001    12:51p         23,362 dot2l.c
12/28/2001    12:51p          1,100 dot2l.h
12/28/2001    12:51p          6,891 dotlex.c
12/28/2001    12:51p         33,001 dotparse.c
12/28/2001    12:51p            268 dotparse.h
12/28/2001    12:51p          3,505 dotparse.y
12/28/2001    12:51p          2,429 dottrie.c
12/28/2001    12:51p         11,337 Makefile
12/28/2001    12:51p            533 Makefile.am
12/28/2001    12:51p         11,868 Makefile.in
12/28/2001    12:51p          2,243 triefa.cP
12/28/2001    12:51p            798 triefa.h
              12 File(s)     97,335 bytes
```

```
Directory of
F:\Send\ExtLibraries\graphviz-1.7.7\lefty\examples
12/28/2001    12:51p          3,770 box.lefty
12/28/2001    12:51p            474 def.lefty
12/28/2001    12:51p          2,833 fractal.lefty
12/28/2001    12:51p          5,985 fractal2.lefty
12/28/2001    12:51p          8,616 Makefile
12/28/2001    12:51p            286 Makefile.am
12/28/2001    12:51p          9,092 Makefile.in
12/28/2001    12:51p          3,307 slides.lefty
```

```
12/28/2001    12:51p          5,079 tree.lefty
               9 File(s)     39,442 bytes
```

```
Directory of F:\Send\ExtLibraries\graphviz-1.7.7\lefty\os
12/28/2001    12:51p         11,489 Makefile
12/28/2001    12:51p             77 Makefile.am
12/28/2001    12:51p         11,974 Makefile.in
               3 File(s)     23,540 bytes
```

```
Directory of
F:\Send\ExtLibraries\graphviz-1.7.7\lefty\os\unix
12/28/2001    12:51p         10,245 io.c
12/28/2001    12:51p         10,547 Makefile
12/28/2001    12:51p            176 Makefile.am
12/28/2001    12:51p         11,075 Makefile.in
               4 File(s)     32,043 bytes
```

```
Directory of F:\Send\ExtLibraries\graphviz-1.7.7\lefty\ws
12/28/2001    12:51p         11,552 Makefile
12/28/2001    12:51p            102 Makefile.am
12/28/2001    12:51p         12,037 Makefile.in
               3 File(s)     23,691 bytes
```

```
Directory of
F:\Send\ExtLibraries\graphviz-1.7.7\lefty\ws\mswin32
12/28/2001    12:51p          9,586 garray.c
12/28/2001    12:51p          4,306 gbutton.c
12/28/2001    12:51p         43,610 gcanvas.c
12/28/2001    12:51p         22,815 gcommon.c
12/28/2001    12:51p          5,719 gcommon.h
12/28/2001    12:51p          4,526 glabel.c
12/28/2001    12:51p          2,535 gmenu.c
12/28/2001    12:51p         38,128 gpcanvas.c
12/28/2001    12:51p          6,684 gquery.c
12/28/2001    12:51p          6,186 gscroll.c
12/28/2001    12:51p          6,537 gtext.c
12/28/2001    12:51p          4,777 gview.c
12/28/2001    12:51p          2,424 lefty.rc
12/28/2001    12:51p            636 resource.h
              14 File(s)    158,469 bytes
```

```
Directory of
F:\Send\ExtLibraries\graphviz-1.7.7\lefty\ws\mswin32\CVS
12/28/2001    12:51p            653 Entries
12/28/2001    12:51p             27 Repository
12/28/2001    12:51p             40 Root
               3 File(s)        720 bytes
```

```
Directory of F:\Send\ExtLibraries\graphviz-1.7.7\lefty\ws\x11
12/28/2001    12:51p         16,447 garray.c
12/28/2001    12:51p          5,480 gbutton.c
12/28/2001    12:51p         52,762 gcanvas.c
12/28/2001    12:51p          5,981 gcommon.c
```

-continued

| | | | |
|---|---|---|---|
| 12/28/2001 | 12:51p | 6,780 | gcommon.h |
| 12/28/2001 | 12:51p | 6,112 | glabel.c |
| 12/28/2001 | 12:51p | 3,408 | gmenu.c |
| 12/28/2001 | 12:51p | 23,301 | gpcanvas.c |
| 12/28/2001 | 12:51p | 9,563 | gquery.c |
| 12/28/2001 | 12:51p | 7,609 | gscroll.c |
| 12/28/2001 | 12:51p | 8,516 | gtext.c |
| 12/28/2001 | 12:51p | 6,292 | gview.c |
| 12/28/2001 | 12:51p | 14,024 | Makefile |
| 12/28/2001 | 12:51p | 365 | Makefile.am |
| 12/28/2001 | 12:51p | 14,586 | Makefile.in |
| | 15 File(s) | 181,226 bytes | |

Directory of F:\Send\ExtLibraries\graphviz-1.7.7\lefty\ws\x11\libfilereq

| | | | |
|---|---|---|---|
| 12/28/2001 | 12:51p | 4,440 | Dir.c |
| 12/28/2001 | 12:51p | 17,904 | Draw.c |
| 12/28/2001 | 12:51p | 10,824 | Makefile |
| 12/28/2001 | 12:51p | 306 | Makefile.am |
| 12/28/2001 | 12:51p | 11,359 | Makefile.in |
| 12/28/2001 | 12:51p | 17,999 | Path.c |
| 12/28/2001 | 12:51p | 2,829 | README.selfile |
| 12/28/2001 | 12:51p | 22,428 | SelFile.c |
| 12/28/2001 | 12:51p | 3,650 | SFinternal.h |
| 12/28/2001 | 12:51p | 529 | xstat.h |
| | 10 File(s) | 92,268 bytes | |

Directory of F:\Send\ExtLibraries\graphviz-1.7.7\lneato

| | | | |
|---|---|---|---|
| 12/28/2001 | 12:51p | 1,573 | lneato.bsh |
| 12/28/2001 | 12:51p | 1,644 | lneato.ksh |
| 12/28/2001 | 12:51p | 1,575 | lneato.sh |
| 12/28/2001 | 12:51p | 7,759 | Makefile |
| 12/28/2001 | 12:51p | 330 | Makefile.am |
| 12/28/2001 | 12:51p | 8,237 | Makefile.IN |
| 12/28/2001 | 12:51p | 67 | nmakefile |
| | 7 File(s) | 21,185 bytes | |

Directory of F:\Send\ExtLibraries\graphviz-1.7.7\lneato\mswin32

| | | | |
|---|---|---|---|
| 12/28/2001 | 12:51p | 152 | doinst |
| 12/28/2001 | 12:51p | 2,431 | lneato.c |
| 12/28/2001 | 12:51p | 6,462 | lneato.mak |
| | 3 File(s) | 9,045 bytes | |

Directory of F:\Send\ExtLibraries\graphviz-1.7.7\lneato\mswin32\CVS

| | | | |
|---|---|---|---|
| 12/28/2001 | 12:51p | 141 | Entries |
| 12/28/2001 | 12:51p | 25 | Repository |
| 12/28/2001 | 12:51p | 40 | Root |
| | 3 File(s) | 206 bytes | |

Directory of F:\Send\ExtLibraries\graphviz-1.7.7\makearch

| | | | |
|---|---|---|---|
| 12/28/2001 | 12:51p | 462 | aix41 |
| 12/28/2001 | 12:51p | 644 | hp.pa |
| 12/28/2001 | 12:51p | 444 | linux.i386 |
| 12/28/2001 | 12:51p | 394 | netbsd.i386 |
| 12/28/2001 | 12:51p | 391 | osf.alpha |

-continued

| | | | |
|---|---|---|---|
| 12/28/2001 | 12:51p | 411 | sgi.mips2 |
| 12/28/2001 | 12:51p | 442 | sgi.mips3 |
| 12/28/2001 | 12:51p | 573 | sol.i386 |
| 12/28/2001 | 12:51p | 558 | sol.sun4 |
| 12/28/2001 | 12:51p | 560 | sol6.sun4 |
| 12/28/2001 | 12:51p | 353 | sun4 |
| | 11 File(s) | 5,232 bytes | |

Directory of F:\Send\ExtLibraries\graphviz-1.7.7\makearch\CVS

| | | | |
|---|---|---|---|
| 12/28/2001 | 12:51p | 464 | Entries |
| 12/28/2001 | 12:51p | 19 | Repository |
| 12/28/2001 | 12:51p | 40 | Root |
| | 3 File(s) | 523 bytes | |

Directory of F:\Send\ExtLibraries\graphviz-1.7.7\ns

| | | | |
|---|---|---|---|
| 12/28/2001 | 12:51p | 10,644 | Makefile |
| 12/28/2001 | 12:51p | 282 | Makefile.am |
| 12/28/2001 | 12:51p | 11,178 | Makefile.in |
| 12/28/2001 | 12:51p | 20,299 | ns.c |
| 12/28/2001 | 12:51p | 399 | ns.h |
| 12/28/2001 | 12:51p | 604 | nspvt.h |
| | 6 File(s) | 43,406 bytes | |

Directory of F:\Send\ExtLibraries\graphviz-1.7.7\pathplan

| | | | |
|---|---|---|---|
| 12/28/2001 | 12:51p | 7,178 | cvt.c |
| 12/28/2001 | 12:51p | 2,472 | inpoly.c |
| 12/28/2001 | 12:51p | 624 | libpathplan.1a |
| 12/28/2001 | 12:51p | 12,411 | Makefile |
| 12/28/2001 | 12:51p | 488 | Makefile.am |
| 12/28/2001 | 12:51p | 12,945 | Makefile.IN |
| 12/28/2001 | 12:51p | 405 | nmakefile |
| 12/28/2001 | 12:51p | 6,798 | path.lefty |
| 12/28/2001 | 12:51p | 949 | pathgeom.h |
| 12/28/2001 | 12:51p | 2,845 | pathplan.3 |
| 12/28/2001 | 12:51p | 1,253 | pathplan.h |
| 12/28/2001 | 12:51p | 970 | pathutil.h |
| 12/28/2001 | 12:51p | 1,237 | README |
| 12/28/2001 | 12:51p | 18,574 | route.c |
| 12/28/2001 | 12:51p | 17,447 | shortest.c |
| 12/28/2001 | 12:51p | 3,120 | shortestpth.c |
| 12/28/2001 | 12:51p | 2,782 | solvers.c |
| 12/28/2001 | 12:51p | 693 | solvers.h |
| 12/28/2001 | 12:51p | 598 | tri.h |
| 12/28/2001 | 12:51p | 4,837 | triang.c |
| 12/28/2001 | 12:51p | 1,375 | util.c |
| 12/28/2001 | 12:51p | 1,414 | vis.h |
| 12/28/2001 | 12:51p | 11,846 | visibility.c |
| 12/28/2001 | 12:51p | 1,329 | vispath.h |
| | 24 File(s) | 114,590 bytes | |

Directory of F:\Send\ExtLibraries\graphviz-1.7.7\shape

| | | | |
|---|---|---|---|
| 12/28/2001 | 12:51p | 3,558 | inpoly.c |
| 12/28/2001 | 12:51p | 10,702 | Makefile |
| 12/28/2001 | 12:51p | 288 | Makefile.am |
| 12/28/2001 | 12:51p | 11,236 | Makefile.in |
| 12/28/2001 | 12:51p | 2,158 | shape.c |
| 12/28/2001 | 12:51p | 1,448 | shape.h |
| | 6 File(s) | 29,390 bytes | |

```
Directory of F:\Send\ExtLibraries\graphviz-1.7.7\tcldgl
12/28/2001  12:51p           5,958 dgl.c
12/28/2001  12:51p           3,531 dgl.h
12/28/2001  12:51p          11,692 dglayout.c
12/28/2001  12:51p          16,976 dglshape.c
12/28/2001  12:51p          10,908 dglutil.c
12/28/2001  12:51p          17,134 Makefile
12/28/2001  12:51p           1,141 Makefile.am
12/28/2001  12:51p          17,709 Makefile.in
12/28/2001  12:51p          13,501 tcldgl.n
         9 File(s)      98,550 bytes Directory of F:\Send\ExtLibraries\graphviz-1.7.7\tcldgl\demo
12/28/2001  12:51p          24,728 dge
12/28/2001  12:51p           1,486 dge.example1.dot
12/28/2001  12:51p           6,682 dge.example2.dot
12/28/2001  12:51p             489 dge.README
12/28/2001  12:51p           9,300 Makefile
12/28/2001  12:51p             245 Makefile.am
12/28/2001  12:51p           9,776 Makefile.in
         7 File(s)      52,706 bytes Directory of F:\Send\ExtLibraries\graphviz-1.7.7\tcldgr
12/28/2001  12:51p           6,059 dgedge.c
12/28/2001  12:51p          11,642 dgnode.c
12/28/2001  12:51p           7,695 dgr.c
12/28/2001  12:51p           2,735 dgr.h
12/28/2001  12:51p          24,450 dgraph.c
12/28/2001  12:51p          18,377 dgrutil.c
12/28/2001  12:51p          16,727 Makefile
12/28/2001  12:51p             876 Makefile.am
12/28/2001  12:51p          17,302 Makefile.in
12/28/2001  12:51p          27,019 tcldgr.n
        10 File(s)     132,882 bytes Directory of F:\Send\ExtLibraries\graphviz-1.7.7\tcldgr\demo
12/28/2001  12:51p           6,465 ihi
12/28/2001  12:51p             991 ihi.README
12/28/2001  12:51p              43 ihi.testdata
12/28/2001  12:51p           9,278 Makefile
12/28/2001  12:51p             225 Makefile.am
12/28/2001  12:51p           9,754 Makefile.in
         6 File(s)      26,756 bytes Directory of F:\Send\ExtLibraries\graphviz-1.7.7\tcldot
12/28/2001  12:51p          17,226 Makefile
12/28/2001  12:51p           1,292 Makefile.am
12/28/2001  12:51p          17,813 Makefile.IN
12/28/2001  12:51p             523 nmakefile
12/28/2001  12:51p           2,295 README
12/28/2001  12:51p             418 README.Tkspline
12/28/2001  12:51p          43,963 tcldot.c
12/28/2001  12:51p             137 tcldot.h
12/28/2001  12:51p          15,368 tcldot.n
12/28/2001  12:51p          13,901 tkgen.c
        10 File(s)     112,936 bytes Directory of F:\Send\ExtLibraries\graphviz-1.7.7\tcldot\demo
12/28/2001  12:51p          21,006 doted
12/28/2001  12:51p             394 doted.README
12/28/2001  12:51p           9,269 Makefile
12/28/2001  12:51p             214 Makefile.am
12/28/2001  12:51p           9,745 Makefile.in
         5 File(s)      40,628 bytes Directory of F:\Send\ExtLibraries\graphviz-1.7.7\tclhandle
12/28/2001  12:51p          10,721 Makefile
12/28/2001  12:51p             255 Makefile.am
12/28/2001  12:51p          11,255 Makefile.IN
12/28/2001  12:51p              62 nmakefile
12/28/2001  12:51p          13,385 tclhandle.c
12/28/2001  12:51p           3,230 tclhandle.h
         6 File(s)      38,908 bytes Directory of F:\Send\ExtLibraries\graphviz-1.7.7\tclpathplan
12/28/2001  12:51p           2,626 find_ints.c
12/28/2001  12:51p           3,470 intersect.c
12/28/2001  12:51p             875 makecw.c
12/28/2001  12:51p          15,263 Makefile
12/28/2001  12:51p             745 Makefile.am
12/28/2001  12:51p          15,838 Makefile.in
12/28/2001  12:51p           1,001 simple.h
12/28/2001  12:51p          24,300 tclpathplan.c
12/28/2001  12:51p           3,531 wrapper.c
         9 File(s)      67,649 bytes Directory of F:\Send\ExtLibraries\graphviz-1.7.7\tclpathplan\demo
12/28/2001  12:51p          13,370 Makefile
12/28/2001  12:51p             250 Makefile.am
12/28/2001  12:51p          13,856 Makefile.in
12/28/2001  12:51p          17,625 pathplan
12/28/2001  12:51p             420 pathplan.README
         5 File(s)      45,521 bytes Directory of F:\Send\ExtLibraries\graphviz-1.7.7\tclpathplan\demo\pathplan_data
12/28/2001  12:51p             291 boxes.dat
12/28/2001  12:51p             640 dpd.dat
12/28/2001  12:51p             185 funny.dat
12/28/2001  12:51p           8,704 Makefile
12/28/2001  12:51p             345 Makefile.am
12/28/2001  12:51p           9,177 Makefile.in
12/28/2001  12:51p           1,391 maze.dat
12/28/2001  12:51p             238 nested.dat
12/28/2001  12:51p             238 northo.dat
12/28/2001  12:51p             510 obs.dat
12/28/2001  12:51p              36 other.dat
12/28/2001  12:51p              23 paths.dat
12/28/2001  12:51p             696 rotor.dat
12/28/2001  12:51p             640 u.dat
12/28/2001  12:51p              30 unknown.dat
        15 File(s)      23,144 bytes Directory of F:\Send\ExtLibraries\graphviz-1.7.7\tclstubs
12/28/2001  12:51p          10,777 Makefile
12/28/2001  12:51p             397 Makefile.am
12/28/2001  12:51p          11,349 Makefile.IN
12/28/2001  12:51p              62 nmakefile
```

-continued

| | | | |
|---|---|---|---|
| 12/28/2001 | 12:51p | 296 | README |
| 12/28/2001 | 12:51p | 60 | tclStubLib.c |
| 6 File(s) | | 22,941 bytes | |

Directory of F:\Send\ExtLibraries\graphviz-1.7.7\tkspline

| | | | |
|---|---|---|---|
| 12/28/2001 | 12:51p | 16,466 | Makefile |
| 12/28/2001 | 12:51p | 732 | Makefile.am |
| 12/28/2001 | 12:51p | 17,074 | Makefile.in |
| 12/28/2001 | 12:51p | 508 | README |
| 12/28/2001 | 12:51p | 7,596 | tkspline.c |
| 12/28/2001 | 12:51p | 7,369 | tkspline.n |
| 6 File(s) | | 49,745 bytes | |

Directory of F:\Send\ExtLibraries\graphviz-1.7.7\tkspline\demo

| | | | |
|---|---|---|---|
| 12/28/2001 | 12:51p | 9,275 | Makefile |
| 12/28/2001 | 12:51p | 216 | Makefile.am |
| 12/28/2001 | 12:51p | 9,751 | Makefile.in |
| 12/28/2001 | 12:51p | 4,549 | spline |
| 12/28/2001 | 12:51p | 267 | spline.README |
| 5 File(s) | | 24,058 bytes | |

Directory of F:\Send\ExtLibraries\graphviz-1.7.7\tkstubs

| | | | |
|---|---|---|---|
| 12/28/2001 | 12:51p | 10,845 | Makefile |
| 12/28/2001 | 12:51p | 403 | Makefile.am |
| 12/28/2001 | 12:51p | 11,415 | Makefile.in |
| 12/28/2001 | 12:51p | 295 | README |
| 12/28/2001 | 12:51p | 60 | tkStubImg.c |
| 12/28/2001 | 12:51p | 60 | tkStubLib.c |
| 6 File(s) | | 23,078 bytes | |

Directory of F:\Send\ExtLibraries\graphviz-1.7.7\tools

| | | | |
|---|---|---|---|
| 12/28/2001 | 12:51p | 72,985 | iffe |
| 12/28/2001 | 12:51p | 11,532 | Makefile |
| 12/28/2001 | 12:51p | 135 | Makefile.am |
| 12/28/2001 | 12:51p | 12,020 | Makefile.IN |
| 4 File(s) | | 96,672 bytes | |

Directory of F:\Send\ExtLibraries\graphviz-1.7.7\tools\ast

| | | | |
|---|---|---|---|
| 12/28/2001 | 12:51p | 3,033 | align.h |
| 12/28/2001 | 12:51p | 1,998 | ast.h |
| 12/28/2001 | 12:51p | 1,714 | chresc.c |
| 12/28/2001 | 12:51p | 539 | chrtoi.c |
| 12/28/2001 | 12:51p | 1,621 | error.c |
| 12/28/2001 | 12:51p | 1,037 | error.h |
| 12/28/2001 | 12:51p | 432 | fmtbuf.c |
| 12/28/2001 | 12:51p | 2,393 | fmtesc.c |
| 12/28/2001 | 12:51p | 1,207 | hashkey.h |
| 12/28/2001 | 12:51p | 11,418 | Makefile |
| 12/28/2001 | 12:51p | 550 | Makefile.am |
| 12/28/2001 | 12:51p | 11,949 | Makefile.IN |
| 12/28/2001 | 12:51p | 1,265 | pathaccess.c |
| 12/28/2001 | 12:51p | 332 | pathbin.c |
| 12/28/2001 | 12:51p | 3,780 | pathcanon.c |
| 12/28/2001 | 12:51p | 515 | pathcat.c |
| 12/28/2001 | 12:51p | 2,278 | pathfind.c |
| 12/28/2001 | 12:51p | 1,375 | pathgetlink.c |
| 12/28/2001 | 12:51p | 2,078 | pathpath.c |

-continued

| | | | |
|---|---|---|---|
| 12/28/2001 | 12:51p | 1,181 | sfstr.h |
| 12/28/2001 | 12:51p | 235 | strcopy.c |
| 12/28/2001 | 12:51p | 365 | strerror.c |
| 12/28/2001 | 12:51p | 501 | stresc.c |
| 12/28/2001 | 12:51p | 17,148 | strmatch.c |
| 12/28/2001 | 12:51p | 3,979 | strton.c |
| 25 File(s) | | 72,923 bytes | |

Directory of F:\Send\ExtLibraries\graphviz-1.7.7\tools\expr

| | | | |
|---|---|---|---|
| 12/28/2001 | 12:51p | 14,062 | excc.c |
| 12/28/2001 | 12:51p | 1,078 | excontext.c |
| 12/28/2001 | 12:51p | 1,360 | exdata.c |
| 12/28/2001 | 12:51p | 741 | exerror.c |
| 12/28/2001 | 12:51p | 32,024 | exeval.c |
| 12/28/2001 | 12:51p | 600 | exexpr.c |
| 12/28/2001 | 12:51p | 15,749 | exgram.h |
| 12/28/2001 | 12:51p | 810 | exlexname.c |
| 12/28/2001 | 12:51p | 4,590 | exlib.h |
| 12/28/2001 | 12:51p | 1,408 | exopen.c |
| 12/28/2001 | 12:51p | 73,496 | exparse.c |
| 12/28/2001 | 12:51p | 23,169 | exparse.y |
| 12/28/2001 | 12:51p | 1,819 | expr.3 |
| 12/28/2001 | 12:51p | 8,037 | expr.h |
| 12/28/2001 | 12:51p | 856 | exrewind.c |
| 12/28/2001 | 12:51p | 13,929 | extoken.c |
| 12/28/2001 | 12:51p | 439 | extype.c |
| 12/28/2001 | 12:51p | 436 | exzero.c |
| 12/28/2001 | 12:51p | 13,685 | Makefile |
| 12/28/2001 | 12:51p | 1,426 | Makefile.am |
| 12/28/2001 | 12:51p | 14,185 | Makefile.IN |
| 12/28/2001 | 12:51p | 1,563 | Makefile.nmake |
| 12/28/2001 | 12:51p | 1,548 | Makefile.orig |
| 12/28/2001 | 12:51p | 1,630 | RELEASE |
| 24 File(s) | | 228,640 bytes | |

Directory of F:\Send\ExtLibraries\graphviz-1.7.7\tools\gpr

| | | | |
|---|---|---|---|
| 12/28/2001 | 12:51p | 1,950 | actions.c |
| 12/28/2001 | 12:51p | 169 | actions.h |
| 12/28/2001 | 12:51p | 20,098 | compile.c |
| 12/28/2001 | 12:51p | 879 | compile.h |
| 12/28/2001 | 12:51p | 11,355 | gpr.1 |
| 12/28/2001 | 12:51p | 8,287 | gpr.c |
| 12/28/2001 | 12:51p | 1,651 | gprdata |
| 12/28/2001 | 12:51p | 640 | gprstate.c |
| 12/28/2001 | 12:51p | 547 | gprstate.h |
| 12/28/2001 | 12:51p | 16,761 | Makefile |
| 12/28/2001 | 12:51p | 1,003 | Makefile.am |
| 12/28/2001 | 12:51p | 17,320 | Makefile.IN |
| 12/28/2001 | 12:51p | 4,044 | mkdefs.c |
| 12/28/2001 | 12:51p | 9,754 | parse.c |
| 12/28/2001 | 12:51p | 679 | parse.h |
| 12/28/2001 | 12:51p | 951 | queue.c |
| 12/28/2001 | 12:51p | 488 | queue.h |
| 17 File(s) | | 96,576 bytes | |

Directory of F:\Send\ExtLibraries\graphviz-1.7.7\tools\sfio

| | | | |
|---|---|---|---|
| 12/28/2001 | 12:51p | 15,977 | Makefile |
| 12/28/2001 | 12:51p | 1,425 | Makefile.am |
| 12/28/2001 | 12:52p | 16,522 | Makefile.IN |
| 12/28/2001 | 12:52p | 6,219 | Makefile.orig |
| 12/28/2001 | 12:52p | 2,567 | README |
| 12/28/2001 | 12:52p | 2,939 | sfclose.c |
| 12/28/2001 | 12:52p | 834 | sfclrlock.c |
| 12/28/2001 | 12:52p | 4,588 | sfcvt.c |
| 12/28/2001 | 12:52p | 3,482 | sfdisc.c |
| 12/28/2001 | 12:52p | 617 | sfdlen.c |

-continued

| | | | |
|---|---|---|---|
| 12/28/2001 | 12:52p | 2,574 | sfexcept.c |
| 12/28/2001 | 12:52p | 2,644 | sfexit.c |
| 12/28/2001 | 12:52p | 2,108 | sfextern.c |
| 12/28/2001 | 12:52p | 363 | sffcvt.c |
| 12/28/2001 | 12:52p | 2,404 | sffilbuf.c |
| 12/28/2001 | 12:52p | 2,016 | sfflsbuf.c |
| 12/28/2001 | 12:52p | 904 | sfgetd.c |
| 12/28/2001 | 12:52p | 884 | sfgetl.c |
| 12/28/2001 | 12:52p | 801 | sfgetm.c |
| 12/28/2001 | 12:52p | 2,755 | sfgetr.c |
| 12/28/2001 | 12:52p | 755 | sfgetu.c |
| 12/28/2001 | 12:52p | 29,501 | sfhdr.h |
| 12/28/2001 | 12:52p | 16,306 | sfio.h |
| 12/28/2001 | 12:52p | 3,694 | sfio_t.h |
| 12/28/2001 | 12:52p | 300 | sfllen.c |
| 12/28/2001 | 12:52p | 11,827 | sfmode.c |
| 12/28/2001 | 12:52p | 6,095 | sfmove.c |
| 12/28/2001 | 12:52p | 838 | sfmutex.c |
| 12/28/2001 | 12:52p | 2,673 | sfnew.c |
| 12/28/2001 | 12:52p | 288 | sfnotify.c |
| 12/28/2001 | 12:52p | 1,094 | sfnputc.c |
| 12/28/2001 | 12:52p | 4,341 | sfopen.c |
| 12/28/2001 | 12:52p | 5,246 | sfpkrd.c |
| 12/28/2001 | 12:52p | 4,603 | sfpoll.c |
| 12/28/2001 | 12:52p | 7,203 | sfpool.c |
| 12/28/2001 | 12:52p | 6,027 | sfpopen.c |
| 12/28/2001 | 12:52p | 1,445 | sfprintf.c |
| 12/28/2001 | 12:52p | 877 | sfprints.c |
| 12/28/2001 | 12:52p | 1,605 | sfpurge.c |
| 12/28/2001 | 12:52p | 1,473 | sfputd.c |
| 12/28/2001 | 12:52p | 1,255 | sfputl.c |
| 12/28/2001 | 12:52p | 1,230 | sfputm.c |
| 12/28/2001 | 12:52p | 1,900 | sfputr.c |
| 12/28/2001 | 12:52p | 1,130 | sfputu.c |
| 12/28/2001 | 12:52p | 1,078 | sfraise.c |
| 12/28/2001 | 12:52p | 6,582 | sfrd.c |
| 12/28/2001 | 12:52p | 2,700 | sfread.c |
| 12/28/2001 | 12:52p | 3,291 | sfreserve.c |
| 12/28/2001 | 12:52p | 1,137 | sfresize.c |
| 12/28/2001 | 12:52p | 1,358 | sfscanf.c |
| 12/28/2001 | 12:52p | 6,219 | sfseek.c |
| 12/28/2001 | 12:52p | 1,470 | sfset.c |
| 12/28/2001 | 12:52p | 7,921 | sfsetbuf.c |
| 12/28/2001 | 12:52p | 2,291 | sfsetfd.c |
| 12/28/2001 | 12:52p | 1,810 | sfsize.c |
| 12/28/2001 | 12:52p | 1,734 | sfsk.c |
| 12/28/2001 | 12:52p | 2,018 | sfstack.c |
| 12/28/2001 | 12:52p | 2,606 | sfstrtod.c |
| 12/28/2001 | 12:52p | 2,318 | sfswap.c |
| 12/28/2001 | 12:52p | 3,409 | sfsync.c |
| 12/28/2001 | 12:52p | 11,729 | sftable.c |
| 12/28/2001 | 12:52p | 838 | sftell.c |
| 12/28/2001 | 12:52p | 8,814 | sftmp.c |
| 12/28/2001 | 12:52p | 1,775 | sfungetc.c |
| 12/28/2001 | 12:52p | 24,994 | sfvprintf.c |
| 12/28/2001 | 12:52p | 18,547 | sfvscanf.c |
| 12/28/2001 | 12:52p | 4,861 | sfwr.c |
| 12/28/2001 | 12:52p | 3,026 | sfwrite.c |
| 12/28/2001 | 12:52p | 4,637 | vthread.h |
| | 69 File(s) | 311,492 bytes | |

Directory of F:\Send\ExtLibraries\graphviz-1.7.7\tools\sfio\features

| | | | |
|---|---|---|---|
| 12/28/2001 | 12:52p | 8,960 | common |
| 12/28/2001 | 12:52p | 12,049 | sfio |
| 12/28/2001 | 12:52p | 9,115 | stdio |
| | 3 File(s) | 30,124 bytes | |

Directory of F:\Send\ExtLibraries\graphviz-1.7.7\tools\sfio\features\CVS

| | | | |
|---|---|---|---|
| 12/28/2001 | 12:51p | 120 | Entries |
| 12/28/2001 | 12:51p | 30 | Repository |
| 12/28/2001 | 12:51p | 40 | Root |
| | 3 File(s) | 190 bytes | |

Directory of F:\Send\ExtLibraries\graphviz-1.7.7\tools\sfio\Sfio_dc

| | | | |
|---|---|---|---|
| 12/28/2001 | 12:52p | 11,797 | Makefile |
| 12/28/2001 | 12:52p | 948 | Makefile.am |
| 12/28/2001 | 12:52p | 12,334 | Makefile.IN |
| 12/28/2001 | 12:52p | 4,137 | sfdcdio.c |
| 12/28/2001 | 12:52p | 7,811 | sfdcdos.c |
| 12/28/2001 | 12:52p | 4,018 | sfdcfilter.c |
| 12/28/2001 | 12:52p | 41 | sfdchdr.h |
| 12/28/2001 | 12:52p | 10,249 | sfdclzw.c |
| 12/28/2001 | 12:52p | 3,439 | sfdcseekable.c |
| 12/28/2001 | 12:52p | 997 | sfdcslow.c |
| 12/28/2001 | 12:52p | 3,935 | sfdcsubstream.c |
| 12/28/2001 | 12:52p | 1,905 | sfdctee.c |
| 12/28/2001 | 12:52p | 3,703 | sfdcunion.c |
| 12/28/2001 | 12:52p | 575 | sfdisc.h |
| | 14 File(s) | 65,889 bytes | |

Directory of F:\Send\ExtLibraries\graphviz-1.7.7\tools\sfio\Sfio_f

| | | | |
|---|---|---|---|
| 12/28/2001 | 12:52p | 11,894 | Makefile |
| 12/28/2001 | 12:52p | 992 | Makefile.am |
| 12/28/2001 | 12:52p | 12,431 | Makefile.IN |
| 12/28/2001 | 12:52p | 162 | _sfclrerr.c |
| 12/28/2001 | 12:52p | 160 | _sfdlen.c |
| 12/28/2001 | 12:52p | 150 | _sfeof.c |
| 12/28/2001 | 12:52p | 158 | _sferror.c |
| 12/28/2001 | 12:52p | 162 | _sffileno.c |
| 12/28/2001 | 12:52p | 154 | _sfgetc.c |
| 12/28/2001 | 12:52p | 156 | _sfllen.c |
| 12/28/2001 | 12:52p | 182 | _sfputc.c |
| 12/28/2001 | 12:52p | 191 | _sfputd.c |
| 12/28/2001 | 12:52p | 187 | _sfputl.c |
| 12/28/2001 | 12:52p | 224 | _sfputm.c |
| 12/28/2001 | 12:52p | 189 | _sfputu.c |
| 12/28/2001 | 12:52p | 135 | _sfslen.c |
| 12/28/2001 | 12:52p | 166 | _sfstacked.c |
| 12/28/2001 | 12:52p | 158 | _sfulen.c |
| 12/28/2001 | 12:52p | 166 | _sfvalue.c |
| | 19 File(s) | 28,017 bytes | |

Directory of F:\Send\ExtLibraries\graphviz-1.7.7\tools\src

| | | | |
|---|---|---|---|
| 12/28/2001 | 12:52p | 1,653 | acyclic.1 |
| 12/28/2001 | 12:52p | 4,462 | acyclic.c |
| 12/28/2001 | 12:52p | 1,177 | ccomps.1 |
| 12/28/2001 | 12:52p | 3,488 | ccomps.c |
| 12/28/2001 | 12:52p | 1,947 | colorize.1 |
| 12/28/2001 | 12:52p | 5,295 | colorize.c |
| 12/28/2001 | 12:52p | 16,451 | colortbl.h |
| 12/28/2001 | 12:52p | 1,579 | colxlate.c |
| 12/28/2001 | 12:52p | 1,545 | gc.1 |
| 12/28/2001 | 12:52p | 5,815 | gc.c |
| 12/28/2001 | 12:52p | 2,879 | ingraphs.c |
| 12/28/2001 | 12:52p | 657 | ingraphs.h |
| 12/28/2001 | 12:52p | 21,411 | Makefile |
| 12/28/2001 | 12:52p | 2,353 | Makefile.am |
| 12/28/2001 | 12:52p | 21,972 | Makefile.IN |
| 12/28/2001 | 12:52p | 361 | nop.1 |
| 12/28/2001 | 12:52p | 1,518 | nop.c |
| 12/28/2001 | 12:52p | 1,616 | sccmap.1 |
| 12/28/2001 | 12:52p | 8,094 | sccmap.c |
| 12/28/2001 | 12:52p | 1,195 | tred.1 |

-continued

| | | | |
|---|---|---|---|
| 12/28/2001 | 12:52p | 2,719 | tred.c |
| 12/28/2001 | 12:52p | 1,490 | unflatten.1 |
| 12/28/2001 | 12:52p | 4,670 | unflatten.c |
| | 23 File(s) | 114,347 bytes | |

Directory of F:\Send\ExtLibraries\graphviz-1.7.7\tools\vmalloc

| | | | |
|---|---|---|---|
| 12/28/2001 | 12:52p | 3,477 | ast_common.h |
| 12/28/2001 | 12:52p | 11,917 | Makefile |
| 12/28/2001 | 12:52p | 928 | Makefile.am |
| 12/28/2001 | 12:52p | 12,454 | Makefile.IN |
| 12/28/2001 | 12:52p | 9,135 | malloc.c |
| 12/28/2001 | 12:52p | 808 | README |
| 12/28/2001 | 12:52p | 8,159 | vmalloc.h |
| 12/28/2001 | 12:52p | 29,378 | vmbest.c |
| 12/28/2001 | 12:52p | 1,170 | vmclear.c |
| 12/28/2001 | 12:52p | 1,496 | vmclose.c |
| 12/28/2001 | 12:52p | 868 | vmdcheap.c |
| 12/28/2001 | 12:52p | 15,132 | vmdebug.c |
| 12/28/2001 | 12:52p | 635 | vmdisc.c |
| 12/28/2001 | 12:52p | 1,017 | vmexit.c |
| 12/28/2001 | 12:52p | 15,733 | vmhdr.h |
| 12/28/2001 | 12:52p | 9,222 | vmlast.c |
| 12/28/2001 | 12:52p | 3,838 | vmopen.c |
| 12/28/2001 | 12:52p | 6,313 | vmpool.c |
| 12/28/2001 | 12:52p | 6,366 | vmprivate.c |
| 12/28/2001 | 12:52p | 15,618 | vmprofile.c |
| 12/28/2001 | 12:52p | 379 | vmregion.c |
| 12/28/2001 | 12:52p | 680 | vmsegment.c |
| 12/28/2001 | 12:52p | 781 | vmset.c |
| 12/28/2001 | 12:52p | 2,209 | vmstat.c |
| 12/28/2001 | 12:52p | 256 | vmstrdup.c |
| 12/28/2001 | 12:52p | 4,072 | vmtrace.c |
| 12/28/2001 | 12:52p | 1,011 | vmwalk.c |
| | 27 File(s) | 163,052 bytes | |

Directory of F:\Send\ExtLibraries\graphviz-1.7.7\tools\vmalloc\features

| | | | |
|---|---|---|---|
| 12/28/2001 | 12:52p | 8,960 | common |
| 12/28/2001 | 12:52p | 1,998 | vmalloc |
| | 2 File(s) | 10,958 bytes | |

Directory of F:\Send\ExtLibraries\graphviz-1.7.7\tools\vmalloc\features\CVS

| | | | |
|---|---|---|---|
| 12/28/2001 | 12:52p | 84 | Entries |
| 12/28/2001 | 12:52p | 33 | Repository |
| 12/28/2001 | 12:52p | 40 | Root |
| | 3 File(s) | 157 bytes | |

Directory of F:\Send\ExtLibraries\jaxp-1.1

| | | | |
|---|---|---|---|
| 12/28/2001 | 12:52p | 256,484 | crimson.jar.b64 |
| 12/28/2001 | 12:52p | 2,717 | install.html |
| 12/28/2001 | 12:52p | 38,924 | jaxp.jar.b64 |
| 12/28/2001 | 12:52p | 2,739 | License-ASF |
| 12/28/2001 | 12:52p | 11,407 | License-RI.html |
| 12/28/2001 | 12:52p | 4,826 | License-W3C.html |
| 12/28/2001 | 12:52p | 7,401 | readme.html |
| 12/28/2001 | 12:52p | 9,028 | relnotes.html |
| 12/28/2001 | 12:52p | 1,098,646 | xalan.jar.b64 |
| | 9 File(s) | 1,432,172 bytes | |

Directory of F:\Send\ExtLibraries\jdk1.3.1\include

| | | | |
|---|---|---|---|
| 12/28/2001 | 12:52p | 7,839 | jawt.h |
| 12/28/2001 | 12:52p | 68,634 | jni.h |
| 12/28/2001 | 12:52p | 38,119 | jvmdi.h |
| 12/28/2001 | 12:52p | 22,693 | jvmpi.h |
| | 4 File(s) | 137,285 bytes | |

Directory of F:\Send\ExtLibraries\jdk1.3.1\include\win32

| | | | |
|---|---|---|---|
| 12/28/2001 | 12:52p | 960 | jawt_md.h |
| 12/28/2001 | 12:52p | 518 | jni_md.h |
| | 2 File(s) | 1,478 bytes | |

Directory of F:\Send\ExtLibraries\jdom-b7

| | | | |
|---|---|---|---|
| 12/28/2001 | 12:52p | 677 | build.bat |
| 12/28/2001 | 12:52p | 913 | build.sh |
| 12/28/2001 | 12:52p | 10,907 | build.xml |
| 12/28/2001 | 12:52p | 400 | build11.bat |
| 12/28/2001 | 12:52p | 545 | build11.sh |
| 12/28/2001 | 12:52p | 20,969 | CHANGES.txt |
| 12/28/2001 | 12:52p | 379 | COMMITTERS.txt |
| 12/28/2001 | 12:52p | 2,581 | LICENSE.txt |
| 12/28/2001 | 12:52p | 3,215 | README.txt |
| 12/28/2001 | 12:52p | 15,391 | TODO.txt |
| | 10 File(s) | 55,977 bytes | |

Directory of F:\Send\ExtLibraries\jdom-b7\build

| | | | |
|---|---|---|---|
| 12/28/2001 | 12:52p | 145,830 | jdom.jar.b64 |
| | 1 File(s) | 145,830 bytes | |

Directory of F:\Send\ExtLibraries\Libs\pc\GraphVizLib

| | | | |
|---|---|---|---|
| 12/28/2001 | 12:52p | 1,056 | edbuild-sh |
| 12/28/2001 | 12:52p | 14,353 | GraphVizLib.dsp |
| | 2 File(s) | 15,409 bytes | |

Directory of F:\Send\ExtLibraries\Libs\pc\libsndfile

| | | | |
|---|---|---|---|
| 12/28/2001 | 12:52p | 7,658 | libsndfile.dsp |
| | 1 File(s) | 7,658 bytes | |

Directory of F:\Send\ExtLibraries\libsndfile

| | | | |
|---|---|---|---|
| 12/28/2001 | 12:52p | 8,453 | acconfig.h |
| 12/28/2001 | 12:52p | 18,853 | aclocal.m4 |
| 12/28/2001 | 12:52p | 638 | AUTHORS |
| 12/28/2001 | 12:52p | 39,843 | ChangeLog |
| 12/28/2001 | 12:52p | 1,503 | check_libsndfile.py |
| 12/28/2001 | 12:52p | 34,268 | config.guess |
| 12/28/2001 | 12:52p | 26,511 | config.sub |
| 12/28/2001 | 12:52p | 87,543 | configure |
| 12/28/2001 | 12:52p | 4,895 | configure.in |
| 12/28/2001 | 12:52p | 27,021 | COPYING |
| 12/28/2001 | 12:52p | 8,013 | INSTALL |
| 12/28/2001 | 12:52p | 2,305 | install-sh |
| 12/28/2001 | 12:52p | 1,587 | libsndfile.spec |
| 12/28/2001 | 12:52p | 1,589 | libsndfile.spec.in |

-continued

| | | | |
|---|---|---|---|
| 12/28/2001 | 12:52p | 100,826 | ltconfig |
| 12/28/2001 | 12:52p | 114,790 | ltmain.sh |
| 12/28/2001 | 12:52p | 168 | Makefile.am |
| 12/28/2001 | 12:52p | 11,694 | Makefile.in |
| 12/28/2001 | 12:52p | 6,462 | missing |
| 12/28/2001 | 12:52p | 772 | mkinstalldirs |
| 12/28/2001 | 12:52p | 3,030 | NEWS |
| 12/28/2001 | 12:52p | 2,237 | README |
| 12/28/2001 | 12:52p | 170 | reconf |
| 12/28/2001 | 12:52p | 1,804 | TODO |
| 24 File(s) | | 504,975 bytes | |

Directory of F:\Send\ExtLibraries\libsndfile\doc

| | | | |
|---|---|---|---|
| 12/28/2001 | 12:52p | 18,765 | api.html |
| 12/28/2001 | 12:52p | 1,903 | bugs.html |
| 12/28/2001 | 12:52p | 39,261 | ChangeLog |
| 12/28/2001 | 12:52p | 12,380 | index.html |
| 12/28/2001 | 12:52p | 99 | Makefile.am |
| 12/28/2001 | 12:52p | 4,775 | Makefile.in |
| 12/28/2001 | 12:52p | 3,030 | NEWS |
| 12/28/2001 | 12:52p | 4,450 | new__file_type.HOWTO |
| 12/28/2001 | 12:52p | 1,261 | sf__info.html |
| 9 File(s) | | 85,924 bytes | |

Directory of F:\Send\ExtLibraries\libsndfile\examples

| | | | |
|---|---|---|---|
| 12/28/2001 | 12:52p | 874 | Makefile.am |
| 12/28/2001 | 12:52p | 12,354 | Makefile.in |
| 12/28/2001 | 12:52p | 2,416 | make__sine.c |
| 12/28/2001 | 12:52p | 7,215 | sfconvert.c |
| 12/28/2001 | 12:52p | 2,472 | sfdump.c |
| 12/28/2001 | 12:52p | 2,116 | sfhexdump.c |
| 12/28/2001 | 12:52p | 1,298 | sfprocess.c |
| 12/28/2001 | 12:52p | 2,869 | sndfile2oct.c |
| 12/28/2001 | 12:52p | 2,557 | sndfile__info.c |
| 12/28/2001 | 12:52p | 3,150 | wav32__aiff24.c |
| 10 File(s) | | 37,321 bytes | |

Directory of F:\Send\ExtLibraries\libsndfile\MacOS

| | | | |
|---|---|---|---|
| 12/28/2001 | 12:52p | 2,335 | config.h |
| 12/28/2001 | 12:52p | 2,442 | MacOS-readme.txt |
| 12/28/2001 | 12:52p | 41 | Makefile.am |
| 12/28/2001 | 12:52p | 4,706 | Makefile.in |
| 4 File(s) | | 9,524 bytes | |

Directory of F:\Send\ExtLibraries\libsndfile\src

| | | | |
|---|---|---|---|
| 12/28/2001 | 12:52p | 22,235 | aiff.c |
| 12/28/2001 | 12:52p | 27,295 | alaw.c |
| 12/28/2001 | 12:52p | 16,173 | au.c |
| 12/28/2001 | 12:52p | 1,089 | au.h |
| 12/28/2001 | 12:52p | 16,082 | au_g72x.c |
| 12/28/2001 | 12:52p | 19,912 | common.c |
| 12/28/2001 | 12:52p | 10,043 | common.h |
| 12/28/2001 | 12:52p | 2,122 | config.h.in |
| 12/28/2001 | 12:52p | 30,476 | float32.c |
| 12/28/2001 | 12:52p | 1,533 | floatcast.h |
| 12/28/2001 | 12:52p | 10,467 | ircam.c |
| 12/28/2001 | 12:52p | 723 | Makefile.am |
| 12/28/2001 | 12:52p | 15,605 | Makefile.in |
| 12/28/2001 | 12:52p | 7,990 | nist.c |
| 12/28/2001 | 12:52p | 24,513 | paf.c |
| 12/28/2001 | 12:52p | 85,049 | pcm.c |
| 12/28/2001 | 12:52p | 4,788 | raw.c |
| 12/28/2001 | 12:52p | 3,432 | samplitude.c |
| 12/28/2001 | 12:52p | 2,870 | sfendian.h |
| 12/28/2001 | 12:52p | 43,936 | sndfile.c |
| 12/28/2001 | 12:52p | 8,903 | sndfile.h |
| 12/28/2001 | 12:52p | 11 | stamp-h.in |
| 12/28/2001 | 12:52p | 12,055 | svx.c |
| 12/28/2001 | 12:52p | 65,646 | ulaw.c |
| 12/28/2001 | 12:52p | 11,216 | voc.c |
| 12/28/2001 | 12:52p | 37,252 | wav.c |
| 12/28/2001 | 12:52p | 3,063 | wav.h |
| 12/28/2001 | 12:52p | 19,251 | wav__gsm610.c |
| 12/28/2001 | 12:52p | 24,617 | wav__ima__adpcm.c |
| 12/28/2001 | 12:52p | 28,179 | wav__ms__adpcm.c |
| 30 File(s) | | 556,526 bytes | |

Directory of F:\Send\ExtLibraries\libsndfile\src\G72x

| | | | |
|---|---|---|---|
| 12/28/2001 | 12:52p | 1,968 | ChangeLog |
| 12/28/2001 | 12:52p | 4,917 | g721.c |
| 12/28/2001 | 12:52p | 5,655 | g723__16.c |
| 12/28/2001 | 12:52p | 4,273 | g723__24.c |
| 12/28/2001 | 12:52p | 5,163 | g723__40.c |
| 12/28/2001 | 12:52p | 16,370 | g72x.c |
| 12/28/2001 | 12:52p | 3,982 | g72x.h |
| 12/28/2001 | 12:52p | 327 | Makefile.am |
| 12/28/2001 | 12:52p | 8,307 | Makefile.in |
| 12/28/2001 | 12:52p | 3,954 | private.h |
| 12/28/2001 | 12:52p | 0 | README |
| 12/28/2001 | 12:52p | 3,311 | README.original |
| 12 File(s) | | 58,227 bytes | |

Directory of F:\Send\ExtLibraries\libsndfile\src\GSM610

| | | | |
|---|---|---|---|
| 12/28/2001 | 12:52p | 6,053 | add.c |
| 12/28/2001 | 12:52p | 659 | ChangeLog |
| 12/28/2001 | 12:52p | 2,566 | code.c |
| 12/28/2001 | 12:52p | 924 | config.h |
| 12/28/2001 | 12:52p | 706 | COPYRIGHT |
| 12/28/2001 | 12:52p | 1,633 | decode.c |
| 12/28/2001 | 12:52p | 1,752 | gsm.h |
| 12/28/2001 | 12:52p | 901 | gsm__create.c |
| 12/28/2001 | 12:52p | 11,027 | gsm__decode.c |
| 12/28/2001 | 12:52p | 595 | gsm__destroy.c |
| 12/28/2001 | 12:52p | 11,877 | gsm__encode.c |
| 12/28/2001 | 12:52p | 1,274 | gsm__option.c |
| 12/28/2001 | 12:52p | 24,536 | long__term.c |
| 12/28/2001 | 12:52p | 7,430 | lpc.c |
| 12/28/2001 | 12:52p | 451 | Makefile.am |
| 12/28/2001 | 12:52p | 9,304 | Makefile.in |
| 12/28/2001 | 12:52p | 2,626 | preprocess.c |
| 12/28/2001 | 12:52p | 8,195 | private.h |
| 12/28/2001 | 12:52p | 1,680 | proto.h |
| 12/28/2001 | 12:52p | 1,460 | README |
| 12/28/2001 | 12:52p | 11,548 | rpe.c |
| 12/28/2001 | 12:52p | 10,831 | short__term.c |
| 12/28/2001 | 12:52p | 2,210 | table.c |
| 12/28/2001 | 12:52p | 495 | unproto.h |
| 24 File(s) | | 120,733 bytes | |

Directory of F:\Send\ExtLibraries\libsndfile\tests

| | | | |
|---|---|---|---|
| 12/28/2001 | 12:52p | 6,490 | alaw__test.c |
| 12/28/2001 | 12:52p | 1,683 | check__log__buffer.c |
| 12/28/2001 | 12:52p | 942 | check__log__buffer.h |
| 12/28/2001 | 12:52p | 6,625 | command__test.c |
| 12/28/2001 | 12:52p | 1,603 | error__test.c |
| 12/28/2001 | 12:52p | 11,189 | floating__point__test.c |
| 12/28/2001 | 12:52p | 67,385 | lossy__comp__test.c |
| 12/28/2001 | 12:52p | 5,568 | Makefile.am |

-continued

| | | | |
|---|---|---|---|
| 12/28/2001 | 12:52p | 18,745 | Makefile.in |
| 12/28/2001 | 12:52p | 6,286 | peak_chunk_test.c |
| 12/28/2001 | 12:52p | 26,593 | read_seek_test.c |
| 12/28/2001 | 12:52p | 1,636 | sftest.c |
| 12/28/2001 | 12:52p | 1,118 | sfversion.c |
| 12/28/2001 | 12:52p | 3,749 | stdin_test.c |
| 12/28/2001 | 12:52p | 2,753 | stdio_test.c |
| 12/28/2001 | 12:52p | 3,550 | stdout_test.c |
| 12/28/2001 | 12:52p | 7,636 | ulaw_test.c |
| 12/28/2001 | 12:52p | 49,351 | write_read_test.c |
| | 18 File(s) | 222,902 bytes | |

Directory of F:\Send\ExtLibraries\libsndfile\Win32

| | | | |
|---|---|---|---|
| 12/28/2001 | 12:52p | 2,353 | config.h |
| 12/28/2001 | 12:52p | 84 | Makefile.am |
| 12/28/2001 | 12:52p | 4,742 | Makefile.in |
| 12/28/2001 | 12:52p | 3,619 | README-Win32.txt |
| 12/28/2001 | 12:52p | 1,360 | README-Win32.txt.old |
| 12/28/2001 | 12:52p | 1,729 | unistd.h |
| | 6 File(s) | 13,887 bytes | |

Directory of F:\Send\ExtLibraries\monarch

| | | | |
|---|---|---|---|
| 12/28/2001 | 12:52p | 6,964 | license.html |
| 12/28/2001 | 12:52p | 2,207 | readme.txt |
| | 2 File(s) | 9,171 bytes | |

Directory of F:\Send\ExtLibraries\monarch\lib

| | | | |
|---|---|---|---|
| 12/28/2001 | 12:52p | 167,738 | mgraph.jar.b64 |
| | 1 File(s) | 167,738 bytes | |

Directory of F:\Send\ExtLibraries\zlib-1.1.3

| | | | |
|---|---|---|---|
| 12/28/2001 | 12:52p | 1,293 | adler32.c |
| 12/28/2001 | 12:52p | 9,869 | algorithm.txt |
| 12/28/2001 | 12:52p | 24,017 | ChangeLog |
| 12/28/2001 | 12:52p | 2,204 | compress.c |
| 12/28/2001 | 12:52p | 6,840 | configure |
| 12/28/2001 | 12:52p | 7,136 | crc32.c |
| 12/28/2001 | 12:52p | 50,333 | deflate.c |
| 12/28/2001 | 12:52p | 11,925 | deflate.h |
| 12/28/2001 | 12:52p | 1,596 | descrip.mms |
| 12/28/2001 | 12:52p | 16,406 | example.c |
| 12/28/2001 | 12:52p | 2,322 | FAQ |
| 12/28/2001 | 12:52p | 26,616 | gzio.c |
| 12/28/2001 | 12:52p | 2,588 | INDEX |
| 12/28/2001 | 12:52p | 12,750 | infblock.c |
| 12/28/2001 | 12:52p | 1,253 | infblock.h |
| 12/28/2001 | 12:52p | 8,052 | infcodes.c |
| 12/28/2001 | 12:52p | 764 | infcodes.h |
| 12/28/2001 | 12:52p | 5,815 | inffast.c |
| 12/28/2001 | 12:52p | 505 | inffast.h |
| 12/28/2001 | 12:52p | 9,079 | inffixed.h |
| 12/28/2001 | 12:52p | 10,022 | inflate.c |
| 12/28/2001 | 12:52p | 16,529 | inftrees.c |
| 12/28/2001 | 12:52p | 2,674 | inftrees.h |
| 12/28/2001 | 12:52p | 2,086 | infutil.c |
| 12/28/2001 | 12:52p | 3,777 | infutil.h |
| 12/28/2001 | 12:52p | 5,472 | Makefile |
| 12/28/2001 | 12:52p | 5,451 | Makefile.in |
| 12/28/2001 | 12:52p | 3,927 | Makefile.riscos |
| 12/28/2001 | 12:52p | 2,548 | maketree.c |
| 12/28/2001 | 12:52p | 3,899 | Make_vms.com |
| 12/28/2001 | 12:52p | 8,170 | minigzip.c |
| 12/28/2001 | 12:52p | 7,254 | README |
| 12/28/2001 | 12:52p | 44,886 | trees.c |
| 12/28/2001 | 12:52p | 8,572 | trees.h |
| 12/28/2001 | 12:52p | 2,039 | uncompr.c |
| 12/28/2001 | 12:52p | 8,089 | zconf.h |
| 12/28/2001 | 12:52p | 3,387 | zlib.3 |
| 12/28/2001 | 12:52p | 41,791 | zlib.h |
| 12/28/2001 | 12:52p | 5,457 | zutil.c |
| 12/28/2001 | 12:52p | 5,780 | zutil.h |
| | 40 File(s) | 393,173 bytes | |

Directory of F:\Send\ExtLibraries\zlib-1.1.3\amiga

| | | | |
|---|---|---|---|
| 12/28/2001 | 12:52p | 2,199 | Makefile.pup |
| 12/28/2001 | 12:52p | 1,881 | Makefile.sas |
| | 2 File(s) | 4,080 bytes | |

Directory of F:\Send\ExtLibraries\zlib-1.1.3\contrib

| | | | |
|---|---|---|---|
| 12/28/2001 | 12:52p | 1,341 | README.contrib |
| 12/28/2001 | 12:52p | 2,635 | visual-basic.txt |
| | 2 File(s) | 3,976 bytes | |

Directory of F:\Send\ExtLibraries\zlib-1.1.3\contrib\asm386

| | | | |
|---|---|---|---|
| 12/28/2001 | 12:52p | 14,823 | gvmat32.asm |
| 12/28/2001 | 12:52p | 7,196 | gvmat32c.c |
| 12/28/2001 | 12:52p | 59 | mkgvmt32.bat |
| 12/28/2001 | 12:52p | 2,482 | zlibvc.def |
| 12/28/2001 | 12:52p | 17,177 | zlibvc.dsp |
| 12/28/2001 | 12:52p | 726 | zlibvc.dsw |
| | 6 File(s) | 42,463 bytes | |

Directory of F:\Send\ExtLibraries\zlib-1.1.3\contrib\asm586

| | | | |
|---|---|---|---|
| 12/28/2001 | 12:52p | 10,582 | match.S |
| 12/28/2001 | 12:52p | 1,658 | README.586 |
| | 2 File(s) | 12,240 bytes | |

Directory of F:\Send\ExtLibraries\zlib-1.1.3\contrib\asm686

| | | | |
|---|---|---|---|
| 12/28/2001 | 12:52p | 9,336 | match.S |
| 12/28/2001 | 12:52p | 1,083 | README.686 |
| | 2 File(s) | 10,419 bytes | |

Directory of F:\Send\ExtLibraries\zlib-1.1.3\contrib\delphi

| | | | |
|---|---|---|---|
| 12/28/2001 | 12:52p | 1,005 | zlib.mak |
| 12/28/2001 | 12:52p | 5,568 | zlibdef.pas |
| | 2 File(s) | 6,573 bytes | |

Directory of F:\Send\ExtLibraries\zlib-1.1.3\contrib\delphi2

| | | | |
|---|---|---|---|
| 12/28/2001 | 12:52p | 5,287 | d_zlib.bpr |
| 12/28/2001 | 12:52p | 498 | d_zlib.cpp |
| 12/28/2001 | 12:52p | 670 | readme.txt |

-continued

| | | | |
|---|---|---|---|
| 12/28/2001 | 12:52p | 817 | zlib.bpg |
| 12/28/2001 | 12:52p | 5,338 | zlib.bpr |
| 12/28/2001 | 12:52p | 607 | zlib.cpp |
| 12/28/2001 | 12:52p | 16,644 | zlib.pas |
| 12/28/2001 | 12:52p | 4,581 | zlib32.bpr |
| 12/28/2001 | 12:52p | 1,488 | zlib32.cpp |
| | 9 File(s) | 35,930 bytes | |

Directory of F:\Send\ExtLibraries\zlib-1.1.3\contrib\iostream
| | | | |
|---|---|---|---|
| 12/28/2001 | 12:52p | 550 | test.cpp |
| 12/28/2001 | 12:52p | 5,375 | zfstream.cpp |
| 12/28/2001 | 12:52p | 2,639 | zfstream.h |
| | 3 File(s) | 8,564 bytes | |

Directory of F:\Send\ExtLibraries\zlib-1.1.3\contrib\iostream2
| | | | |
|---|---|---|---|
| 12/28/2001 | 12:52p | 9,590 | zstream.h |
| 12/28/2001 | 12:52p | 727 | zstream_test.cpp |
| | 2 File(s) | 10,317 bytes | |

Directory of F:\Send\ExtLibraries\zlib-1.1.3\contrib\minizip
| | | | |
|---|---|---|---|
| 12/28/2001 | 12:52p | 1,341 | ChangeLogUnzip |
| 12/28/2001 | 12:52p | 466 | Makefile |
| 12/28/2001 | 12:52p | 11,729 | miniunz.c |
| 12/28/2001 | 12:52p | 7,830 | minizip.c |
| 12/28/2001 | 12:52p | 1,412 | readme.txt |
| 12/28/2001 | 12:52p | 35,835 | unzip.c |
| 12/28/2001 | 12:52p | 540 | unzip.def |
| 12/28/2001 | 12:52p | 10,205 | unzip.h |
| 12/28/2001 | 12:52p | 22,005 | zip.c |
| 12/28/2001 | 12:52p | 180 | zip.def |
| 12/28/2001 | 12:52p | 5,240 | zip.h |
| 12/28/2001 | 12:52p | 2,482 | zlibvc.def |
| 12/28/2001 | 12:52p | 17,177 | zlibvc.dsp |
| 12/28/2001 | 12:52p | 726 | zlibvc.dsw |
| | 14 File(s) | 117,168 bytes | |

Directory of F:\Send\ExtLibraries\zlib-1.1.3\contrib\untgz
| | | | |
|---|---|---|---|
| 12/28/2001 | 12:52p | 237 | Makefile |
| 12/28/2001 | 12:52p | 1,194 | makefile.w32 |
| 12/28/2001 | 12:52p | 11,361 | untgz.c |
| | 3 File(s) | 12,792 bytes | |

Directory of F:\Send\ExtLibraries\zlib-1.1.3\msdos
| | | | |
|---|---|---|---|
| 12/28/2001 | 12:52p | 2,868 | Makefile.b32 |
| 12/28/2001 | 12:52p | 3,422 | Makefile.bor |
| 12/28/2001 | 12:52p | 2,636 | Makefile.dj2 |
| 12/28/2001 | 12:52p | 1,507 | Makefile.emx |
| 12/28/2001 | 12:52p | 3,416 | Makefile.msc |
| 12/28/2001 | 12:52p | 2,901 | Makefile.tc |
| 12/28/2001 | 12:52p | 2,750 | Makefile.w32 |
| 12/28/2001 | 12:52p | 2,814 | Makefile.wat |
| 12/28/2001 | 12:52p | 1,857 | zlib.def |
| 12/28/2001 | 12:52p | 927 | zlib.rc |
| | 10 File(s) | 25,098 bytes | |

Directory of F:\Send\ExtLibraries\zlib-1.1.3\nt
| | | | |
|---|---|---|---|
| 12/28/2001 | 12:52p | 3,023 | Makefile.emx |
| 12/28/2001 | 12:52p | 2,116 | Makefile.gcc |
| 12/28/2001 | 12:52p | 2,326 | Makefile.nt |
| 12/28/2001 | 12:52p | 1,749 | zlib.dnt |
| | 4 File(s) | 9,214 bytes | |

Directory of F:\Send\ExtLibraries\zlib-1.1.3\os2
| | | | |
|---|---|---|---|
| 12/28/2001 | 12:52p | 4,246 | Makefile.os2 |
| 12/28/2001 | 12:52p | 829 | zlib.def |
| | 2 File(s) | 5,075 bytes | |

Directory of F:\Send\ExtTools\base64-1.3
| | | | |
|---|---|---|---|
| 12/28/2001 | 12:52p | 3,526 | base64.1 |
| 12/28/2001 | 12:52p | 6,812 | base64.c |
| 12/28/2001 | 12:52p | 17,513 | base64.w |
| 12/28/2001 | 12:52p | 598 | config.h.in |
| 12/28/2001 | 12:52p | 48,728 | configure |
| 12/28/2001 | 12:52p | 632 | configure.in |
| 12/28/2001 | 12:52p | 294 | COPYING |
| 12/28/2001 | 12:52p | 4,990 | getopt.c |
| 12/28/2001 | 12:52p | 334 | getopt.h |
| 12/28/2001 | 12:52p | 5,771 | index.html |
| 12/28/2001 | 12:52p | 843 | INSTALL |
| 12/28/2001 | 12:52p | 5,003 | install-sh |
| 12/28/2001 | 12:52p | 6,415 | Makefile.in |
| 12/28/2001 | 12:52p | 1,446 | README |
| 12/28/2001 | 12:52p | 8,974 | rfc1341.html |
| 12/28/2001 | 12:52p | 7,511 | rfc1341.txt |
| | 16 File(s) | 119,390 bytes | |

Directory of F:\Send\Tools\AudioPlayer
| | | | |
|---|---|---|---|
| 12/28/2001 | 12:52p | 1,403 | AudioPlayer.cpp |
| 12/28/2001 | 12:52p | 5,371 | AudioPlayer.dsp |
| 12/28/2001 | 12:52p | 1,265 | AudioPlayer.dsw |
| 12/28/2001 | 12:52p | 722 | AudioPlayer.h |
| 12/28/2001 | 12:52p | 2,806 | AudioPlayerJNI.cpp |
| 12/28/2001 | 12:52p | 2,255 | AudioPlayerJNI.h |
| 12/28/2001 | 12:52p | 4,102 | CPlayer.cpp |
| 12/28/2001 | 12:52p | 1,268 | CPlayer.h |
| 12/28/2001 | 12:52p | 90 | makejni.bat |
| 12/28/2001 | 12:52p | 1,643 | ReadMe.txt |
| | 10 File(s) | 20,925 bytes | |

Directory of F:\Send\Tools\DDLOpen
| | | | |
|---|---|---|---|
| 12/28/2001 | 12:52p | 5,399 | DDLOpen.cpp |
| 12/28/2001 | 12:52p | 4,840 | DDLOpen.dsp |
| 12/28/2001 | 12:52p | 9,736 | EnumProc.cpp |
| 12/28/2001 | 12:52p | 578 | EnumProc.h |
| 12/28/2001 | 12:52p | 1,047 | MediaMap.h |
| 12/28/2001 | 12:52p | 1,619 | ReadMe.txt |
| 12/28/2001 | 12:52p | 294 | StdAfx.cpp |
| 12/28/2001 | 12:52p | 802 | StdAfx.h |
| | 8 File(s) | 24,315 bytes | |

Directory of F:\Send\Tools\GraphViz
| | | | |
|---|---|---|---|
| 12/28/2001 | 12:52p | 625 | GraphViz.cpp |
| 12/28/2001 | 12:52p | 5,341 | GraphViz.dsp |
| 12/28/2001 | 12:52p | 1,259 | GraphViz.dsw |
| 12/28/2001 | 12:52p | 5,908 | GraphVizJNI.cpp |

-continued

| | | | |
|---|---|---|---|
| 12/28/2001 | 12:52p | 701 | GraphVizJNI.h |
| 12/28/2001 | 12:52p | 88 | makejni.bat |
| 12/28/2001 | 12:52p | 1,625 | ReadMe.txt |
| | 7 File(s) | 15,547 bytes | |

Directory of F:\Send\Tools\Talks

| | | | |
|---|---|---|---|
| 12/28/2001 | 12:52p | 1,035 | buildme.bat |
| 12/28/2001 | 12:52p | 544 | Talks.html |
| | 2 File(s) | 1,579 bytes | |

Directory of F:\Send\Tools\Talks\classes\jellyvision\uber1\graphics

| | | | |
|---|---|---|---|
| 12/28/2001 | 12:52p | 1,280 | addsfx.gif.b64 |
| 12/28/2001 | 12:52p | 1,280 | approveaudio.gif.b64 |
| 12/28/2001 | 12:52p | 1,296 | approvevideo.gif.b64 |
| 12/28/2001 | 12:52p | 1,264 | audio.gif.b64 |
| 12/28/2001 | 12:52p | 1,284 | audiomoment.gif.b64 |
| 12/28/2001 | 12:52p | 1,222 | audiomomentnomedia.gif.b64 |
| 12/28/2001 | 12:52p | 1,284 | audiomomentsomemedia.gif.b64 |
| 12/28/2001 | 12:52p | 1,246 | downarrow.gif.b64 |
| 12/28/2001 | 12:52p | 1,246 | folder1.gif.b64 |
| 12/28/2001 | 12:52p | 1,258 | folder2.gif.b64 |
| 12/28/2001 | 12:52p | 1,320 | nixaudio.gif.b64 |
| 12/28/2001 | 12:52p | 1,332 | nixvideo.gif.b64 |
| 12/28/2001 | 12:52p | 1,246 | nomedia.gif.b64 |
| 12/28/2001 | 12:52p | 1,206 | spin1.gif.b64 |
| 12/28/2001 | 12:52p | 1,198 | spin2.gif.b64 |
| 12/28/2001 | 12:52p | 1,206 | spin3.gif.b64 |
| 12/28/2001 | 12:52p | 1,198 | spin4.gif.b64 |
| 12/28/2001 | 12:52p | 1,272 | textmoment.gif.b64 |
| 12/28/2001 | 12:52p | 1,268 | video.gif.b64 |
| | 19 File(s) | 23,906 bytes | |

Directory of F:\Send\Tools\Talks\src

| | | | |
|---|---|---|---|
| 12/28/2001 | 12:52p | 501 | app.xml |
| 12/28/2001 | 12:52p | 101 | MANIFEST.MF |
| 12/28/2001 | 12:52p | 95 | run.bat |
| 12/28/2001 | 12:52p | 18,698 | sfx.aif.b64 |
| 12/28/2001 | 12:52p | 62 | template.wav.b64 |
| 12/28/2001 | 12:52p | 1,031 | Trap.java |
| | 6 File(s) | 20,488 bytes | |

Directory of F:\Send\Tools\Talks\src\jellyvision\uber1

| | | | |
|---|---|---|---|
| 12/28/2001 | 12:52p | 3,586 | AppPrefs.java |
| 12/28/2001 | 12:52p | 1,568 | AppUndoManager.java |
| 12/28/2001 | 12:52p | 7,551 | CommandWindow.java |
| 12/28/2001 | 12:52p | 1,820 | MainApp.java |
| 12/28/2001 | 12:52p | 14,708 | MainFrame.java |
| 12/28/2001 | 12:52p | 5,804 | MediaView.java |
| 12/28/2001 | 12:52p | 5,893 | PlaybackView.java |
| 12/28/2001 | 12:52p | 10,479 | TestLink.java |
| 12/28/2001 | 12:52p | 489 | ToolWindow.java |
| | 9 File(s) | 51,898 bytes | |

Directory of F:\Send\Tools\Talks\src\jellyvision\uber1\editor

| | | | |
|---|---|---|---|
| 12/28/2001 | 12:52p | 4,782 | AddPrefScreen.java |
| 12/28/2001 | 12:52p | 12,709 | ConditionCellEditor.java |

-continued

| | | | |
|---|---|---|---|
| 12/28/2001 | 12:52p | 2,335 | ConditionPref.java |
| 12/28/2001 | 12:52p | 2,540 | ConditionPrefView.java |
| 12/28/2001 | 12:52p | 6,556 | DialogueCellEditor.java |
| 12/28/2001 | 12:52p | 1,969 | DialoguePref.java |
| 12/28/2001 | 12:52p | 2,540 | DialoguePrefView.java |
| 12/28/2001 | 12:52p | 2,449 | FieldEditor.java |
| 12/28/2001 | 12:52p | 1,826 | FocusWatcher.java |
| 12/28/2001 | 12:52p | 662 | IEditor.java |
| 12/28/2001 | 12:52p | 10,815 | NoteText.java |
| 12/28/2001 | 12:52p | 3,597 | OptionEditor.java |
| 12/28/2001 | 12:52p | 1,118 | Pref.java |
| 12/28/2001 | 12:52p | 5,506 | ScriptCommands.java |
| 12/28/2001 | 12:52p | 6,657 | ScriptPrefs.java |
| 12/28/2001 | 12:52p | 16,505 | ScriptView.java |
| 12/28/2001 | 12:52p | 3,682 | TextEditor.java |
| | 17 File(s) | 86,248 bytes | |

Directory of F:\Send\Tools\Talks\src\jellyvision\uber1\flowchart

| | | | |
|---|---|---|---|
| 12/28/2001 | 12:52p | 11,665 | ContextAdapter.java |
| 12/28/2001 | 12:52p | 7,594 | CurvedLink.java |
| 12/28/2001 | 12:52p | 827 | DisableLayout.java |
| 12/28/2001 | 12:52p | 9,678 | FixedDiamondNode.java |
| 12/28/2001 | 12:52p | 1,490 | FlowchartColors.java |
| 12/28/2001 | 12:52p | 1,468 | GraphView2.java |
| 12/28/2001 | 12:52p | 11,832 | GraphViz.java |
| 12/28/2001 | 12:52p | 785 | IfEraser.java |
| 12/28/2001 | 12:52p | 9,251 | IfLink.java |
| 12/28/2001 | 12:52p | 3,455 | IfPin.java |
| 12/28/2001 | 12:52p | 1,719 | LabelMeasure.java |
| 12/28/2001 | 12:52p | 4,043 | LayoutInfo.java |
| 12/28/2001 | 12:52p | 3,927 | LinkDragStrategy.java |
| 12/28/2001 | 12:52p | 6,642 | LinkFactory.java |
| 12/28/2001 | 12:52p | 20,229 | Model.java |
| 12/28/2001 | 12:52p | 1,847 | OutputPin.java |
| 12/28/2001 | 12:52p | 792 | Pin.java |
| 12/28/2001 | 12:52p | 1,762 | PinTable.java |
| 12/28/2001 | 12:52p | 2,871 | StubView.java |
| 12/28/2001 | 12:52p | 9,318 | ViewFactory.java |
| 12/28/2001 | 12:52p | 9,886 | WordBreakBlock.java |
| 12/28/2001 | 12:52p | 736 | WordWrapTextBox.java |
| 12/28/2001 | 12:52p | 3,654 | ZoomManager.java |
| | 23 File(s) | 125,471 bytes | |

Directory of F:\Send\Tools\Talks\src\jellyvision\uber1\flowchart\change

| | | | |
|---|---|---|---|
| 12/28/2001 | 12:52p | 1,458 | AliasChange.java |
| 12/28/2001 | 12:52p | 1,571 | AliasChangeCondition.java |
| 12/28/2001 | 12:52p | 1,700 | AudioMomentDescriptionChange.java |
| 12/28/2001 | 12:52p | 843 | CellCommand.java |
| 12/28/2001 | 12:52p | 1,313 | CellCreated.java |
| 12/28/2001 | 12:52p | 1,558 | CellCreatedBatch.java |
| 12/28/2001 | 12:52p | 1,580 | CellDeleted.java |
| 12/28/2001 | 12:52p | 1,707 | ConditionAdd.java |
| 12/28/2001 | 12:52p | 1,353 | ConditionCurrentChange.java |
| 12/28/2001 | 12:52p | 1,236 | ConditionDescriptionChange.java |
| 12/28/2001 | 12:52p | 1,852 | ConditionRemove.java |
| 12/28/2001 | 12:52p | 1,621 | HostChange.java |
| 12/28/2001 | 12:52p | 2,637 | LinkChange.java |
| 12/28/2001 | 12:52p | 995 | MediaChoice.java |
| 12/28/2001 | 12:52p | 1,341 | OptionDescriptionChange.java |
| 12/28/2001 | 12:52p | 2,803 | OptionLinkChange.java |
| | 16 File(s) | 25,568 bytes | |

Directory of F:\Send\Tools\Talks\src\jellyvision\uber1\media

| | | | |
|---|---|---|---|
| 12/28/2001 | 12:52p | 804 | AssetNode.java |
| 12/28/2001 | 12:52p | 3,110 | AssetTree.java |
| 12/28/2001 | 12:52p | 8,658 | AssetView.java |

-continued

| | | | |
|---|---|---|---|
| 12/28/2001 | 12:52p | 2,513 | AudioClip.java |
| 12/28/2001 | 12:52p | 34,536 | AudioMomentEditor.java |
| 12/28/2001 | 12:52p | 1,872 | AudioMomentNode.java |
| 12/28/2001 | 12:52p | 4,966 | ComplexCellNode.java |
| 12/28/2001 | 12:52p | 20,490 | CueCard.java |
| 12/28/2001 | 12:52p | 1,080 | FolderNode.java |
| 12/28/2001 | 12:52p | 4,227 | MediaMap.java |
| 12/28/2001 | 12:52p | 1,822 | MediaNode.java |
| 12/28/2001 | 12:52p | 1,503 | MenuMap.java |
| 12/28/2001 | 12:52p | 1,071 | MomentEditor.java |
| 12/28/2001 | 12:52p | 3,354 | OrphanFolderNode.java |
| | 14 File(s) | 90,006 bytes | |

Directory of F:\Send\Tools\Talks\src\jellyvision\uber1\media\change

| | | | |
|---|---|---|---|
| 12/28/2001 | 12:52p | 1,062 | AudioMomentDescriptionChange.java |
| 12/28/2001 | 12:52p | 1,006 | AudioMomentReference.java |
| 12/28/2001 | 12:52p | 1,007 | AudioMomentRemove.java |
| 12/28/2001 | 12:52p | 796 | HostChange.java |
| 12/28/2001 | 12:52p | 780 | VersionChange.java |
| | 5 File(s) | 4,651 bytes | |

Directory of F:\Send\Tools\Talks\src\jellyvision\uber1\model

| | | | |
|---|---|---|---|
| 12/28/2001 | 12:52p | 800 | AliasCell.java |
| 12/28/2001 | 12:52p | 3,891 | AlphaNumericIDTable.java |
| 12/28/2001 | 12:52p | 835 | AssetInfo.java |
| 12/28/2001 | 12:52p | 8,340 | AudioMoment.java |
| 12/28/2001 | 12:52p | 2,819 | AudioMomentTable.java |
| 12/28/2001 | 12:52p | 3,447 | AudioVersion.java |
| 12/28/2001 | 12:52p | 5,002 | Cell.java |
| 12/28/2001 | 12:52p | 5,152 | CellTable.java |
| 12/28/2001 | 12:52p | 1,542 | CommandQueue.java |
| 12/28/2001 | 12:52p | 729 | ComplexCell.java |
| 12/28/2001 | 12:52p | 995 | ConditionAlias.java |
| 12/28/2001 | 12:52p | 13,554 | ConditionCell.java |
| 12/28/2001 | 12:52p | 15,111 | Context.java |
| 12/28/2001 | 12:52p | 1,437 | Controller.java |
| 12/28/2001 | 12:52p | 2,789 | DefaultComplexCell.java |
| 12/28/2001 | 12:52p | 2,568 | DeleteCommand.java |
| 12/28/2001 | 12:52p | 3,653 | DialogueCell.java |
| 12/28/2001 | 12:52p | 1,675 | DragAudioMomentInfo.java |
| 12/28/2001 | 12:52p | 2,224 | FlowchartSync.java |
| 12/28/2001 | 12:52p | 898 | MediaSync.java |
| 12/28/2001 | 12:52p | 640 | MediaType.java |
| 12/28/2001 | 12:52p | 1,767 | ModelUndoCommand.java |
| 12/28/2001 | 12:52p | 734 | NodeType.java |
| 12/28/2001 | 12:52p | 4,675 | ProjectFile.java |
| 12/28/2001 | 12:52p | 4,605 | ProjectFileUI.java |
| 12/28/2001 | 12:52p | 1,550 | ReDeleteCommand.java |
| 12/28/2001 | 12:52p | 966 | SingleLinkAlias.java |
| 12/28/2001 | 12:52p | 4,117 | SingleLinkCell.java |
| 12/28/2001 | 12:52p | 3,822 | SinglePath.java |
| 12/28/2001 | 12:52p | 2,110 | StateCommand.java |
| 12/28/2001 | 12:52p | 1,005 | UndoController.java |
| 12/28/2001 | 12:52p | 1,942 | UndoNames.java |
| 12/28/2001 | 12:52p | 1,225 | XMLTags.java |
| | 33 File(s) | 106,619 bytes | |

Directory of F:\Send\Tools\Talks\src\jellyvision\uber1\model\change

| | | | |
|---|---|---|---|
| 12/28/2001 | 12:52p | 851 | AliasChange.java |
| 12/28/2001 | 12:52p | 934 | AliasChangeCondition.java |
| 12/28/2001 | 12:52p | 880 | AudioMomentDescriptionChange.java |
| 12/28/2001 | 12:52p | 1,054 | AudioMomentRemove.java |
| 12/28/2001 | 12:52p | 776 | CellCommand.java |
| 12/28/2001 | 12:52p | 1,790 | CellCreated.java |
| 12/28/2001 | 12:52p | 1,075 | ConditionAdd.java |
| 12/28/2001 | 12:52p | 868 | ConditionDescriptionChange.java |
| 12/28/2001 | 12:52p | 985 | ConditionRemove.java |
| 12/28/2001 | 12:52p | 795 | HostChange.java |
| 12/28/2001 | 12:52p | 1,887 | LinkChange.java |
| 12/28/2001 | 12:52p | 947 | OptionCommand.java |
| 12/28/2001 | 12:52p | 875 | OptionDescriptionChange.java |
| 12/28/2001 | 12:52p | 2,100 | OptionLinkChange.java |
| | 14 File(s) | 15,817 bytes | |

Directory of F:\Send\Tools\Talks\src\jellyvision\uber1\playback

| | | | |
|---|---|---|---|
| 12/28/2001 | 12:52p | 6,147 | DisplayDocument.java |
| 12/28/2001 | 12:52p | 4,355 | Playback.java |
| 12/28/2001 | 12:52p | 650 | PlayCell.java |
| 12/28/2001 | 12:52p | 3,621 | PlayCondition.java |
| 12/28/2001 | 12:52p | 4,872 | PlayDialogue.java |
| 12/28/2001 | 12:52p | 3,398 | RandomNoRepeat.java |
| 12/28/2001 | 12:52p | 2,894 | TextDisplay.java |
| 12/28/2001 | 12:52p | 2,854 | TimeLine.java |
| | 8 File(s) | 28,791 bytes | |

Directory of F:\Send\Tools\Talks\src\jellyvision\uber1\utils

| | | | |
|---|---|---|---|
| 12/28/2001 | 12:52p | 3,169 | AudioPlayer.java |
| 12/28/2001 | 12:52p | 2,319 | CenterDeleteString.java |
| 12/28/2001 | 12:52p | 1,863 | DragLinkStart.java |
| 12/28/2001 | 12:52p | 2,065 | DragLinkTarget.java |
| 12/28/2001 | 12:52p | 1,624 | GlassPane.java |
| 12/28/2001 | 12:52p | 1,508 | ReadOnlyListIterator.java |
| 12/28/2001 | 12:52p | 1,661 | StyleRun.java |
| 12/28/2001 | 12:52p | 3,310 | TextMeasure.java |
| 12/28/2001 | 12:52p | 4,808 | UberIcon.java |
| 12/28/2001 | 12:52p | 1,558 | Utilities.java |
| | 10 File(s) | 23,885 bytes | |

Total Files Listed:
    1505 File(s)    12,813,537 bytes
    0 Dir(s)    0 bytes free

BACKGROUND

Flowcharts are often used to show a graphical representation of cells. Flowcharts can be prepared by hand using pencil and paper or can be prepared electronically using a computer. Some software applications require a user to build a flowchart by drawing graphical shapes and then typing text into each graphical shape. If there are many branches in the flowchart, it can be difficult for a user to isolate a single path among the various paths. This can happen, for example, if the user is creating a flowchart to structurally represent a multimedia experience since a reasonably sophisticated experience can generate a flowchart that is quite large and unwieldy, with hundreds or thousands of cells and complex branching between the cells. Another difficulty encountered with structurally representing a multimedia experience is that creating a flowchart using existing tools can pull creative focus away from developing the experience. One approach to author-centric multimedia creation is presented in U.S. Pat. No. 6,100,881 to Gibbons et al. However, among its deficiencies as a multimedia creation tool, the approach described in Gibbons et al. is not directed to flowcharts.

There is a need, therefore, for a method that can be used to overcome the disadvantages discussed above.

SUMMARY

The present invention is defined by the following claims, and nothing in this section should be taken as a limitation on those claims.

By way of introduction, the preferred embodiments described below provide methods for identifying cells in a path in a flowchart and for synchronizing graphical and textual views of a flowchart. In one preferred embodiment, a method for identifying cells in a path in a flowchart is provided comprising the acts of displaying a flowchart comprising a plurality of cells, selecting a cell in the flowchart, determining a path comprising the selected cell, and identifying at least some of the cells in the path. In another preferred embodiment, a method for synchronizing graphical and textual views of a flowchart is provided. This method comprises the acts of displaying a graphical view of a flowchart comprising a plurality of cells in a first display region, displaying a textual view of at least some cells in the flowchart in a second display region, and in response to input received in either the first or second display regions, applying the input to both the first and second display regions. Other preferred embodiments are provided, and each of the preferred embodiments can be used alone or in combination with one another.

The preferred embodiments will now be described with reference to the attached drawings.

DETAILED DESCRIPTION OF THE PRESENTLY PREFERRED EMBODIMENTS

Introduction

The preferred embodiments described herein are preferably implemented using software and/or hardware components. For example, the preferred embodiments can be implemented with a software application (i.e., computer-readable program code) running on a processor of a general-purpose computer. Alternatively, some or all of the functionality of the application can be implemented with application-specific hardware components. For simplicity, the term "application" shall be used herein to refer generally to the entity (be it software and/or hardware) used to implement the preferred embodiments described below. The term "tool" shall be used interchangeably with the term "application."

Figure 1:
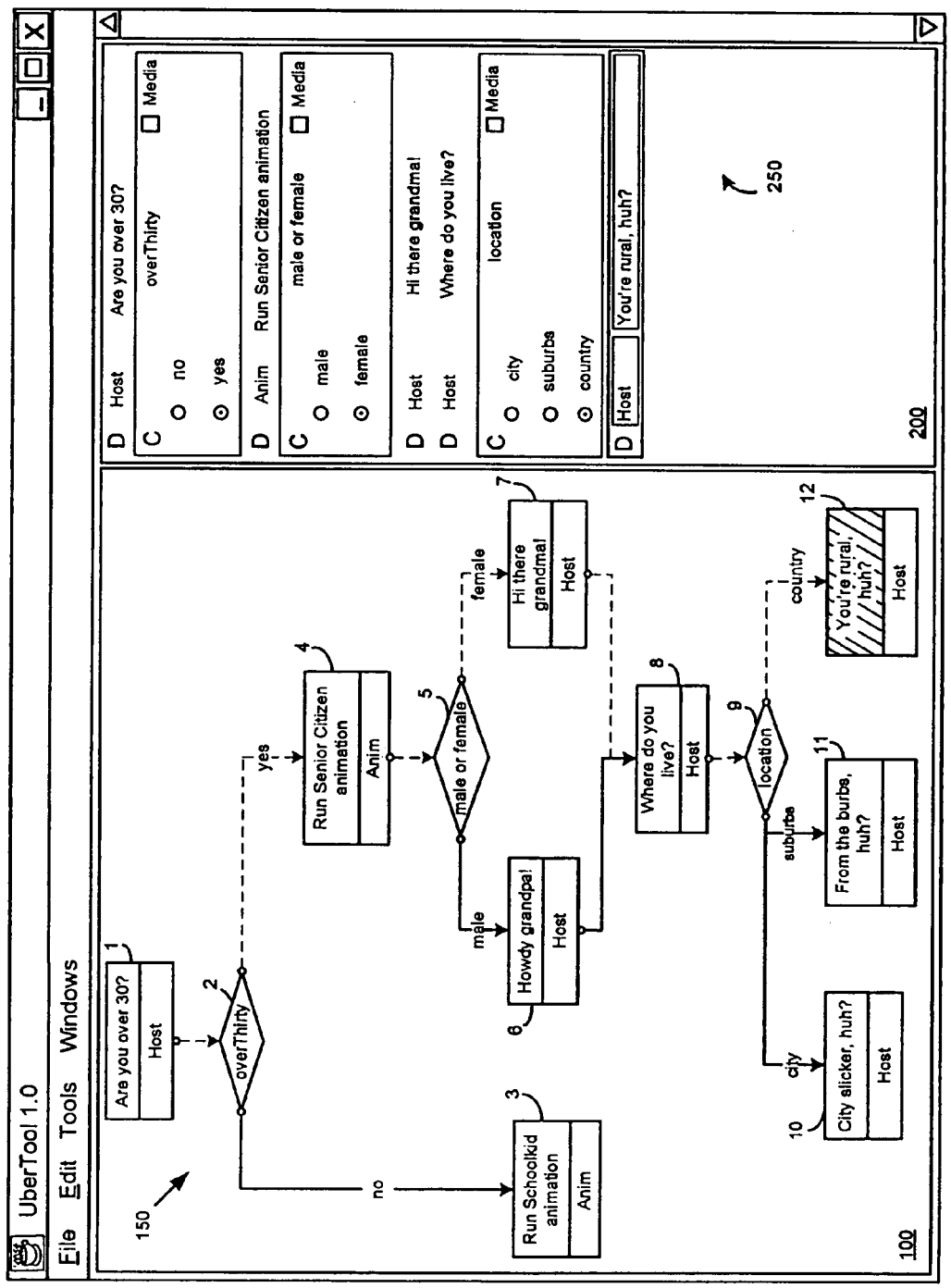
FIG. 1 is an illustration of a preferred embodiment in which a path from cell 1 to cell 12 is identified in first and second display regions.

Turning now to the drawings, FIG. 1 is an illustration of a display output of an application of a preferred embodiment. Here, the application displays two display regions 100, 200. As used herein, the term "display region" refers to an area of display on one or more display devices (e.g., computer monitors). Each display region 100, 200 can be a separate window, or the display regions 100, 200 can be different areas in a single window. The first and second display regions 100, 200 can be fixed or movable and can be non-overlapping (as in FIG. 1) or can overlap each other. Additionally, the first and second display regions 100, 200 can be alternately shown (one than the other) in response to a command from the application and/or in response to a command from the user. The first display region 100 will sometimes be referred to herein as the "Structure Window," and the second display region 200 will sometimes be referred to herein as the "Script Window."

As shown in FIG. 1, the application displays a flowchart 150 in the first display region 100. As used herein, the term "flowchart" refers to a series of linked graphical symbols or cells. The lines in the flowchart show how the cells are interconnected, and the cells are arranged in the flowchart in the order in which they are traversed in operation. The first display region 100 is referred to as the "Structure Window" because it displays the graphical representation (i.e., the cells and the connecting lines) of the flowchart 150. In FIG. 1, the flowchart 150 is displayed in its entirety in the first display region 100. It should be noted that a flowchart is displayed in the first display region 100 even if only part of the flowchart is visible at one time in the first display region 100. For example, if the flowchart were larger than the first display region 100, only a portion of the flowchart would be visible in the first display region 100. In this situation, a scroll bar and/or other navigation devices can be provided in the first display region 100 to allow a user to select which part of the flowchart is visible.

The flowchart 150 in FIG. 1 comprises a plurality of cells (cells 1-12), some of which are rectangular-shaped and others of which are diamond-shaped. The rectangular-shaped cells are referred to herein as "simple cells," and the diamond-shaped cells are referred to herein as "conditional cells." A simple cell is a cell that contains a single branching link to a single cell. For example, in the flowchart 150 shown in FIG. 1, simple cell 4 branches to conditional cell 5, and simple cell 6 branches to simple cell 8. Unlike a simple cell, a conditional cell contains multiple branching links to multiple cells. The branching links are associated with conditions necessary for that branching link to be followed. For example, in the flowchart 150 shown in FIG. 1, conditional cell 5 branches to simple cells 6 and 7. The branch to simple cell 6 is followed if the condition "male" is true, while the branch to simple cell 7 is followed if the condition "female" is true. It should be noted that a cell can contain two or more individual cells (simple cells or conditional cells). Such a cell is referred to herein as a "group cell" and can be used to simplify the display of a flowchart by grouping multiple cells together in a single cell. In addition to simple and conditional cells, a group cell can contain other group cells (i.e., groups cells can be nested) and other types of cells, such as "go to" cells, "alias" cells, and other types of cells described in the next paragraph. "Go to" cells can be used instead of a line to show the flow from that cell to another cell. In this way, "go to" cells can be used to keep a flowchart clean and readable. "Alias" cells can be used to mimic the function/operation of another cell.

The cells in a flowchart can contain any suitable content. For example, as in a traditional flowchart drawn on paper, a cell can contain text. A cell can also contain instructions that are implemented by the application (or by another application) when the cell is "played." For example, a cell can contain an instruction to trigger a piece of media, gather user input, generate visual or oral information, send/receive information or media to a database, process data, perform a calculation, or perform other functions, such as describing how and when media should be played. Examples of media assets include, but are not limited to, digital audio/video objects representing still art, animation, graphics, on-screen text, music, sound effects, or voiceover dialog. Different cells can have different durations. For example, some cells can be played after a previous cell initiates its function, while other cells can be played after a previous cell finishes its function. (The timing of a cell can also be based on a time X before or after the beginning or end of a cell, and one cell can be played simultaneously with another cell. Timing can also be based off of a common clock. Other timing mechanisms can be used.) A cell can also provide selection choices to a user and evaluate which choice was selected. For example, when conditional cell 2 in FIG. 1 is played, the user is prompted to input "yes" or "no" using a user interface device, such as a keyboard, mouse, microphone, remote control, or any other type of device. Conditional cell 2 also determines whether the user input is "yes" or "no." If the user input is "yes," the branch leading to cell 4 is followed, and the application runs a file called "Senior Citizen animation."

When played, the cells in the flowchart 150 of FIG. 1 provide an interactive multimedia experience for a user. In this example, the interactive multimedia experience takes the form of an interactive conversation interface in which responses are collected from a user using an interface that simulates a real-life conversation. When the flowchart is played from its beginning, the user first hears a voice asking whether the user is over 30. Depending on the user's response, an animation of a school kid or an animation of a senior citizen is played. If the user is over 30, the user is also asked if the user is male or female. If the user is male, an audio file voicing the phrase "Howdy Grandpa" is played; if the user is female, an audio file voicing the phrase "Hi there Grandma" is played. The interactive conversation interface can be used to communicate ideas and information in an audio and/or visual environment, such as interactive computer games, commercials, guided tours, auctions, stories, and news, health, or financial services. The interface can be implemented with wired or wireless equipment that includes both audio and video output devices (such as a home computer or television) as well as with equipment that includes only an audio output device (such as a conventional telephone) or only a video output device. It is important to note that these preferred embodiments can be used in flowchart applications that are unrelated to an interactive multimedia experience. Accordingly, a specific type of cell should not be read into the claims unless explicitly recited therein.

Returning to FIG. 1, the second display region 200 (the Script Window) contains a textual view 250 of some of the cells (cells 1, 2, 4, 5, 7, 8, 9, and 12) in the order in which the cells appear in the flowchart 150. The textual view shows a "description" of a cell (e.g., the text that is contained in a cell, the line of dialogue that will be voiced, the description of the animation or of the SFX that will be played, etc.). The content displayed in the textual view 250 can also contain other cell "properties," such as the font of displayed text, the name of the actor who will provide the media content, the cell's timing relative to other cells, the volume at which audio content of the cell should be played, the frames per second of animation, and other information. Cell properties can also be displayed in a third display region. It should be noted that the "textual" view can also contain graphics. For example, the textual view 250 in FIG. 1 contains radio buttons. As another example, text of the cell can also be supported with a graphics button next to the text that indicates the type of media in the cell (e.g., a button with a little horn indicating a SFX) and is clickable to open a properties window of the cell, to playback the media, or to perform other functions.

Embodiments Related to Identifying Cells in a Path in a Flowchart

Cells 1, 2, 4, 5, 7, 8, 9, and 12 in FIG. 1 represent one of many paths in the flowchart 150. As used herein, the term "path" refers to at least two cells in the flowchart that are connected to each other. In FIG. 1, the path contains the first and last cells in the flowchart 150 (cells 1 and 12). However, a path does not necessarily need to include the first and/or last cells. When a flowchart contains many paths, it can be difficult for a user to follow the cells along a single path, and cells along a path can be identified in a way to assist a user in following the path in the flowchart. In FIG. 1, cells along a path are identified by displaying the lines linking the cells differently (e.g., in a different color, shading, or thickness) than the lines linking cells that are not along the path. (In FIG. 1, the selected path is the lightest path.) Additionally, the content of the cells along the path is displayed in the second display region 200 to allow a user to read through the content of those cells in isolation from the cells in the other paths. As described in more detail below, other techniques can be used to identify cells along a path. For example, the borders of the cells along a path and their branches can be displayed with thicker lines in the first display region 100.

To identify cells in a path, a user can individually select each of the cells along a desired path. With reference to the illustration in FIG. 1, this would require a user to individually select cells 1, 2, 4, 5, 7, 8, 9, and 12. As can be seen even from the simple flowchart 150 in FIG. 1, individually selecting cells along a path can be time consuming. To facilitate the selection of a path in the flowchart, the application preferably implements a method to identify cells in a path based on the selection of a single cell. With this method, after the application displays a flowchart, a user selects a single cell. In the flowchart 150 displayed in FIG. 2, a user uses a pointing device (such as a mouse or trackball) to move a pointer 30 over a desired cell in the flowchart 150 and then selects that cell by pressing a selector switch (such as the mouse button). The user can select a cell using any other type of user interface device. For example, if the cells are numbered, the user can select a cell by typing in the cell number using a keyboard or by speaking the number of the cell into a microphone. Additionally, instead of the user selecting a cell, the application can automatically select a cell (e.g., based on the output of some operation being run by the application or based on the output sent to the application by another application). In this example, cell 3 is selected.

Next, the application determines a path comprising the selected cell. In this preferred embodiment, the selection of a single cell is used to isolate the cells above and below the selected cell to form a single path based on the history of the cell and the history of the cells above and below it in succession. In operation, the application builds a path by determining which cells above and below a given cell were selected the last time that the given cell was selected. A path made from cells selected in this manner is referred to herein as "the last selected path." The operation of this preferred embodiment will now be illustrated in conjunction with FIGS. 1 and 2. When a user selects cell 3 in FIG. 2, the application "walks" the flowchart to identify the cells below and above the selected cell. The application recognizes that cell 3 is the last cell in the path because there are no cells below cell 3 in the flowchart 150. Additionally, the application remembers that the last time cell 3 was selected, cell 2 was in the selected path directly above cell 3, and that the last time cell 2 was selected, cell 1 was in the selected path directly above cell 2.

Figure 2:
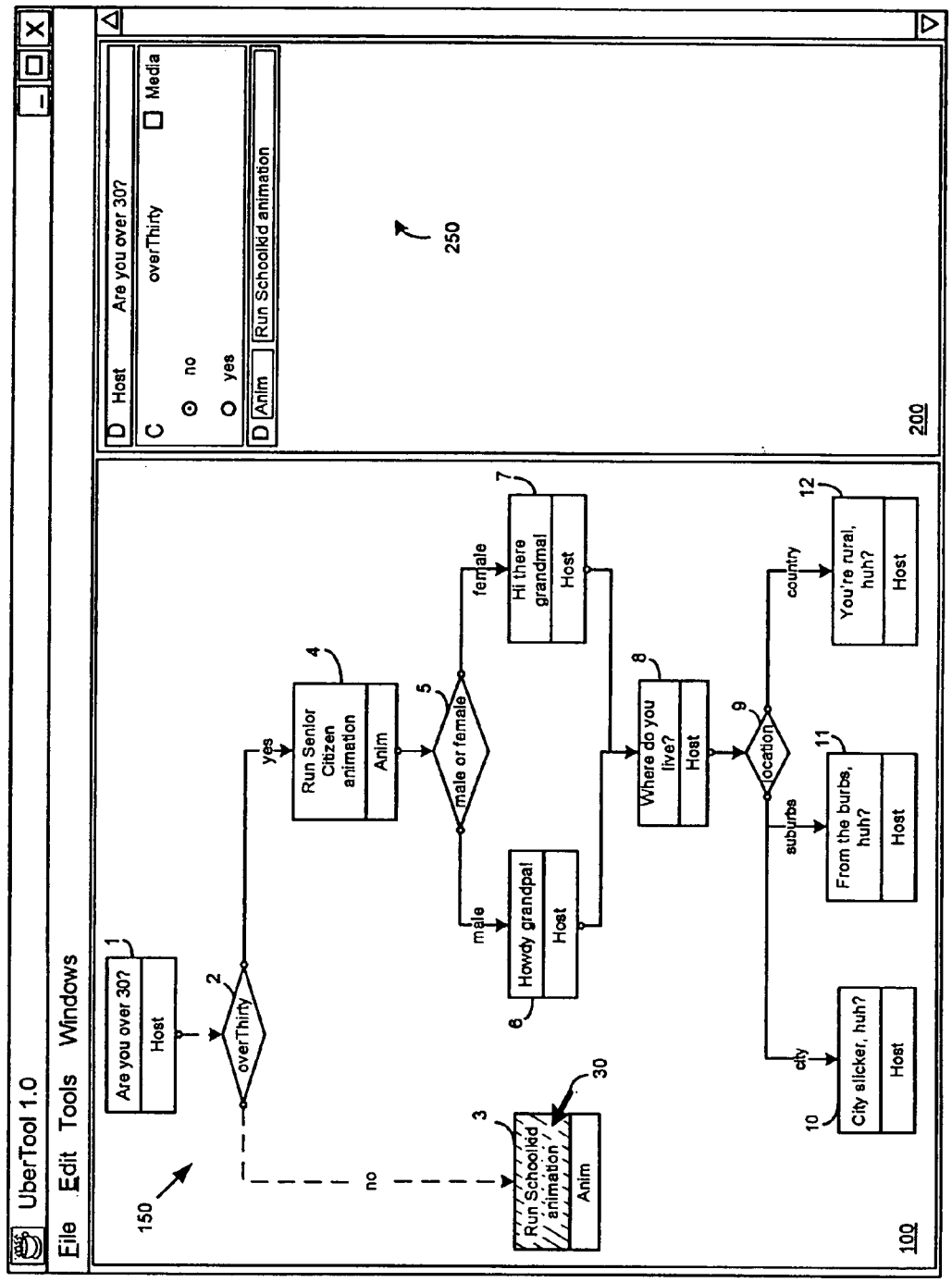
FIG. 2 is an illustration of a preferred embodiment in which a path from cell 1 to cell 3 is identified in first and second display regions.

After the path has been determined, at least some of the cells in that path are identified. In FIG. 2, the lines linking the cells in the path are different from those linking cells that are not in the path. Of course, other techniques of identifying the cells can be used. For example, cells can be displayed in a different color or otherwise highlighted, such as when the borders of cells in the determined path are displayed with thicker lines. Additionally, cells can be identified by changing their size with respect to other cells, such as when the identified cells are enlarged and/or the other cells are reduced in size. The application can also temporarily align the identified cells vertically to create the appearance of an additional display area in the first display region 100. In FIG. 2, the cells in the path are also identified by displaying a textual view of the cells in the second display region 200. It should be noted that while FIG. 2 identifies the cells along the path in two ways (by displaying the lines linking the cells in the path differently and by displaying a textual view of the cells in the second display region 200), the path can be identified using only one of these techniques or by using an additional technique. For example, a copy of the flowchart 150 can be displayed where only the cells in the path are visible and the cells that are not on the path are hidden.

Figure 3:
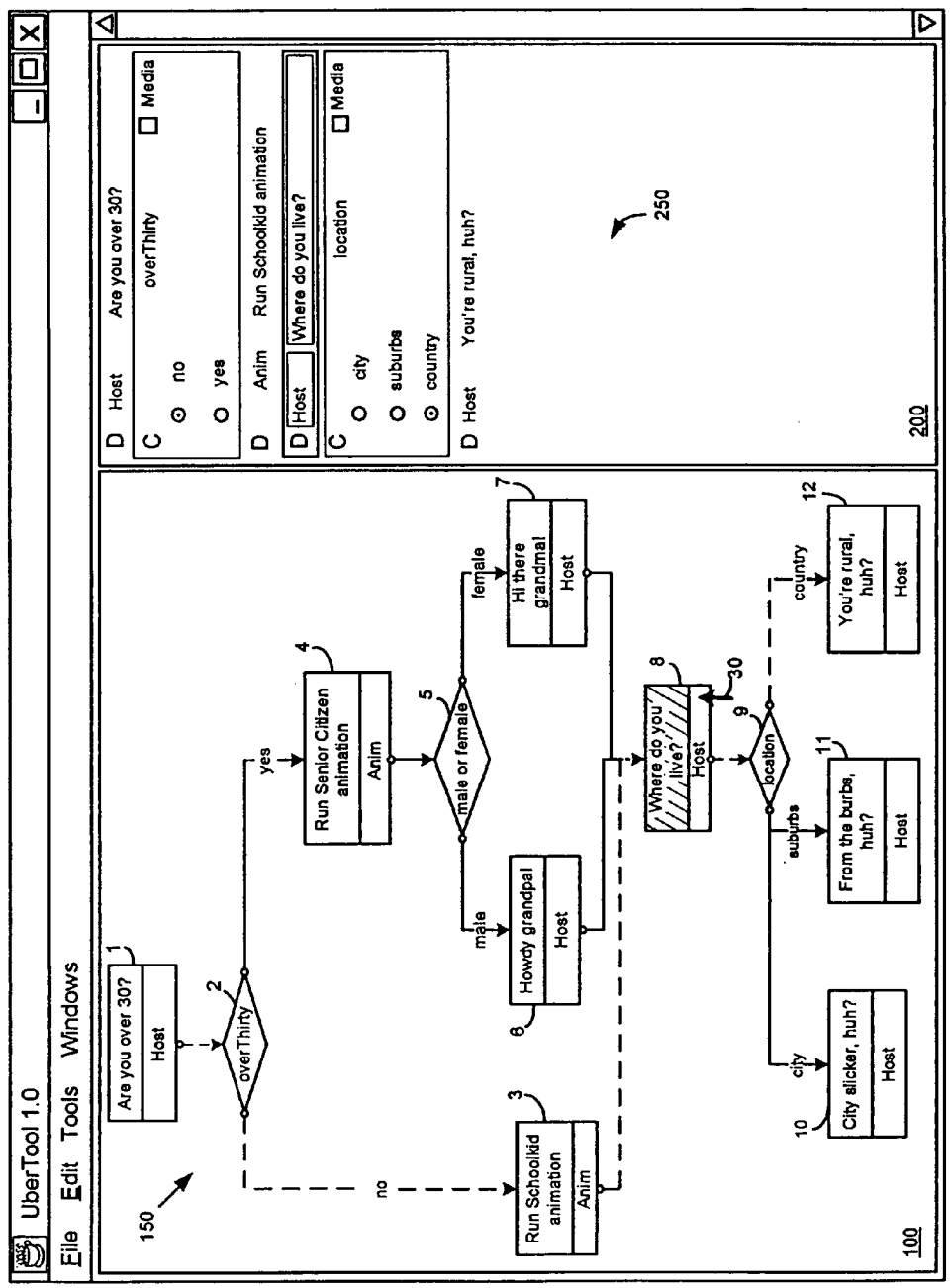
FIG. 3 is an illustration of a preferred embodiment in which a path from cell 1 to cell 12 is identified in first and second display regions.

Returning to the drawings, FIG. 3 shows the display output after the user connects cell 3 to cell 8. Cell 8 is now the selected cell by virtue of it being the end of the new connection. The application remembers that the last time cell 3 was on the selected path (see FIG. 2), cell 2 was in the selected path directly above cell 3, and cell 1 was in the selected path directly above cell 2. The application also remembers that the last time cell 8 was on the selected path (see FIG. 1), cell 9 was in the selected path directly below cell 8, and the last time cell 9 was on the selected path (see FIG. 1), cell 12 was in the selected path directly below cell 9. The cells along this determined path are identified as before. Assume that the user now selects cell 10 (see FIG. 4). The application determines that the path above cell 10 is the same as before, and, since there are no cells below cell 10, the selected path ends at cell 10.

Figure 4:
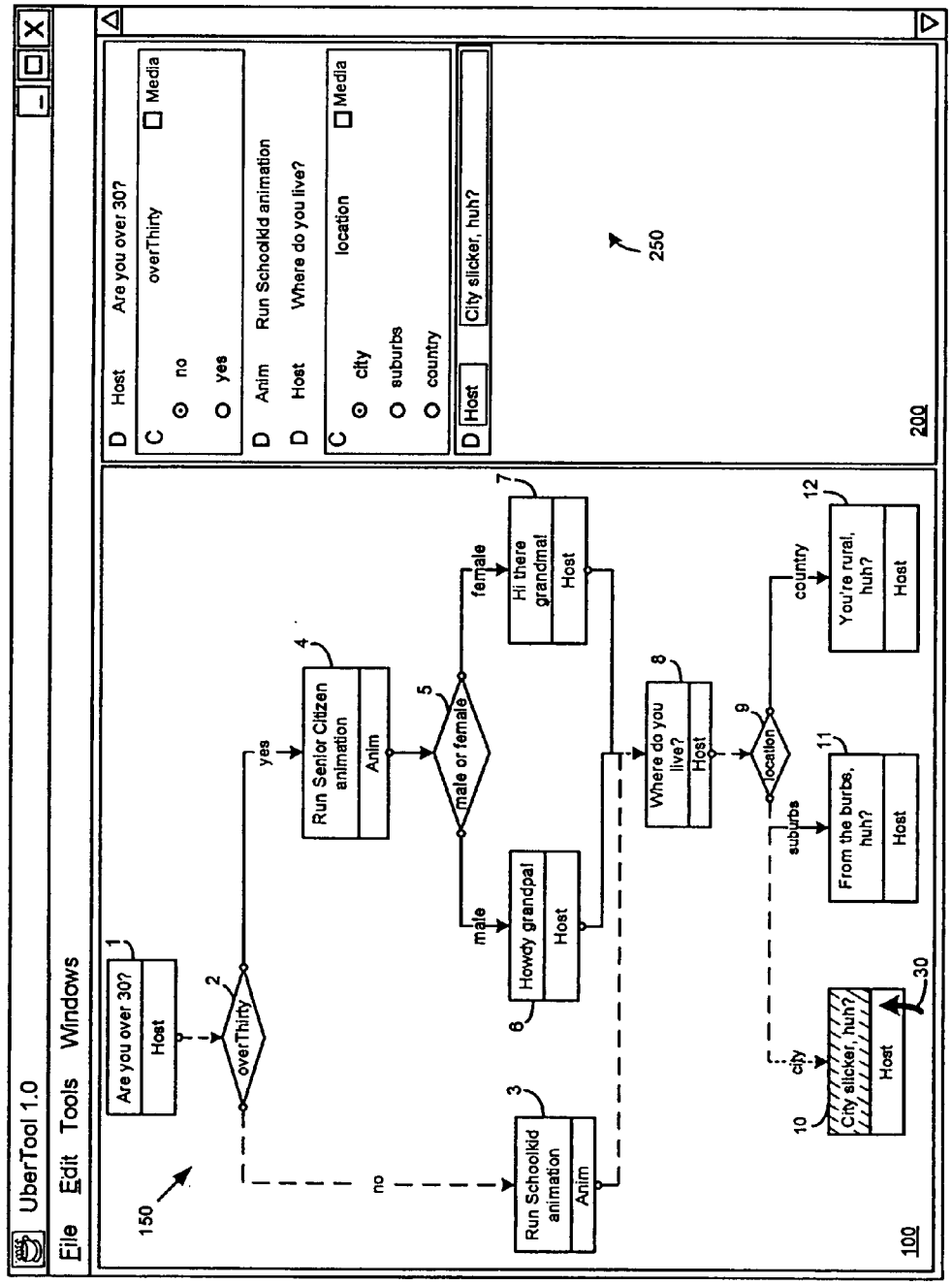
FIG. 4 is an illustration of a preferred embodiment in which a path from cell 1 through cell 3 to cell 10 is identified in first and second display regions.
Figure 5:
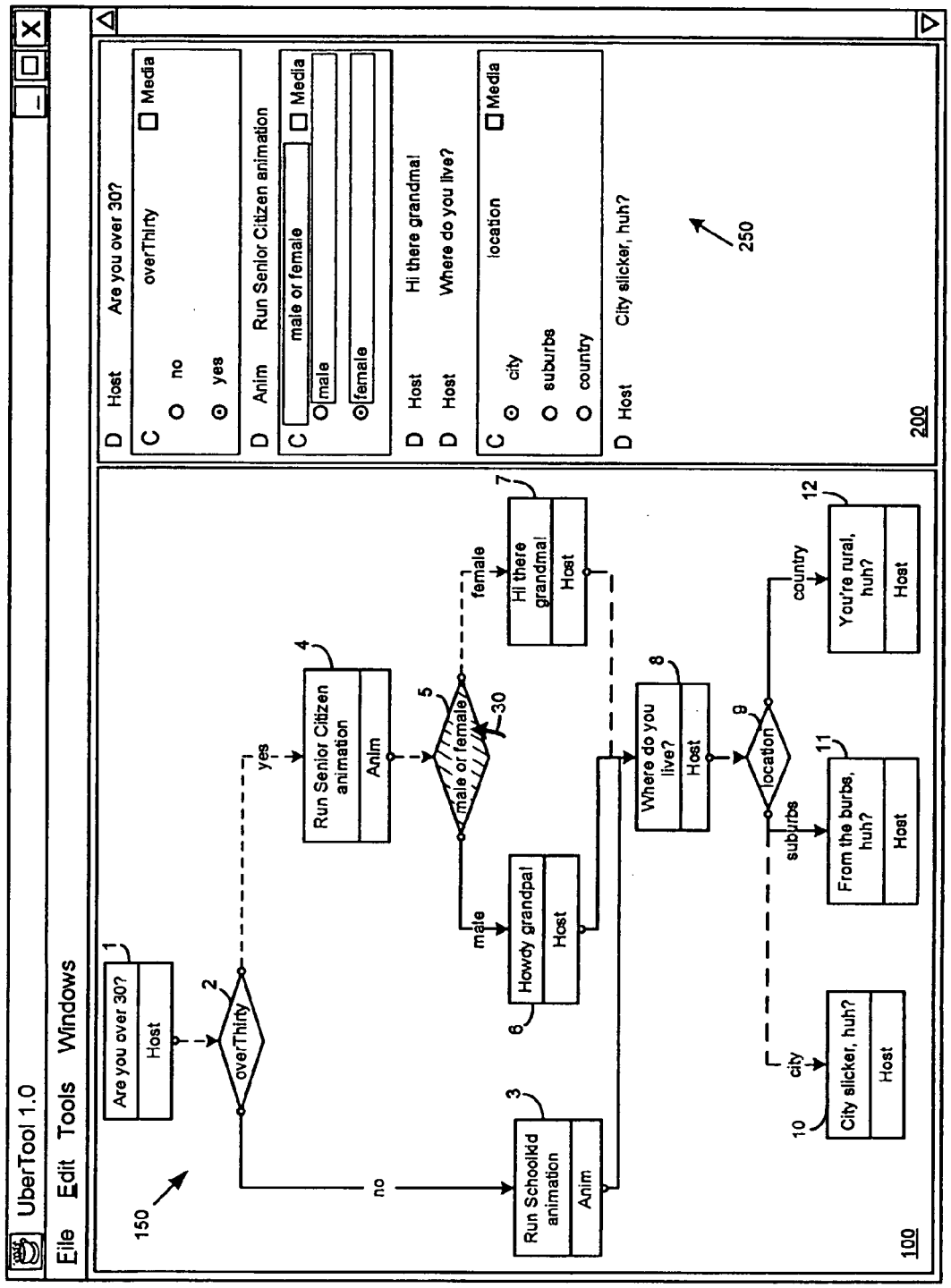
FIG. 5 is an illustration of a preferred embodiment in which a path from cell 1 through cell 7 to cell 10 is identified in first and second display regions.

In this example, if the user selects any cell along the currently-selected path (e.g., cell 9 in FIG. 4), the selected path does not change. If, however, the user selects a cell not along the currently-selected path, such as cell 5, the application will remember that (1) the last time cell 5 was on the selected path (see FIG. 1), cell 4 was in the selected path directly above cell 5; (2) the last time cell 4 was on the selected path (see FIG. 1), cell 2 was in the selected path directly above cell 4; and (3) the last time cell 2 was on the selected path (see FIG. 4), cell 1 was in the selected path directly above cell 2. The application also remembers that (1) the last time cell 5 was on the selected path (see FIG. 1), cell 7 was in the selected path directly below cell 5; (2) the last time cell 7 was on the selected path (see FIG. 1), cell 8 was in the selected path directly below cell 7; (3) the last time cell 8 was on the selected path (see FIG. 4), cell 9 was in the selected path directly below cell 8; and (4) the last time cell 9 was on the selected path (see FIG. 4), cell 10 was in the selected path directly below cell 9. The cells on this path are identified in the first display region 100 and the second display region 200 as shown in FIG. 5.

There are several alternatives that can be used. For example, instead of selecting the last selected path, a path can be determined based on the most-frequently selected path containing the selected cell. Other methods can be used. For example, of the many paths that contain the selected cell, the application can choose the path that most recently contained the selected cell. As another example, the application can randomly determine a path comprising the selected cell or can semi-randomly determine a path comprising the selected cell, such as when part of the path is selected based upon some form of logic (e.g., most frequently selected links three cells above and below the selected cell), but the rest of the path is selected at random (e.g., all other links are selected randomly).

In the embodiment discussed above, all of the cells in a path are determined, and all of those cells are identified. In one alternate embodiment, all of the cells in a path are determined, but only some of those cells are identified. For example, for a determined path that contains both a beginning cell and an end cell, the beginning cell and/or end cell need not be identified along with the other cells in the path. In another alternate embodiment, only some of the cells in a path are determined. For example, if cell 5 in FIG. 4 is selected, instead of determining which cells are both above and below cell 5 on the path from the first cell to the last cell in the flowchart, the application can determine, for example, only the cells in the path that are above cell 5, only the cells in the path that are below cell 5, or only the cells that are X cells above and below cell 5. Some or all of these cells in the determined path can then be identified.

In another alternate embodiment, instead of selecting a single cell in the flowchart, at least one additional cell is selected, and the application determines a path comprising the selected cell and the at least one additional cell. In a variation of this alternate embodiment, a user can establish a "master" cell and then select one or more additional cells. The application would then find a path between the master cell and the selected cell(s). Additionally, a path can be determined "manually" when the path determined by the application is merely a plurality of cells selected by a user.

Instead of determining a single path comprising the selected cell, some or all of the possible paths can be determined. One or more of these paths can be selected, and at least some of the cells in the selected path(s) can be identified. For example, the application can display the cells of every possible path that can lead up to and out of a selected cell, and a user could additionally select from a pop-up menu to make one or more paths pop-out. In another alternative, in addition to the single path, the application can determine N additional path(s) comprising the selected cell. At least some of the cells in each of the determined paths can be identified. In this way, the application can display the cells of the last three selected paths coming in to or out of a selected cell (e.g., the textual view can show three columns, with the most current path displayed in the left-most column). As another example, when selecting a "new" current path, the cells of the "last" path can remain displayed (e.g., in a different color). In this way, there are always at least two selected paths, and the cells in the last path are identified along with the cells in the new path.

In yet another alternate embodiment, an additional display region (an "Adjacencies View") displays a textual view of all the cells that lead into a selected cell and all the cells that lead out of it (i.e., the cells that fan-in/fan-out from the selected cell). The top row displays the content of the fan-in cells, the middle row displays the content of the selected cell, and the bottom row displays the content of the fan-out cells. In still another alternate embodiment, the application displays another display region that plays the output of the cells in the flowchart one cell at a time as the cells are played back. When a conditional cell is encountered, a user is prompted for input, and cells along the corresponding branch are played. The application remembers the cells that were played back and can identify some or all of these cells in the structure and/or script views.

Embodiments Related to Synchronizing

Graphical and Textual Views of a Flowchart

In creating a flowchart, the content of the cells can be entered in the flowchart itself. For example, a rectangular-shaped cell can be created, and a user can type text directly in that rectangular-shaped cell. Entering text in this manner can be difficult for some users. To overcome this problem, the preferred embodiments described below provide a text-entry process to drive the creation and modification of a flowchart. By way of overview, the application displays two display regions: one displaying a graphical view of a flowchart and the other displaying a textual view of at least some cells in the flowchart. In response to input received in either the first or second display regions, the application applies the input to both the first and second display regions, thereby synchronizing the graphical and textual views of the flowchart. FIGS. 6-11 will now be discussed to illustrate the operation of this preferred embodiment in creating a flowchart by incrementally entering data in cells along a path in the flowchart.

Figure 6A:
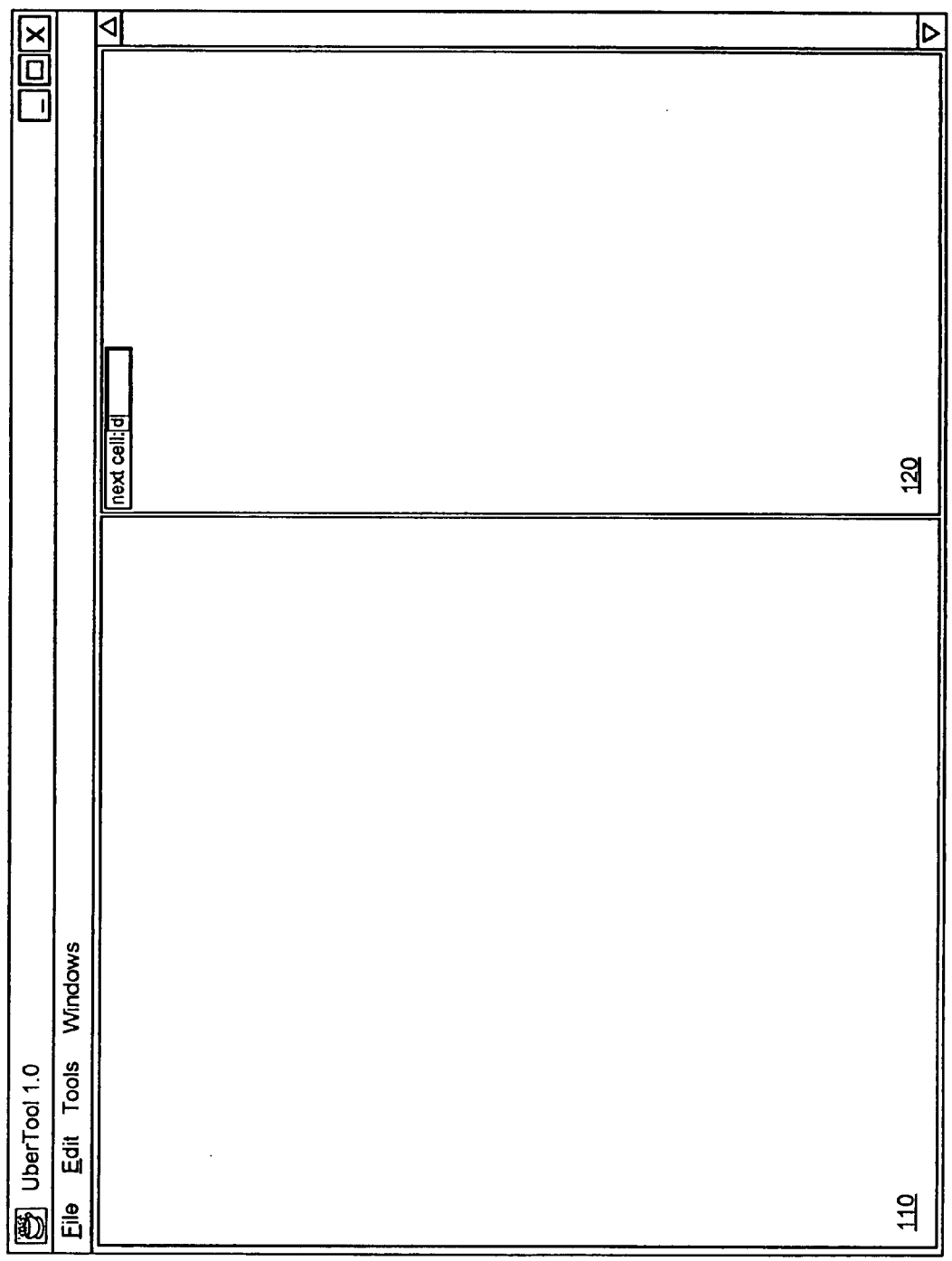
FIGS. 6A and 6B are illustrations of a preferred embodiment in which a new cell is inserted in Structure and Script Windows.
Figure 6B:
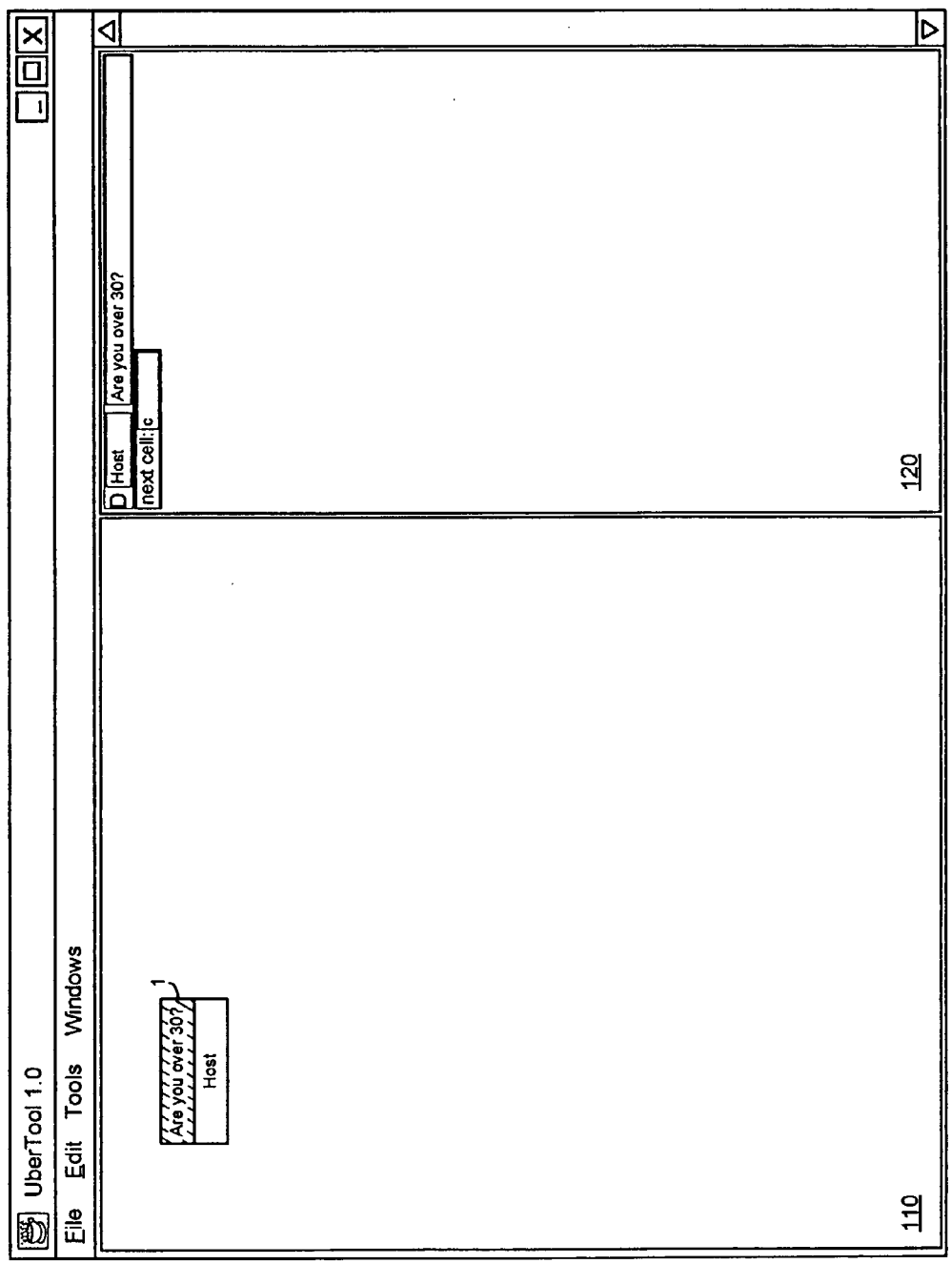

To create a flowchart, a user first creates a new project by selecting "New" from the File menu. After the user names the file, the application then presents two display regions: a Structure Window 110 and a Script Window 120 (see FIG. 6A). As in the embodiments described above, the Structure Window 110 is used to display a graphical view of a flowchart, and the Script Window 120 is used to display a textual view of at least some cells in a single path in the flowchart. In this embodiment, a user can create and manipulate cells in either the first or second display regions 110, 120. When a blank document opens, a "Next Cell Prompt" (NCP) is displayed, and the user enters the type of cell he wishes into the NCP. In this example, the user typed "D" to create a simple cell (see FIG. 6B). The user then can immediately start typing dialogue or other information into the simple cell. As shown in FIG. 6B, the user typed the dialogue "Are you over 30?" for the Host. In this preferred embodiment, while in a simple cell, hitting the return (or enter) key enters the text typed into the Script Window 120 into the corresponding cell on the Flowchart Window 110 and brings up another NCP in the Script Window 120 underneath the current text. In an alternate embodiment, the text typed into one window is simultaneously applied to the other window.

Figure 7:
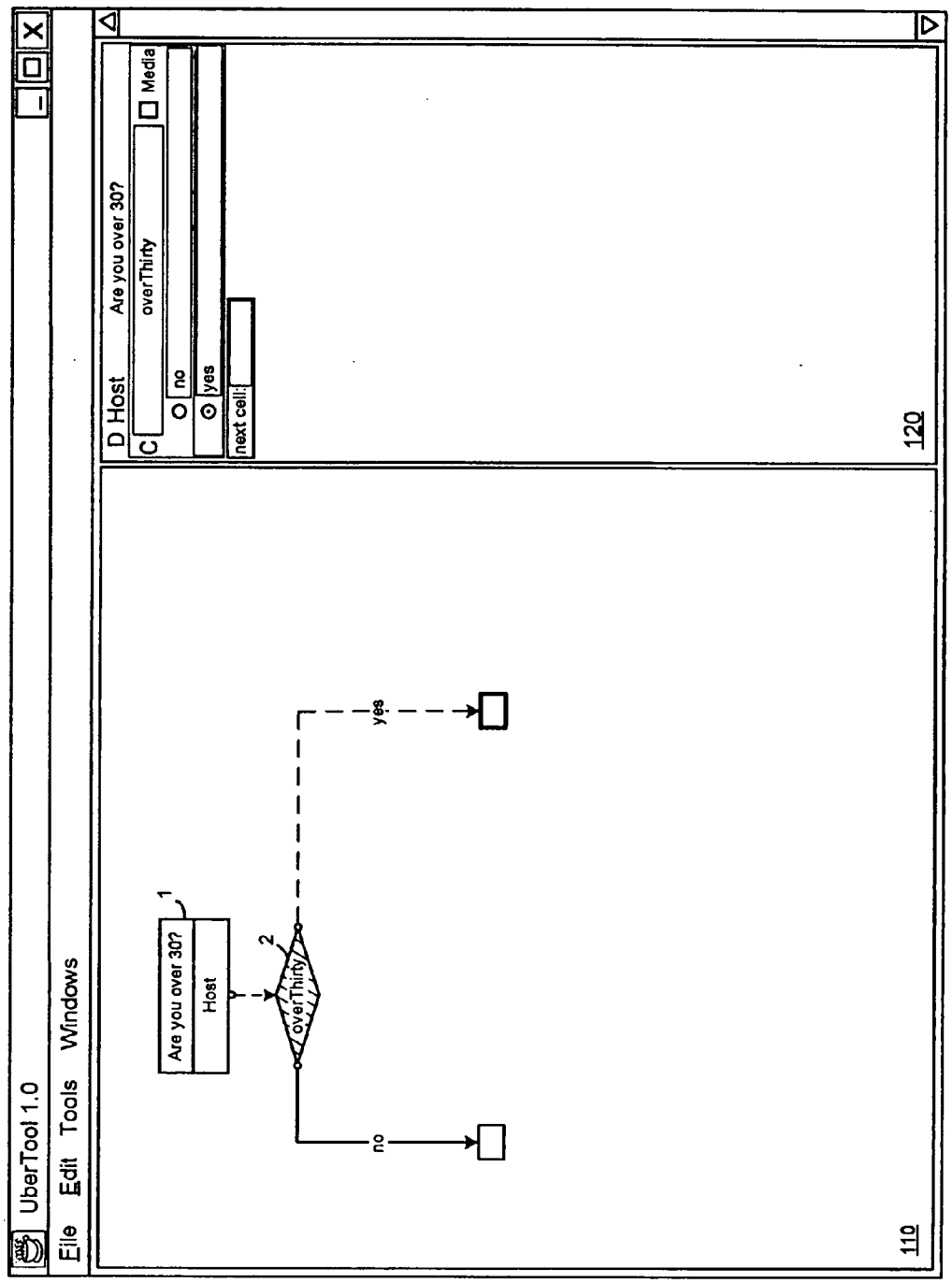
FIG. 7 is an illustration of a preferred embodiment in which a new conditional cell is inserted in Structure and Script Windows below the cell created in FIGS. 6A and 6B.

With reference again to example illustrated in FIG. 6B, the user next types "C" in the NCP to create a conditional cell. As shown in FIG. 7, the user can optionally create a label for the conditional cell (e.g., overThirty). The label can be used as a variable name into which user input is stored. For example, after the user responds to the "Are you over 30?" question, the variable <<overThirty>> will have a value of either "yes" or "no." As another example, when a conditional cell is labeled "male or female," the conditional cell can select a branch based on which value (male or female) is stored in the "male or female" variable in a database. With reference again to FIG. 7, the user then types in the conditions for the conditional cell (no, yes).

Figure 8:
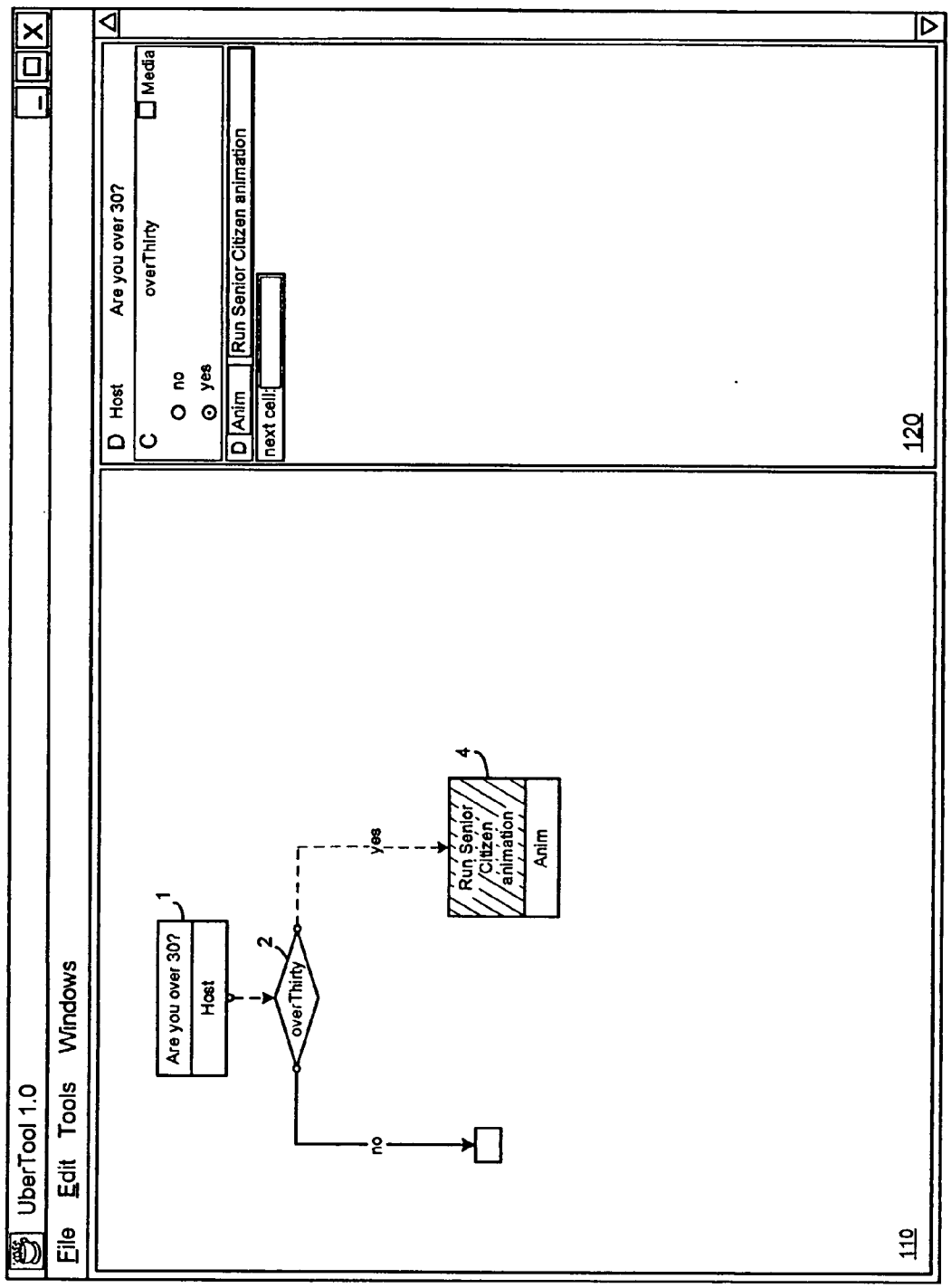
FIG. 8 is an illustration of a preferred embodiment in which a current path from the conditional cell created in FIG. 7 is indicated in both the Script Window and the Structure Window.
Figure 9:
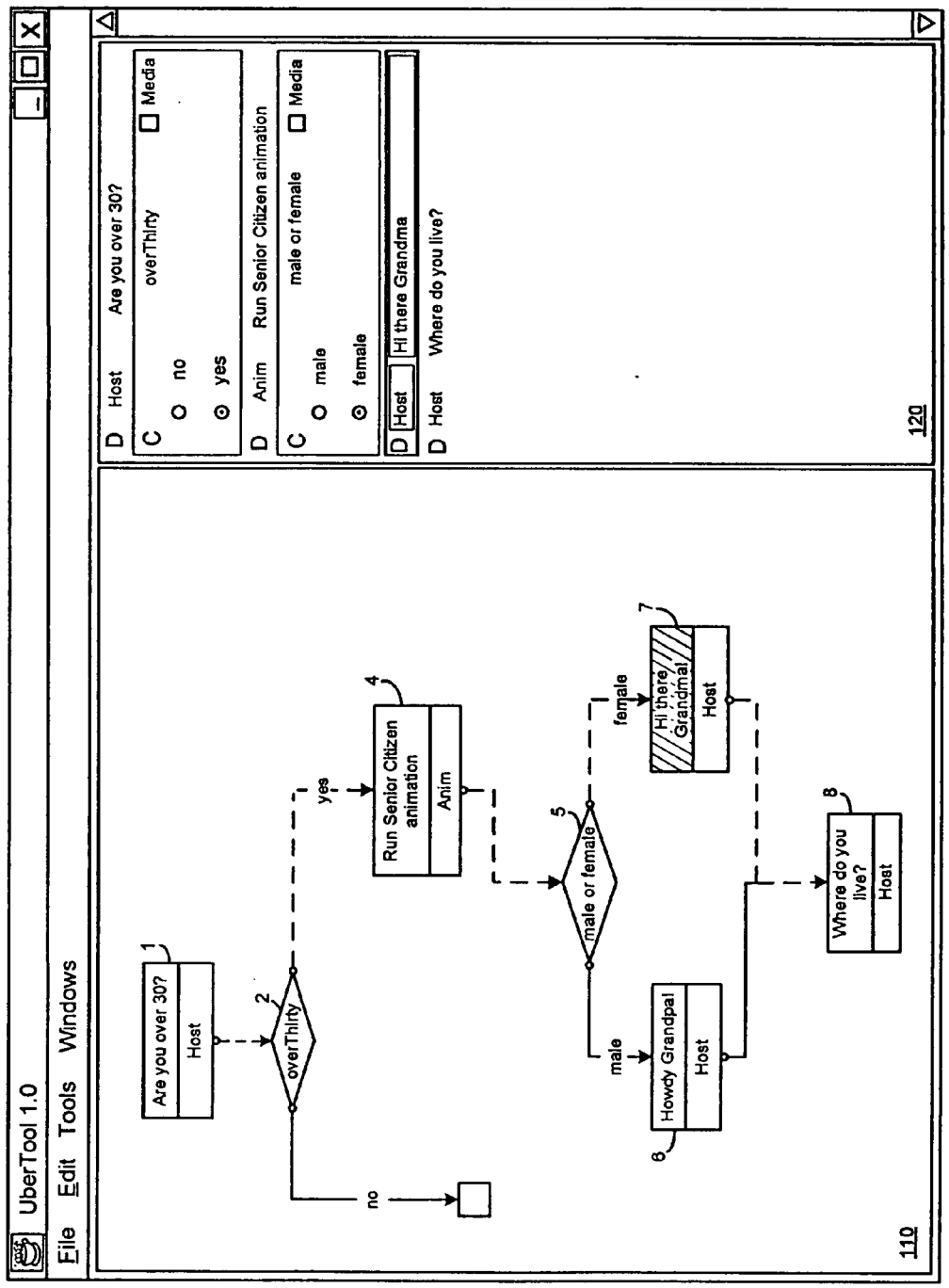
FIG. 9 is an illustration of a preferred embodiment in which additional cells have been created in the current path indicated in the Script Window of FIG. 8.
Figure 10:
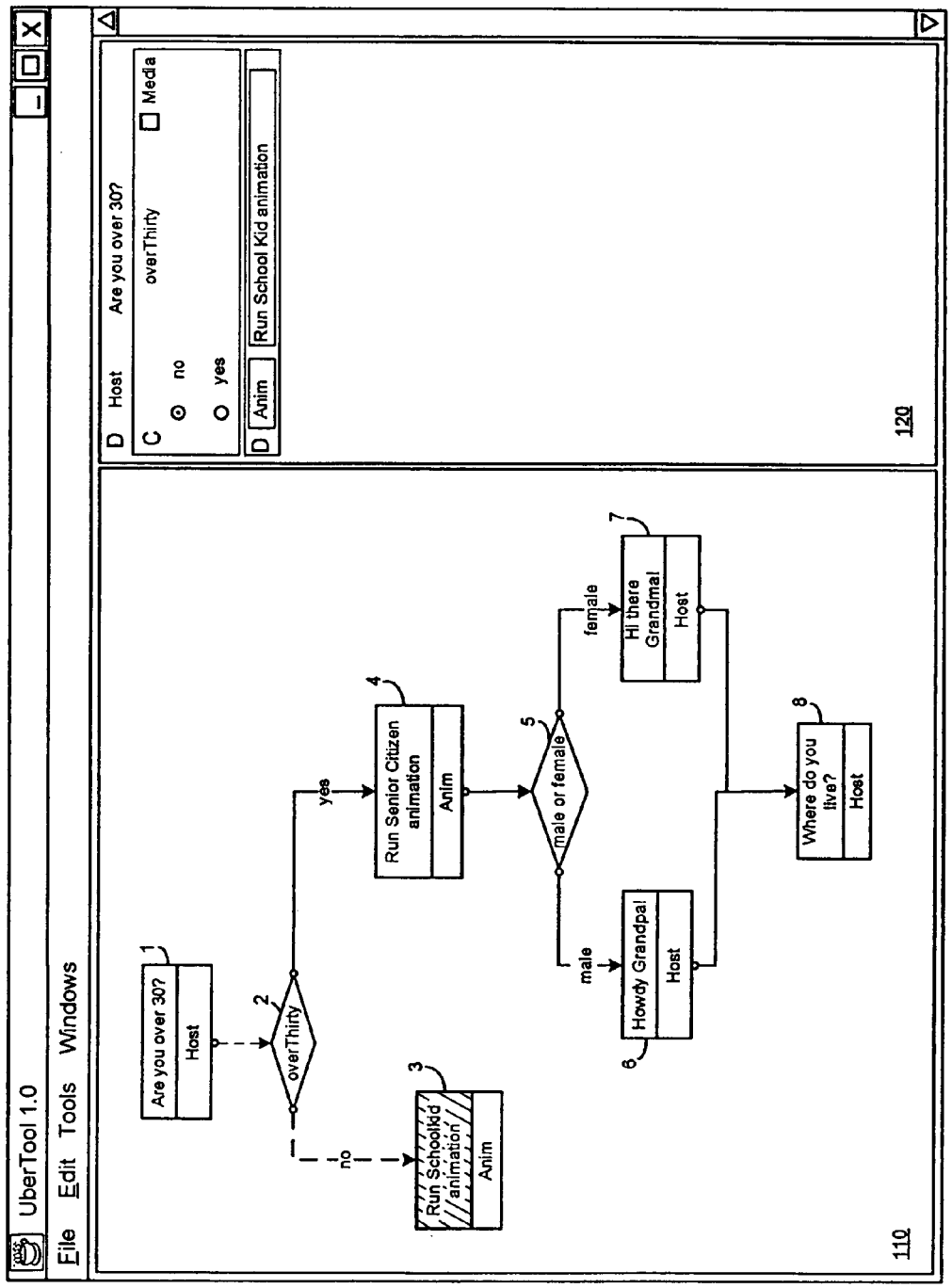
FIG. 10 is an illustration of a preferred embodiment in which a different path from the conditional cell created in FIG. 7 is indicated in both the Script Window and the Structure Window.

In this embodiment, the application assumes the writer wants to continue writing along the path of the last condition entered. The user continues creating cells along the path, as shown in FIGS. 8 and 9. To return to the "no" condition specified in cell 2 and create cells along that path, the user can either click on the "yes" radio button in the Script Window 120 or click on the cell below the "no" arrow in the Flowchart Window 110. The user can then add cell 3 to the flowchart, as shown in FIG. 10. Note that in this embodiment, the Script Window 120 shows only cells along a single path. Accordingly, only cells 1, 2, and 3 are shown in the Script Window 120 in FIG. 10. When the user selects cell 8, for example, the application determines the last-selected path using the embodiments described above, and the Script Window 120 resets itself to show this single path leading down to cell 8 (as shown in FIG. 9).

Figure 11:
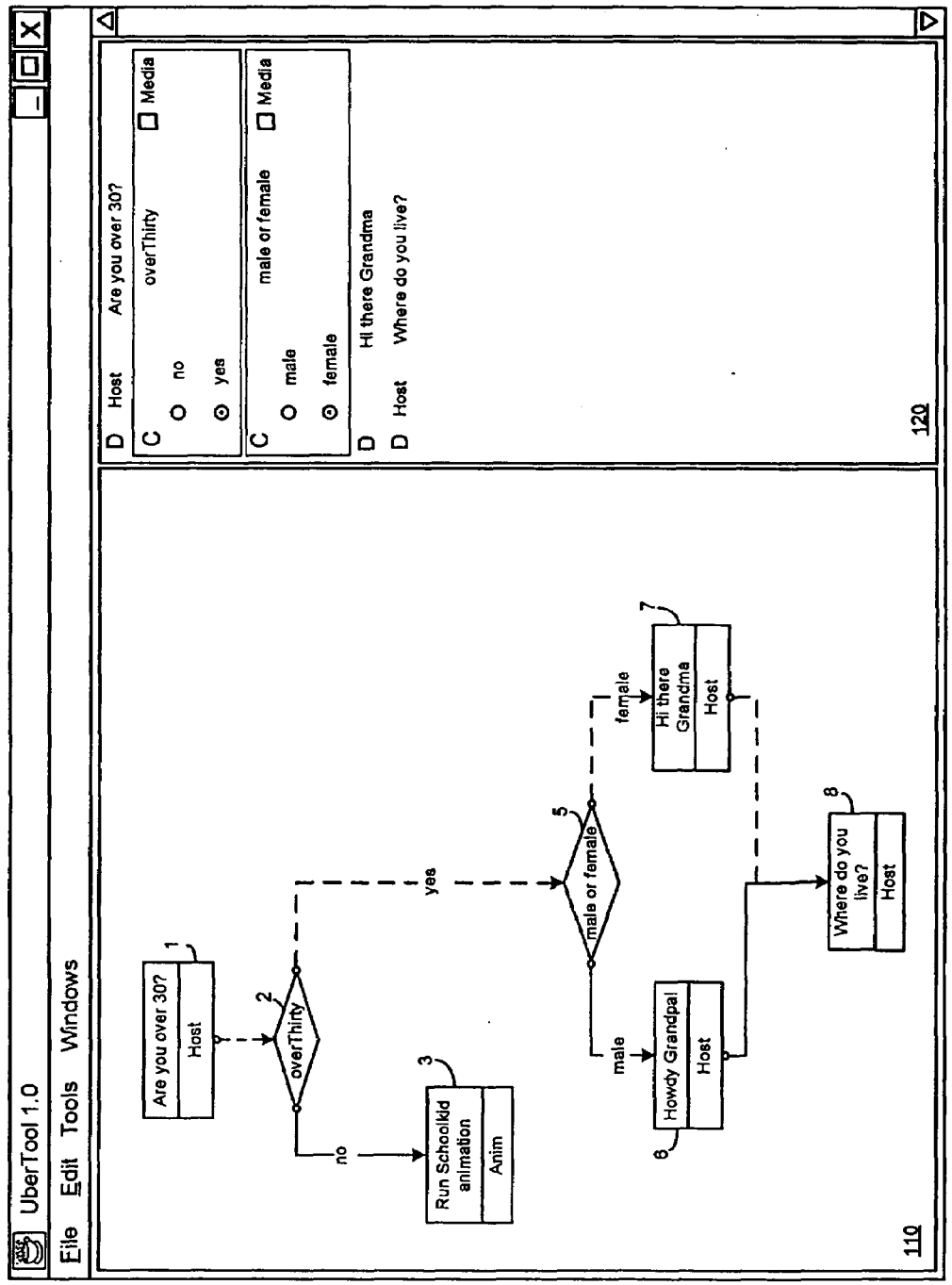
FIG. 11 is an illustration of a preferred embodiment in which cell 4 has been deleted from the Structure and Script Windows.

If the user then wants to delete cell 4, for example, he can click on the text box in the Script Window 120 for cell 4 (or the same cell in the Structure Window 110) and hit delete. Cell 4 is then deleted from both the Script Window 120 and the Structure Window 110. Depending on how the user has set his preferences, the application can automatically attach the cell above the deleted cell (cell 2, condition=yes) to the cell below the deleted cell (cell 5), as shown in FIG. 11. The application can contain similar functionality for copying or cutting a cell from one part of the flowchart and pasting it elsewhere. Additional functionality includes, but is not limited to, editing a cell, adding a cell, deleting a cell, adding a link between cells, removing a link between cells, adding conditional branch(es), and deleting conditional branch(es). For example, to attach a cell manually to another cell, a user can click on the first cell, drag a line out of that cell, and "drop" the end of the line on the other cell. A link is then made between the two cells. As another example, to delete a link, a user can grab the arrow going into a cell, drag it off the cell, and drop it on the open flowchart. Alternatively, the user can right-click on the line and choose a "remove link" option from a pop-up window.

As described above, the functions applied to the Script Window 120 (or the Structure Window 110) are mirrored in the Structure Window 110 (or the Script Window 120). For example, if a user selects a cell on the Script Window 120 and issues a command to insert a cell, the cell will be inserted into both the Structure Window 110 and the Script Window 120 below the currently-selected cell. Similar to the ability to split a paragraph in two in a word-processor, the user can highlight part of the text within a cell in the Script Window 120 and issues a command to insert a cell, and the application will create a new cell attached to the current cell with the highlighted text. If the highlighted text includes the first character of that text, the cell is preferably inserted above the current cell; otherwise, it is preferably inserted below. It should be noted that connecting a cell from one branch of the flowchart to an entirely different branch may require the user to define the path on the Structure Window 110. However, the flow between such connected cells will appear as a single path in the Script Window 120.

There are several advantages associated with this preferred embodiment, especially if the application is used to write and edit copy for an interactive multimedia experience. Interactive multimedia experiences are often written by writers who are more accustomed to using a word processor to type in a story than using a tool to create a flowchart. With this preferred embodiment, the writer can focus primarily on developing content in the Script Window 120 (as he would if he were using a word processor), while the application automatically creates and modifies the graphical view of the flowchart in the Structure Window 110. Additionally, from the writer's standpoint, it can be extremely difficult to visualize the linear flow through an experience by viewing the graphical view of the flowchart. A typical interactive multimedia experience consists of many prompts and decision logic after each prompt, with each decision producing a branch leading to additional processing steps. These large branching structures can be difficult to design and produce due to the unwieldy nature of the flowchart and writing tasks. The complexities of determining and managing the branching structures of a flowchart can pull creative focus away from developing its content because it is mechanically difficult to harmonize the content and the structure of an interactive program the way a great screenplay harmonizes every line of dialogue with the plot and vice-versa. However, the quality of the experience will be largely determined by whether the writer takes into account all of the possible paths and makes them flow seamlessly. Providing a Script Window 120 that at any one time represents the flow through a single path addresses this problem by making it easy for the writer to read and write each path as if it were a normal sequential storyline.

There are several alternatives that can be used with these preferred embodiments. For example, while the first and second display regions 110, 120 were displayed simultaneously in the example described above, in an alternate embodiment, the first and second display regions 110, 120 are displayed at different times. In another alternate embodiment, instead of applying the input to both display regions simultaneously, the input is applied first to one display region and later to the other. Additionally, instead of or in addition to using the keyboard, a user can use a mouse (or other pointing device) and menu selections to execute equivalent operations. However, some operations may only be available in the Structure Window 110. For example, a user can connect a branch in one area of the flowchart to another part of the flowchart by using a mouse to drag a connector line in the Structure Window 110 since only a single path is visible in the Script Window 120 at one time in this embodiment. Of course, provisions can be made for this functionality to be executed in the Script Window 120 as well.

In yet another alternate embodiment, instead of or in addition to using the Script Window 120 to edit cells, a user can edit the content and/or properties of cells in the flowchart displayed in the Structure Window 110. Accordingly, the Script Window 120 can drive the Structure Window 110 or vice versa. In this way, the designer can build an interactive multimedia experience by editing nodes in the graphical flowchart or textual specifications in a textual view. For example, cells on a selected path can be enlarged to allow a user to easily see the flow of the path and edit the contents of the cells on the flowchart itself. In this way, a user can create a cell in the graphic flowchart view, enter script in the enlarged cell, hit return, and have that cell appear in the textual view of the cell to see the single path flow. As noted above, the cells of the selected path can temporarily align themselves vertically to create the appearance of the Structure Window 120. Additionally, a third display area can be provided for receiving user input, and the application can apply the input received in the third display area to the Structure and Script Windows 110, 120. The third display area can take the form of a "properties window" that displays and allows a user to edit the properties of the cell such as script description, timing properties, and visual display properties.

As noted above, as the user clicks on different nodes in the flowchart, the application shows the currently-selected path in the Script Window 120. Preferably, the application uses the single path selection technique discussed above to "remember" the last selected path leading in to and out of the selected cell. It should be noted, however, that these preferred embodiments can be used without the single path embodiments discussed above. Additionally, any of the alternatives discussed above with respect to path selection can also be used with this preferred embodiment. For example, instead of displaying a textual view, the second display region 120 can display a copy of the flowchart where only the cells in the selected path are visible and the cells that are not on the path are hidden. In this way, the second display region 120 would display a graphical view of one path in the flowchart in isolation. The user can then create or edit cells on this graphical view. Additionally, the cells along a path can be identified in any other manner to allow a user to perceive and edit cells along that path. For example, the cells along a path can be displayed larger than the other cells in the flowchart. Here, the "second display region" (the display area occupied by these larger cells in the flowchart) is part of the first display region.

In another alternate embodiment, the application can be equipped with various functionality to allow it to facilitate the construction of the media assets scripted by the writer and for providing the programming necessary to fully render the interactive multimedia experience on a given platform. As noted above, cells can contain instructions to play a media asset such as an audio file or a video file. When a writer is scripting the content of the interactive multimedia experience, those media assets may not exist. The application can sort the various pieces of uncreated media based on the talent that is necessary to create the media or on other criteria for sorting. For example, the cells can be divided into music tasks, animation tasks, art tasks, programming tasks, SFX tasks, writing tasks, video tasks, and performance tasks. In this way, artists used to create the media can be assigned a list of tasks that need to be performed. When each of the media assets is created by the artists and inserted into designated "slots" in a database, the application can assemble the completed media for playback. The slots in the database can be created before or after the media assets are created. Because an interactive multimedia experience can have thousands of assets and a non-linear structure, it is preferred that the application maintain a database to track the media assets.

The application can also allow the writer to guide the various artists with annotations as to how the media should be rendered or performed. This process is analogous to a scriptwriter's comments regarding stage directions or other production issues in a play. The application can also produce cue cards that guide the talent in the performance and recording of the media. For other types of media, the writer can create preliminary versions of animations, music, etc. as guides for the creative staff when they are creating final versions. The application can also be used by the talent to record the media. For example, an integrated audio recording tool can be provided that assists the talent and producer in capturing the audio, still images, animation, etc., performing post-processing, and storing the media in an asset database. The audio recording tool can also show the points in the audio that precede and succeed a performance, making it easier for the performer to ensure seamless transitions. The talent can also enter comments back to the writer regarding issues that might arise in the performance.

Finally, it should be noted that a path can contain additional cells that are determined using techniques in addition to the ones described above. For example, if the techniques described above generate a path that contains an endless loop, the path can be modified to show a path out of the endless loop. As another example, a path can be expanded to include "dead-end" cells that are simultaneously triggered by a cell in a path. These dead-end cells can, for example, play sound effects or animation when a cell on the determined path is played.

The CD-ROM appendix contains a computer program listing for a presently preferred embodiment.

It is intended that the foregoing detailed description be understood as an illustration of selected forms that the invention can take and not as a definition of the invention. It is only the following claims, including all equivalents, that are intended to define the scope of this invention.

What is claimed is:

1. A method executed by a processor for identifying cells in a path in a flowchart, the method comprising:
    (a) displaying a flowchart comprising a plurality of cells, wherein at least some of the cells in the flowchart comprise instructions that are implemented by an application to provide an interactive multimedia presentation, wherein at least one of the plurality of cells comprises an instruction to trigger a piece of media during the interactive multimedia presentation, wherein timing information specifies when the piece of media is to be played during the interactive multimedia presentation, and wherein at least one other of the plurality of cells comprises an instruction to gather user input during the interactive multimedia presentation;
    (b) receiving, from a user, a selection of a single cell in the flowchart;
    (c) determining a path comprising the selected single cell;
    (d) identifying, to the user, at least four cells in the path in a way that distinguishes the at least four cells in the path from at least some of the other cells in the flowchart that are not in the path, wherein the way in which the at least four cells in the path are distinguished is by displaying the at least four cells differently from all of the other cells in the flowchart; and
    (e) for at least one of the plurality of cells that comprise an instruction to trigger a piece of media during the interactive multimedia presentation, displaying at least one of the following: a description of video that will be displayed when the piece of media is played during the interactive multimedia presentation and a description of audio that will be played when the piece of media is played during the interactive multimedia presentation.

2. The method of claim 1, wherein (c) comprises determining a last selected path comprising the selected cell.

3. The method of claim 1, wherein (c) comprises determining a most-frequently selected path comprising the selected cell.

4. The method of claim 1, wherein (c) comprises randomly determining a path comprising the selected cell.

5. The method of claim 1, wherein (c) comprises semi-randomly determining a path comprising the selected cell.

6. The method of claim 1, wherein the flowchart comprises a beginning cell and an end cell, and wherein the path determined in (c) comprises the beginning and end cells.

7. The method of claim 1, wherein the flowchart comprises a beginning cell and an end cell, and wherein the path determined in (c) does not comprise at least one of the beginning and end cells.

8. The method of claim 1, wherein the path determined in (c) comprises at least one of a beginning cell and an end cell, and wherein the at least four cells identified in (d) comprise the at least one of the beginning and end cells.

9. The method of claim 1, wherein the path determined in (c) comprises at least one of a beginning cell and an end cell, and wherein the at least four cells identified in (d) do not comprise the at least one of the beginning and end cells.

10. The method of claim 1, wherein the flowchart is displayed in a first display region, and wherein the at least four cells are identified in (d) by displaying a textual view of the at least four cells in a second display region.

11. The method of claim 1, wherein the flowchart is displayed in a first display region, and wherein the at least four cells are identified in (d) by displaying a copy of the at least four cells in a second display region.

12. The method of claim 1, wherein (d) comprises identifying four cells in the path.

13. The method of claim 1, wherein (d) comprises identifying all of the cells in the path.

14. The method of claim 1, wherein the at least four cells are identified in (d) by highlighting the at least four cells in the flowchart.

15. The method of claim 1, wherein the at least four cells are identified in (d) by enlarging the at least four cells in the flowchart.

16. The method of claim 1, wherein the at least four cells are identified in (d) by enlarging the at least four cells in the flowchart and reducing the at least some of the other cells in the flowchart.

17. The method of claim 1, wherein the at least four cells are identified in (d) by enlarging and aligning the at least four cells in the flowchart.

18. The method of claim 1 further comprising selecting at least one additional cell in the flowchart, and wherein (c) comprises determining a path comprising the selected cell and the at least one additional cell.

19. The method of claim 18, wherein the selected cell comprises a master cell, and wherein (c) comprises determining a path between the master cell and the at least one additional cell.

20. The method of claim 1 further comprising:
determining N additional path(s) comprising the selected cell; and
identifying at least some of the cells in each of the N additional path(s).

21. The method of claim 20, wherein the first-mentioned path and the N additional path(s) comprise the last N+1 selected paths comprising the selected cell.

22. The method of claim 1 further comprising:
(e) selecting an additional cell in the flowchart;
(f) determining a path comprising the selected additional cell; and
(g) identifying at least some of the cells in the path determined in (f) along with the at least four cells in the path determined in (c).

23. The method of claim 1, wherein (c) comprises determining a plurality of paths comprising the selected cell, wherein the invention further comprises selecting one of the plurality of determined paths, and wherein (d) comprises identifying at least four cells in the selected one of the plurality of determined paths.

24. The method of claim 23, wherein the plurality of paths comprises every path comprising the selected cell.

25. The method of claim 1 further comprising displaying a textual view of cells that fan-in and fan-out of the selected cell.

26. The method of claim 1, wherein at least one of the plurality of cells comprises an instruction to process data.

27. The method of claim 1 further comprising playing the flowchart, wherein the cell selected in (b) comprises a cell selected by a user during the playing of the flowchart, and wherein the path determined in (c) comprises the path that was traversed during the playing of the flowchart.

28. A method executed by a processor for identifying cells in a path in a flowchart, the method comprising:
(a) displaying a flowchart comprising a plurality of cells, wherein the plurality of cells define a plurality of paths, wherein at least some of the cells in the flowchart comprise instructions that are implemented by an application to provide an interactive multimedia presentation, wherein at least one of the plurality of cells comprises an instruction to trigger a piece of media during the interactive multimedia presentation, wherein timing information specifies when the piece of media is to be played during the interactive multimedia presentation, and wherein at least one other of the plurality of cells comprises an instruction to gather user input during the interactive multimedia presentation;
(b) receiving, from a user, a selection of a single cell in the flowchart;
(c) in response to the selection of the single cell in the flowchart, determining a path comprising the single cell;
(d) identifying, to the user, at least four cells in the path determined in (c) in a way that distinguishes the at least four cells in the path from at least some of the other cells in the flowchart that are not in the path, wherein the way in which the at least four cells are distinguished is by displaying the at least four cells differently from the at least some of the other cells in the flowchart; and
(e) for at least one of the plurality of cells that comprise an instruction to trigger a piece of media during the interactive multimedia presentation, displaying at least one of the following: a description of video that will be displayed when the piece of media is played during the interactive multimedia presentation and a description of audio that will be played when the piece of media is played during the interactive multimedia presentation.

29. The method of claim 28, wherein the user selects the single cell by positioning a pointer over the single cell.

30. The method of claim 28, wherein the path is determined in (c) based on the history of the single cell and the history of cells above and below it, if any, in succession.

31. The method of claim 28, wherein (c) comprises, starting with the single cell being a given cell:
(c1) determining which cell directly connected to the given cell was in a determined path the last time the given cell was in a determined path; and
(c2) repeating (c1) with the given cell being the cell determined in (c1).

32. The method of claim 28, wherein the flowchart is displayed in a first display region, and wherein the at least four cells are identified to the user in (d) by displaying a textual view of the at least four cells, but not of the at least some of the other cells in the flowchart, in a second display region.

33. The method of claim 28, wherein the flowchart is displayed in a first display region, and wherein the at least four cells are identified to the user in (d) by displaying a copy of the at least four cells, but not of the at least some of the other cells in the flowchart, in a second display region.

34. A method executed by a processor for identifying cells in a path in a flowchart, the method comprising:
(a) displaying a flowchart comprising a plurality of cells, wherein the plurality of cells define a plurality of paths, wherein at least some of the cells in the flowchart comprise instructions that are implemented by an application to provide an interactive multimedia presentation, wherein at least one of the plurality of cells comprises an instruction to trigger a piece of media during the interactive multimedia presentation, wherein timing information specifies when the piece of media is to be played during the interactive multimedia presentation, and wherein at least one other of the plurality of cells comprises an instruction to gather user input during the interactive multimedia presentation;
(b) receiving, from a user, a selection of a single cell in the flowchart;
(c) determining a path comprising the selected single cell based on the history of the selected cell and the history of cells above and below it, if any, in succession;
(d) identifying, to the user, at least four cells in the path determined in (c) in a way that distinguishes the at least some of the cells in the path from at least some of the other cells in the flowchart that are not in the path, wherein the way in which the at least four cells are distinguished is by displaying the at least four cells differently from the at least some of the other cells in the flowchart; and
(e) for at least one of the plurality of cells that comprise an instruction to trigger a piece of media during the interactive multimedia presentation, displaying at least one of the following: a description of video that will be displayed when the piece of media is played during the interactive multimedia presentation and a description of audio that will be played when the piece of media is played during the interactive multimedia presentation.

35. The method of claim 34, wherein (c) comprises, starting with the selected cell being a given cell:
(c1) determining which cell directly connected to the given cell was in a determined path the last time the given cell was in a determined path; and (c2) repeating (c1) with the given cell being the cell determined in (c1).

36. The method of claim 34, wherein (b) comprises positioning a pointer over the cell.

37. The method of claim 34, wherein the flowchart is displayed in a first display region, and wherein the at least four cells are identified to the user in (d) by displaying a textual view of the at least four cells, but not of the at least some of the other cells in the flowchart, in a second display region.

38. The method of claim 34, wherein the flowchart is displayed in a first display region, and wherein the at least four cells are identified to the user in (d) by displaying a copy of the at least four cells, but not of the at least some of the other cells in the flowchart, in a second display region.

39. A method executed by a processor for identifying cells in a path in a flowchart, the method comprising:
  (a) displaying a flowchart in a first display region, wherein the flowchart comprises a plurality of cells defining a plurality of paths, wherein at least some of the cells in the flowchart comprise instructions that are implemented by an application to provide an interactive multimedia presentation, wherein at least one of the plurality of cells comprises an instruction to trigger a piece of media during the interactive multimedia presentation, wherein timing information specifies when the piece of media is to be played during the interactive multimedia presentation, and wherein at least one other of the plurality of cells comprises an instruction to gather user input during the interactive multimedia presentation;
  (b) receiving, from a user, a selection of a single cell in the flowchart;
  (c) determining a path comprising the selected single cell; and
  (d) identifying, to the user, at least some of the cells in the path by displaying a textual view of the at least some of the cells in the path, but not of at least some of the other cells in the flowchart that are not in the path, in a second display region, whereby the at least some of the cells in the path are identified in a way that distinguishes the at least some of the cells in the path from the at least some of the other cells in the flowchart that are not in the path, wherein, for at least one of the plurality of cells that comprise an instruction to trigger a piece of media during the interactive multimedia presentation, the textual view provides at least one of the following: a description of video that will be displayed when the piece of media is played during the interactive multimedia presentation and a description of audio that will be played when the piece of media is played during the interactive multimedia presentation.

40. The method of claim 39, wherein (b) comprises positioning a pointer over the cell.

41. The method of claim 39, wherein the path is determined in (c) based on the history of the selected cell and the history of cells above and below it, if any, in succession.

42. The method of claim 39, wherein (c) comprises, starting with the selected cell being a given cell:
  (c1) determining which cell directly connected to the given cell was in a determined path the last time the given cell was in a determined path; and
  (c2) repeating (c1) with the given cell being the cell determined in (c1).

43. A method executed by a processor for building a flowchart along a single path, the method comprising:
  (a) displaying a flowchart in a first display region, wherein the flowchart comprises a plurality of cells defining a plurality of paths, wherein at least some of the cells in the flowchart comprise instructions that are implemented by an application to provide an interactive multimedia presentation, wherein at least one of the plurality of cells comprises an instruction to trigger a piece of media during the interactive multimedia presentation, wherein timing information specifies when the piece of media is to be played during the interactive multimedia presentation, and wherein at least one other of the plurality of cells comprises an instruction to gather user input during the interactive multimedia presentation;
  (b) simultaneously displaying a textual view of at least some of the cells along a single path in the flowchart in a second display region and receiving input from a user in the second display region, wherein, for at least one of the plurality of cells that comprise an instruction to trigger a piece of media during the interactive multimedia presentation, the textual view provides at least one of the following: a description of video that will be displayed when the piece of media is played during the interactive multimedia presentation and a description of audio that will be played when the piece of media is played during the interactive multimedia presentation, wherein a textual view of cells not along the single path in the flowchart is not displayed in the second display region, whereby the input is received in the second display region while the second display region displays the textual view of the at least some of the cells along the single path in the flowchart; and
  (c) in response to the input received in (b) in the second display region, applying the input to the first display region, wherein if the input comprises an addition of a new cell in the second display region, a new cell in the flowchart in the first display region is created, and wherein if the input comprises a modification of existing text in the second display region, a corresponding existing cell in the flowchart in the first display region is modified.

44. The method of claim 43, wherein (c) comprises in response to adding new text in the second display region, creating a new cell in the flowchart in the first display region.

45. The method of claim 43, wherein (c) comprises in response to deleting existing text in the second display region, deleting a corresponding existing cell in the flowchart in the first display region.

46. The method of claim 43 further comprising determining the single path in response to receiving, from a user, a selection of a single cell in the flowchart.

47. The method of claim 43 further comprising determining the single path based on the history of a selected cell and the history of cells above and below it, if any, in succession.

48. The method of claim 43 further comprising determining the single path by, starting with a selected cell being a given cell:
  (i) determining which cell directly connected to the given cell was in a determined path the last time the given cell was in a determined path; and
  (ii) repeating (i) with the given cell being the cell determined in (i).

49. The method of claim 1, wherein the application that implements the instructions is the same application that performs (a)-(d).

50. The method of claim 1, wherein the application that implements the instructions is different from an application that performs (a)-(d).

51. The method of claim 28, wherein the application that implements the instructions is the same application that performs (a)-(d).

52. The method of claim 28, wherein the application that implements the instructions is different from an application that performs (a)-(d).

53. The method of claim 34, wherein the application that implements the instructions is the same application that performs (a)-(d).

54. The method of claim 34, wherein the application that implements the instructions is different from an application that performs (a)-(d).

55. The method of claim 39, wherein the application that implements the instructions is the same application that performs (a)-(d).

56. The method of claim 39, wherein the application that implements the instructions is different from an application that performs (a)-(d).

57. The method of claim 43, wherein the application that implements the instructions is the same application that performs (a)-(c).

58. The method of claim 43, wherein the application that implements the instructions is different from an application that performs (a)-(c).

59. The method of claim 1, wherein (b)-(d) are performed other than when the flowchart is played.

60. The method of claim 28, wherein (b)-(d) are performed other than when the flowchart is played.

61. The method of claim 34, wherein (b)-(d) are performed other than when the flowchart is played.

62. The method of claim 39, wherein (b)-(d) are performed other than when the flowchart is played.

63. The method of claim 43, wherein (a)-(c) are performed other than when the flowchart is played.

* * * * *